Figure 1A:
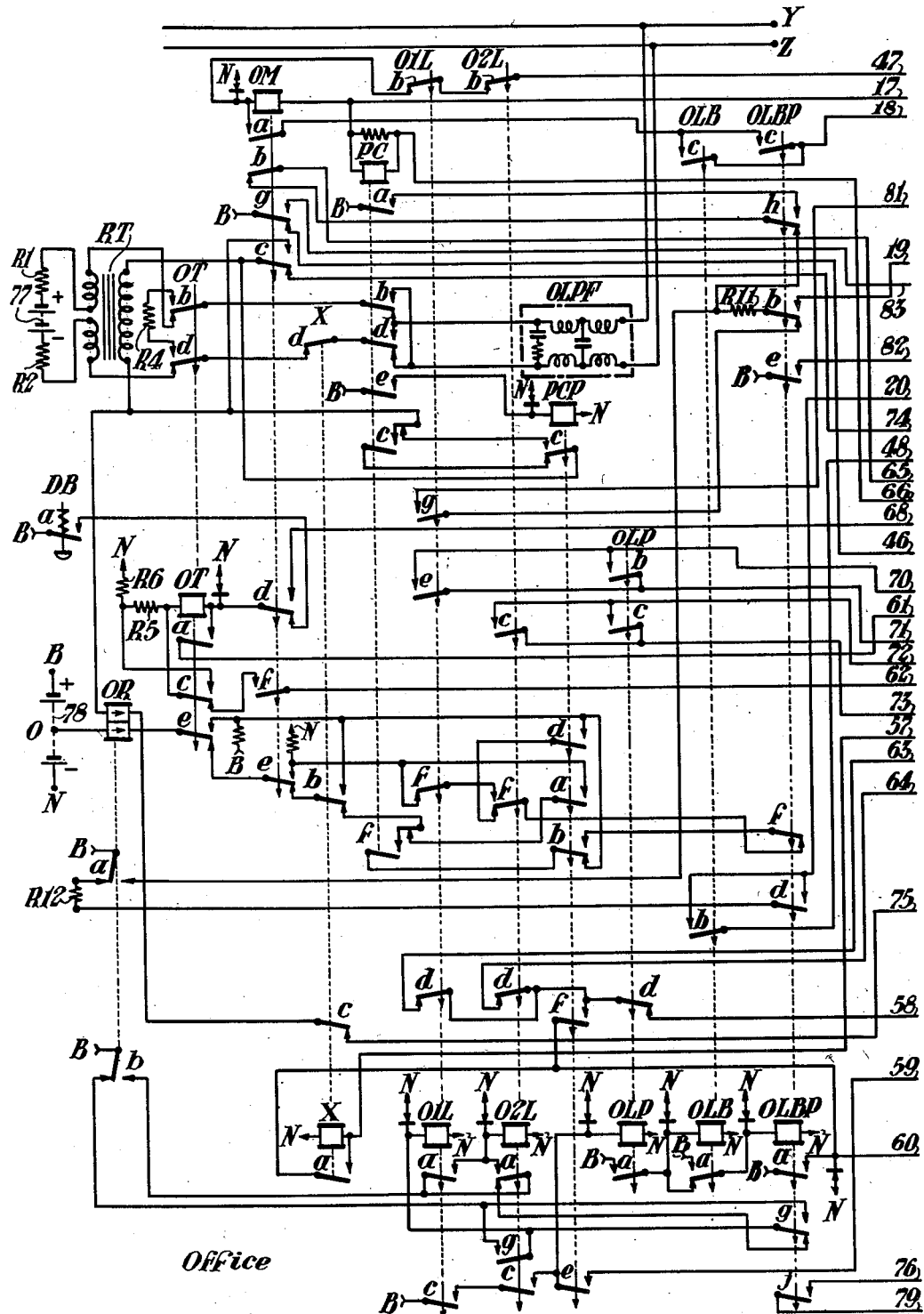

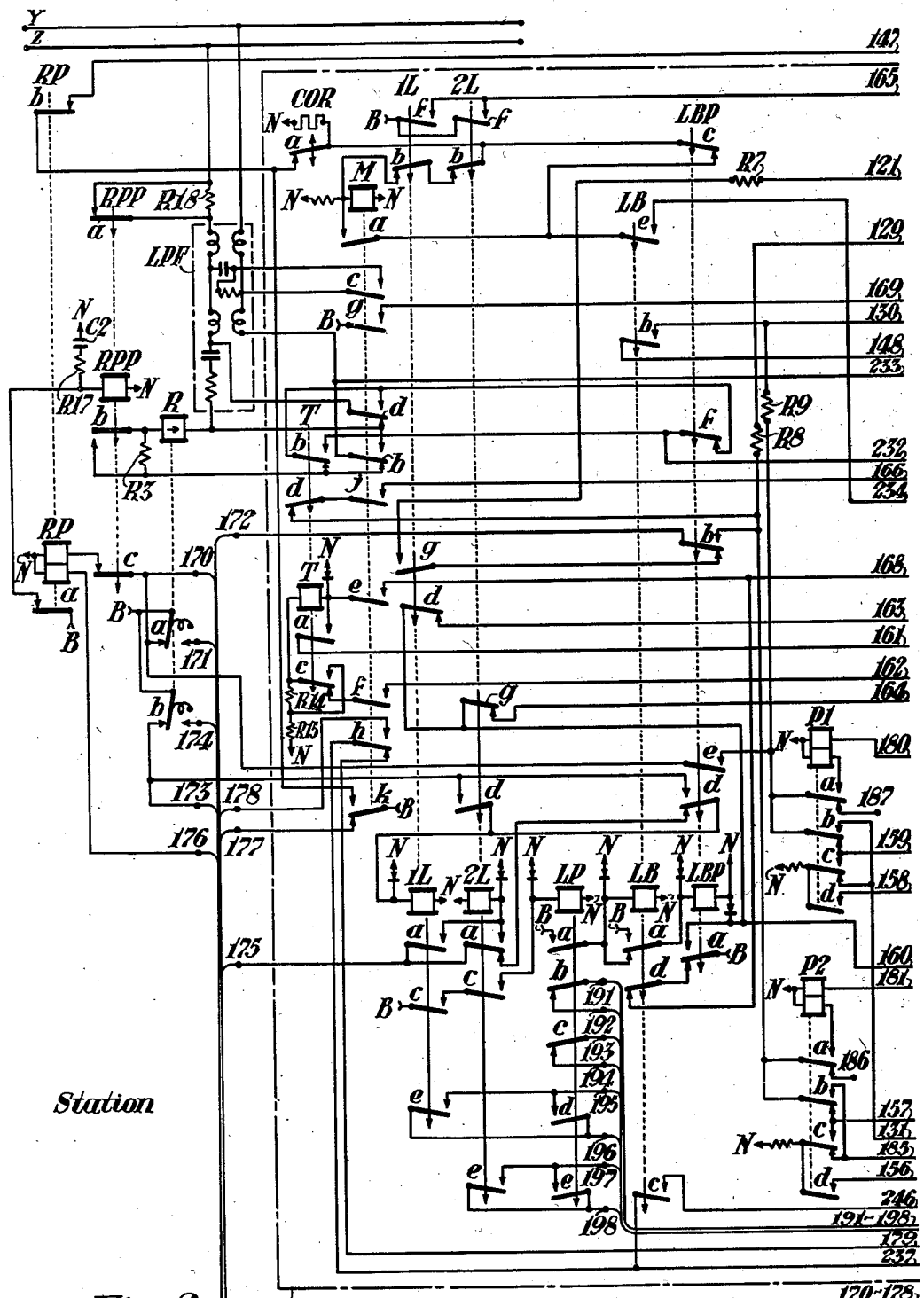
Fig. 2a. Line Coding and Storage Unit

To Winding of
Relay CE2

INVENTOR.
Thomas W. Hays
BY
W. L. Stout
HIS ATTORNEY

United States Patent Office 2,790,158
Patented Apr. 23, 1957

2,790,158

REMOTE CONTROL SYSTEMS

Thomas W. Hays, Omaha, Nebr., assignor to Westinghouse Air Brake Company, Wilmerding, Pa., a corporation of Pennsylvania Application September 29, 1953, Serial No. 382,884

8 Claims. (Cl. 340—163)

My invention relates to a remote control system, and more particularly to a centralized traffic control system for railroads. The system of my invention comprises an office and a plurality of stations connected by line wires over which impulse code signals are transmitted to effect the operation of devices, mostly for governing traffic, located along the trackway, and to indicate at the office the position or condition of such devices.

My invention is an improvement on the system shown in Letters Patent of the United States No. 2,411,375, issued November 19, 1946 to A. P. Jackel, for a Remote Control System. The system of my invention is thus of the time code type employing codes of long and short elements which are transmitted one at a time over a single line circuit.

The components of the system of my invention are preferably assembled in the form of coding, storage, and extension units, each containing a group of relays. The system employs a station coding unit at each field location for transmitting indication codes and for selectively receiving control codes, together with a station storage unit and extension units as required, for associating the devices at that location with the station coding unit. The office equipment preferably includes an individual control panel for each unit group of controlled traffic governing devices and an office coding unit which is connected over the line circuit with the station coding unit to establish communication selectively between each panel and the corresponding station storage unit.

In most systems of this type in present use, including the system described in the previously mentioned Patent 2,411,375, the length of all control and all indication codes is a fixed number of steps, such as the number 16. Normally, the first half of each code is required to provide a distinct code call for each station. This station selection is necessary so that the control codes may be selectively received by the proper field station and the indication codes recorded on the correct panel in the office. Since the last code step is required for resetting the system, only seven steps of the usual 16 steps are thus available for carrying control or indication functions. If the number of devices to be controlled or indicated at a field location exceeds seven, it is then necessary to use an entire additional code, assigning a separate station code call, for each additional group of seven functions. Also, additional storage and selective equipment is required at the field location.

In the past, seven code steps have usually been sufficient for the control or indication functions desired at most field locations in a centralized traffic control system (hereinafter designated by the symbol C. T. C.). However, due to the increasing complexity of railway signal systems, the need for extra code steps at field locations is becoming more frequent, especially to provide additional indications to increase the operating efficiency of the system. Since the number of station assignment code calls available with one office coding unit is mathematically limited, being 35 in a 16 step coding system, the use of additional station assignment codes at many field locations may require the use of more than one line section in a C. T. C. installation where one line section would otherwise suffice. This requires additional office coding equipment and either more line wire or high frequency carrier equipment, all of which add to the cost of the installation.

It would be a decided advantage to be able to provide, at a station, additional code steps as desired without the necessity of using another station assignment code and with a minimum of additional equipment. In other words, the flexibility to make the regular code at a station of any desired length would increase the efficiency and the usefulness of the system and decrease the initial cost. Also desirable is the ability to make the control and indication codes at any station of different lengths, each code including only the minimum number of steps required to perform the functions desired with neither code restricted to an exact multiple of some basic number, such as eight. That is, the codes would not be limited in length to only 16, 24, 32 or 40 steps. This increases the number of codes which can be transmitted per unit of time, a definite advantage in a busy installation.

However, at the same time, in order to maintain the flexibility of the present systems, the ability to vary the length of the code as desired must be provided with items of equipment which will be standard at all stations, that is, coding and storage units and code extension equipment must be of an identical design for all stations so that interchangeability is maintained.

An object of my invention, therefore, is to provide, in a system of this type, a method of extending the code to any desired length at any station to provide additional controls or indications without using additional station assignment codes.

A feature of my invention in accomplishing this object is the reuse of the relays of the primary counting chain in the coding unit through a third and additional cycles. This is accomplished by using additional relays as required in the secondary counting chain to turn back the primary counting chain at the end of a cycle of operation for a repeat cycle instead of allowing the code to terminate.

Another object of my invention is to provide a means of terminating a code on any even numbered step after the station selection has been accomplished.

A feature of my invention to accomplish this object is the provision of means to energize the last relay of the secondary counting chain as soon as all functions have been transmitted, thus terminating the code.

Another object of my invention is to permit an adjustable selection whereby the control and indication codes at a station may be of different lengths, each code including only sufficient steps to convey the desired functions.

Still another object of my invention is to maintain identical items of equipment at the various stations while providing the previously mentioned features.

A feature of my invention in accomplishing this object is the provision of code extension units for field stations to allow the addition of the extra steps to the code to provide additional controls and indications.

A feature of my invention in accomplishing the above objects is that the coding units at all field stations are identical, all code extension units are identical, and all office units, in applications requiring more than one line section, are also identical with each other.

Other objects and features of my invention will be apparent from the following description.

One form of apparatus embodying my invention and one modification thereof will now be described and the novel features will then be pointed out in claims.

Certain features of the system shown in the drawings and hereinafter disclosed in describing the operation of the apparatus are not my invention and are not claimed in the appended claims. These certain features are disclosed and claimed in the copending application for Letters Patent of the United States, Serial No. 382,885, filed on the same date as the current application, by Alfred B. Miller, for Remote Control Systems, now Patent No. 2,698,425, dated December 28, 1954.

Figure 1B:
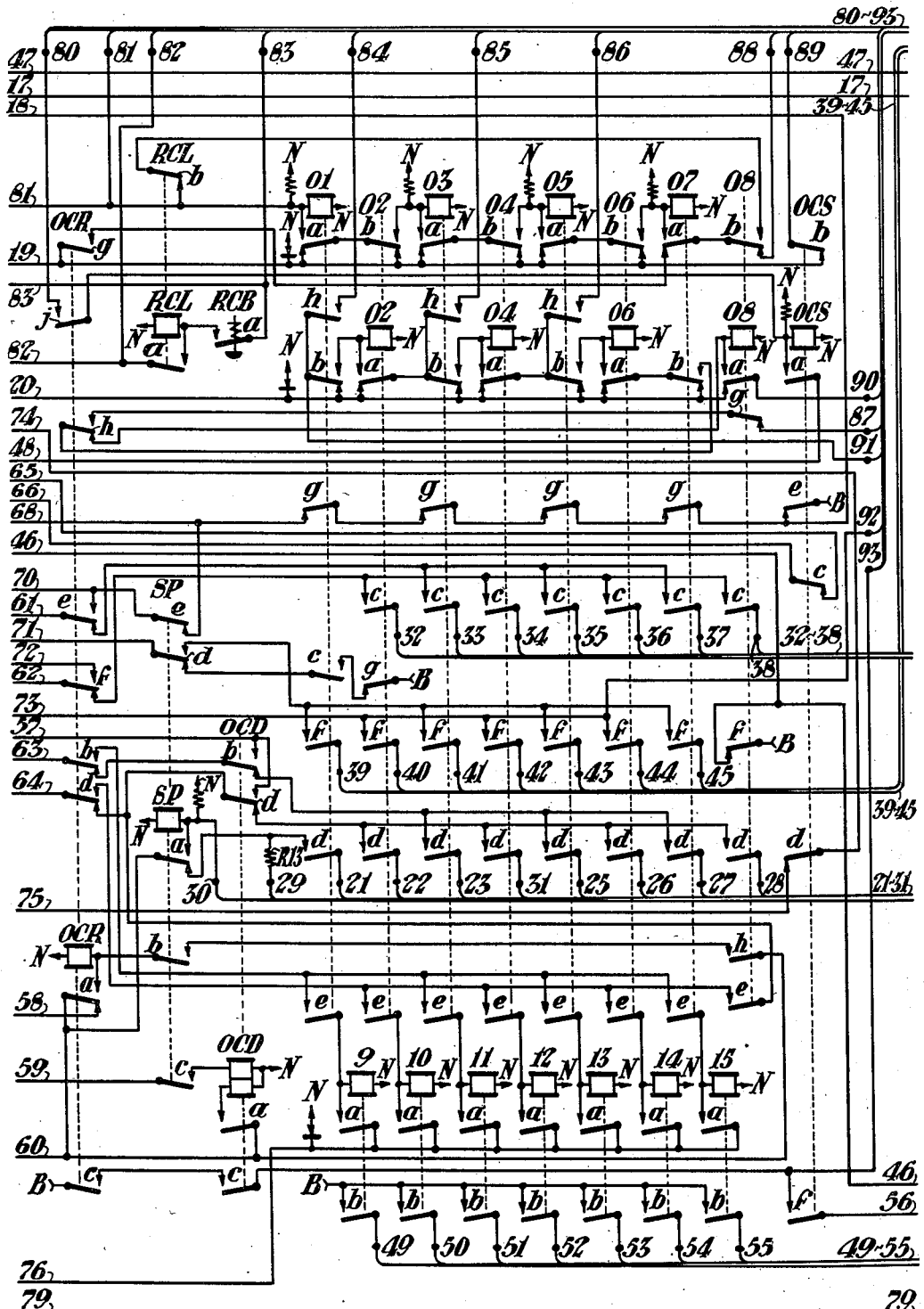
Figure 1C:
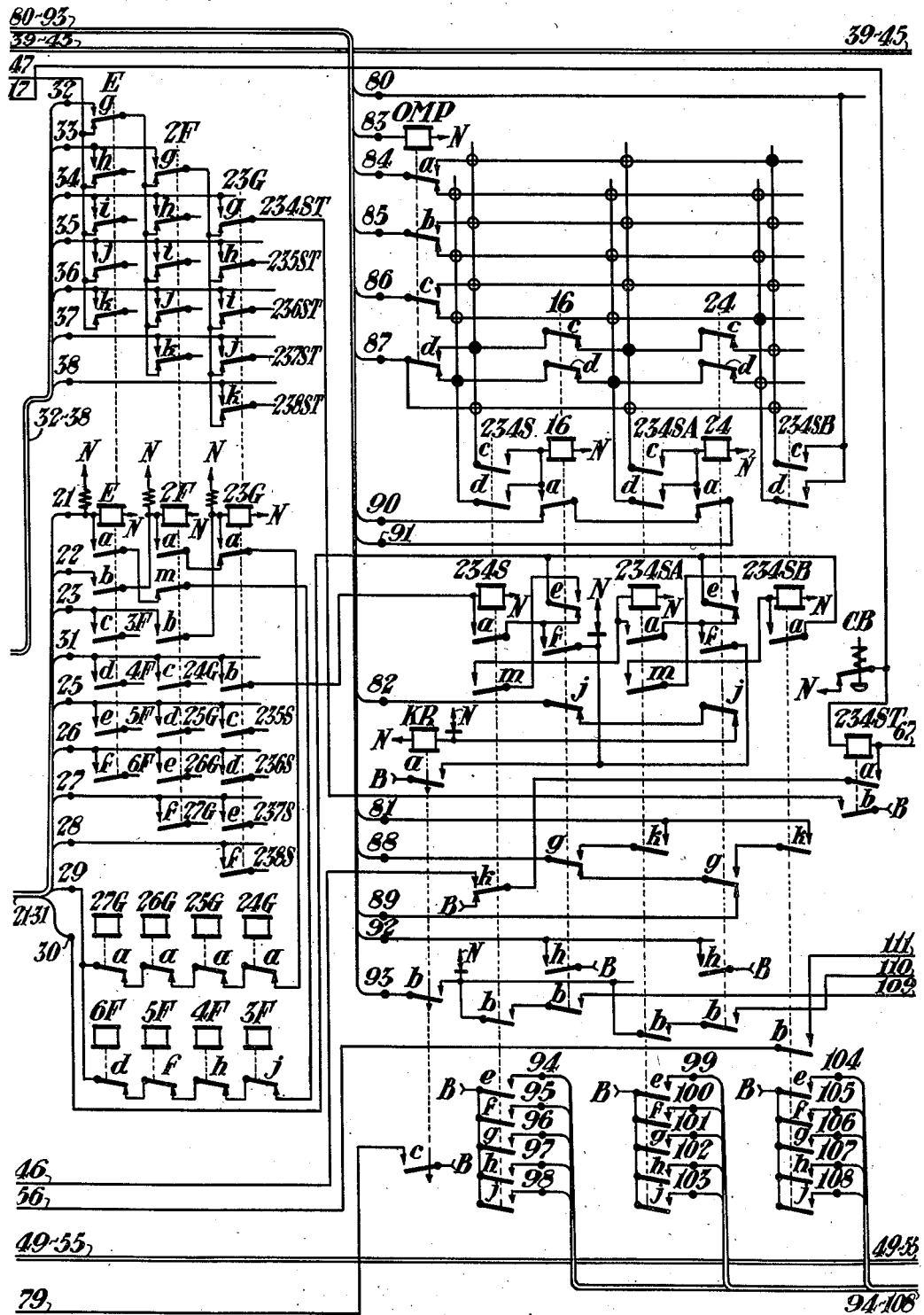
Figure 1D:
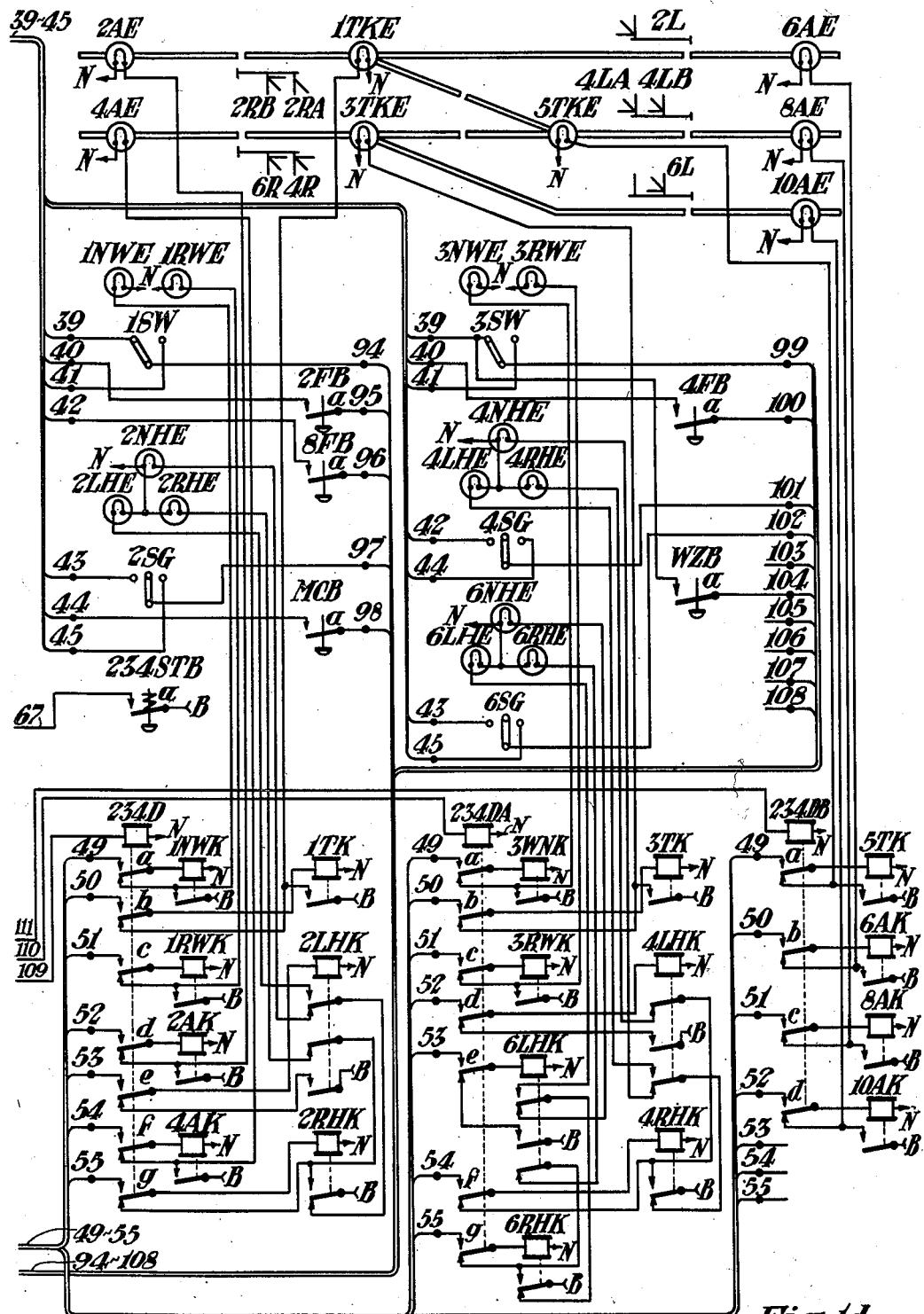

Referring now to the accompanying drawings, Figs. 1a, 1b, 1c, and 1d, taken together in the order named with Fig. 1a on the left, illustrate in condensed form the office equipment employed in one form of centralized traffic control embodying my invention. The apparatus shown in Figs. 1a and 1b comprises generally the office coding unit, and is contained within a case known as the office line coding unit, hereafter designated OLC for brevity. However, the impulse transformer, the batteries, the low pass filter, and the disconnect button, shown on Fig. 1a, are preferably mounted outside the OLC unit. The apparatus shown at the left in Fig. 1c comprises a portion of the pyramid circuit for the office. At the right of Fig. 1c, there is illustrated the circuits and equipment for extending the length of any code, including the adjustable connections to allow the control and indication codes to be of different lengths for any one field station, and part of the selecting relays for associating a particular group of control panels in the office with the office coding unit. Fig. 1d shows two such individual panels of a C. T. C. machine containing the levers and lamps for controlling and indicating a typical unit group of traffic governing devices in the field, together with the remainder of the selecting relays for associating these panels with the office coding unit. It is to be understood that each panel or group of panels in the machine is similarly connected but by means of a different arrangement of selecting relays.

Figure 2B:
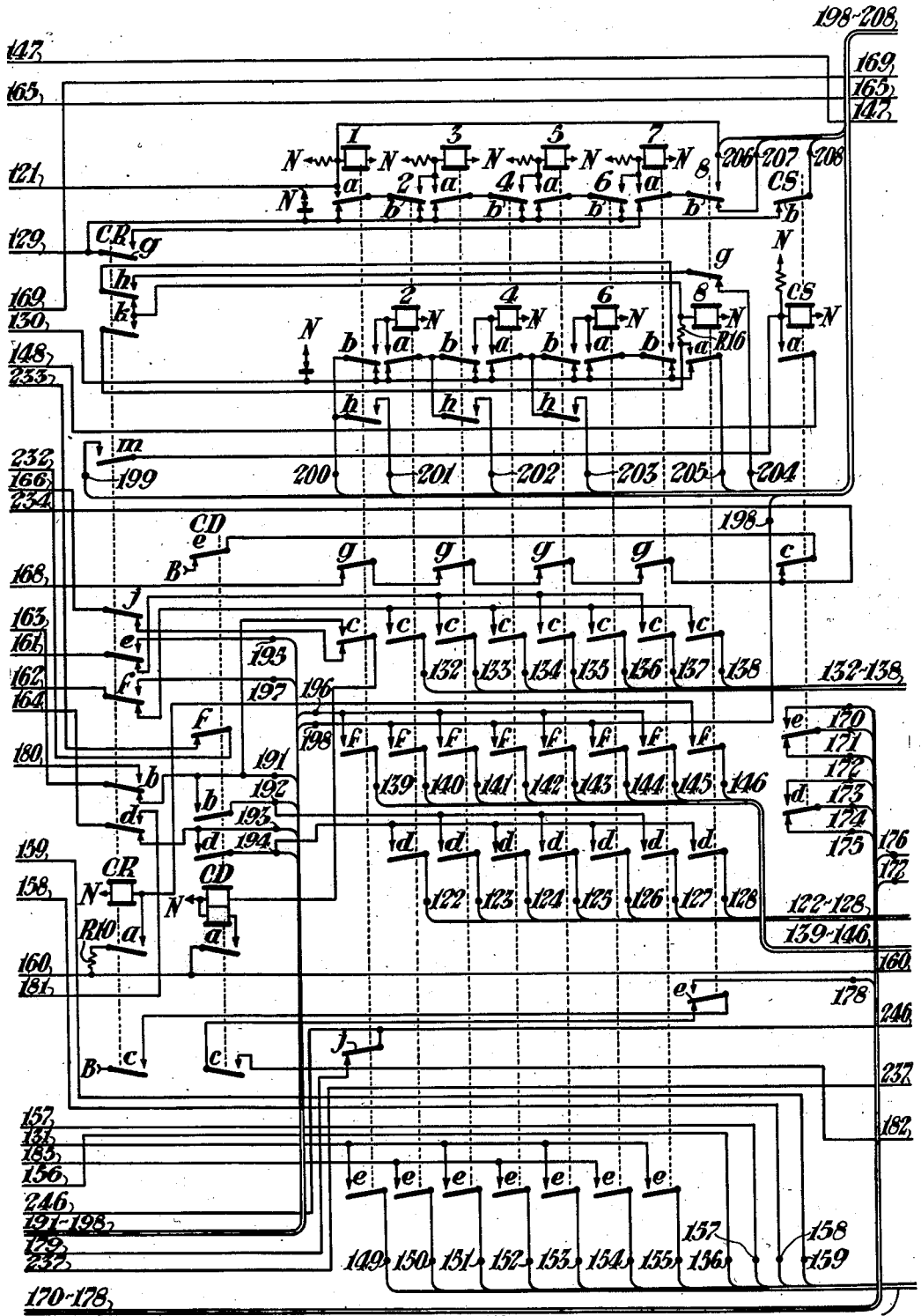
Figure 2C:
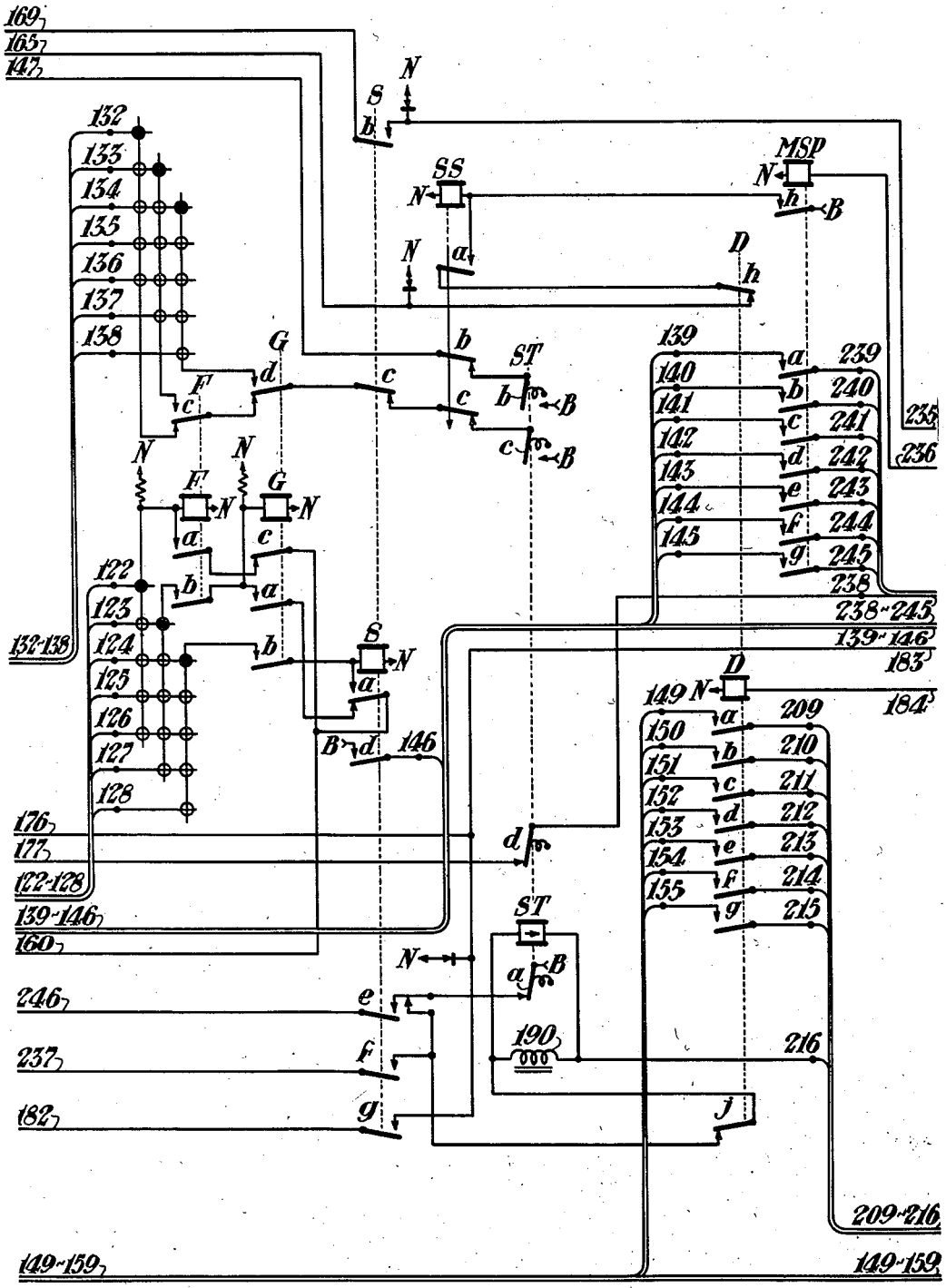
Figure 2D:
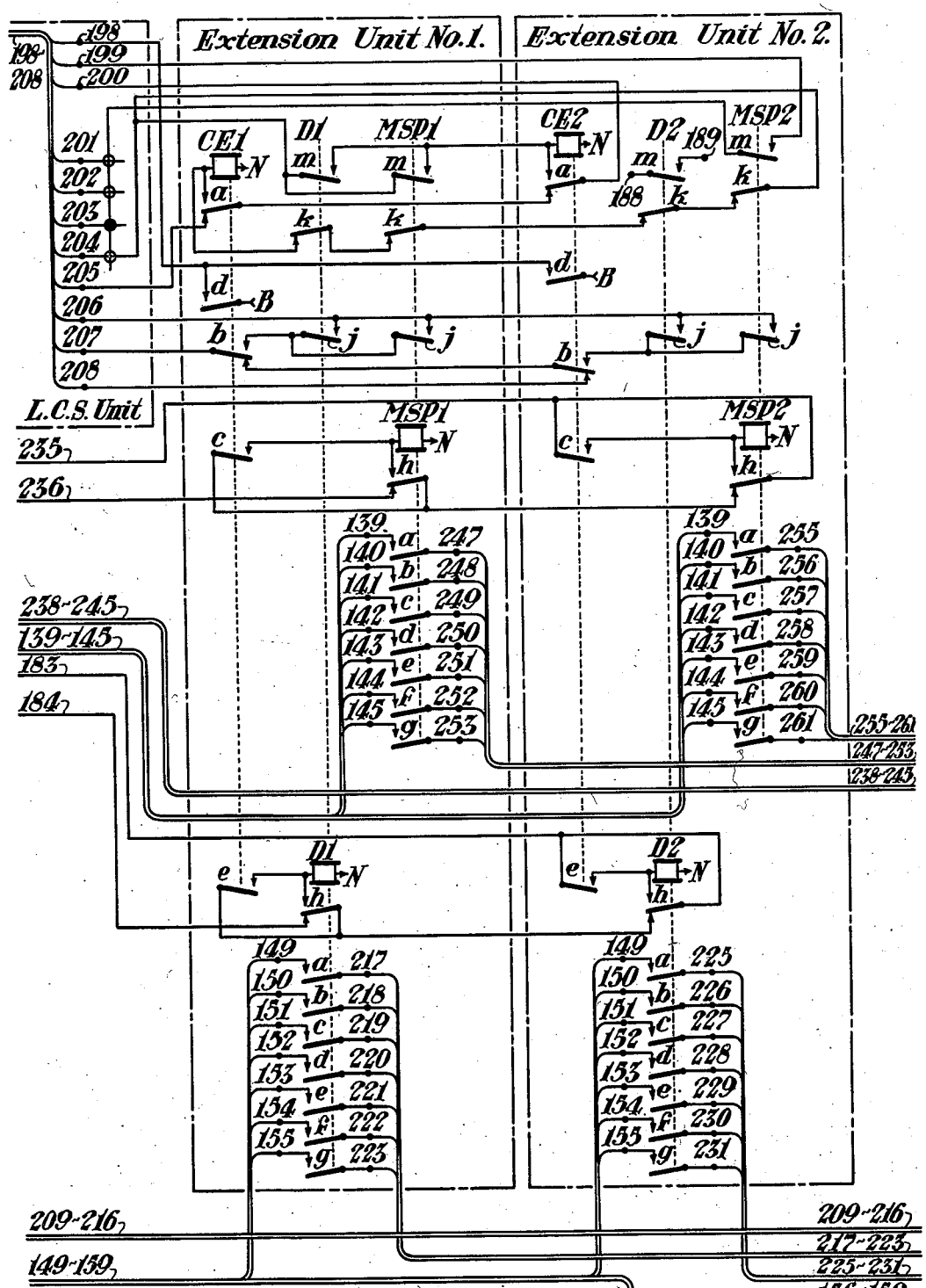
Figure 2E:
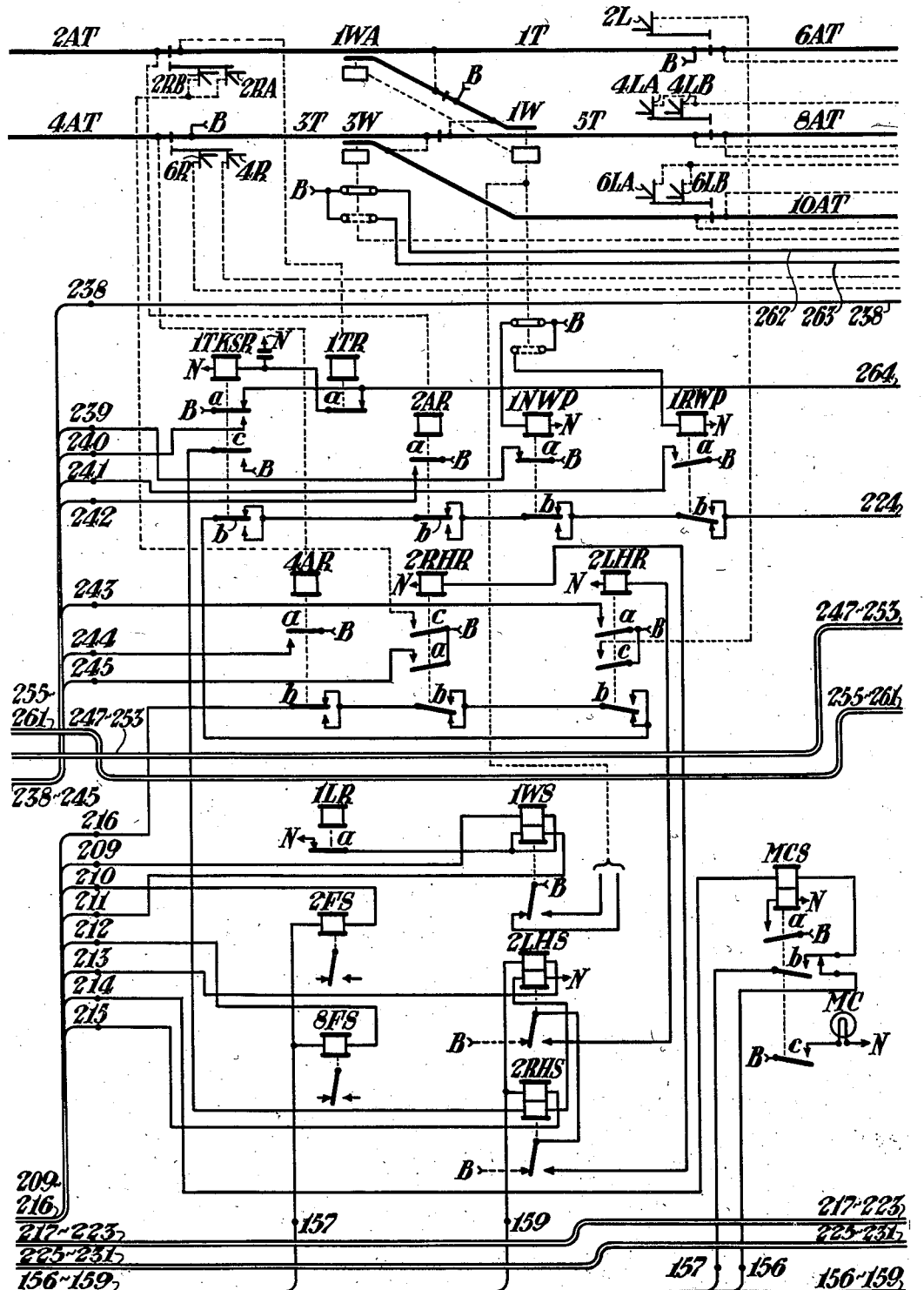
Figure 2F:
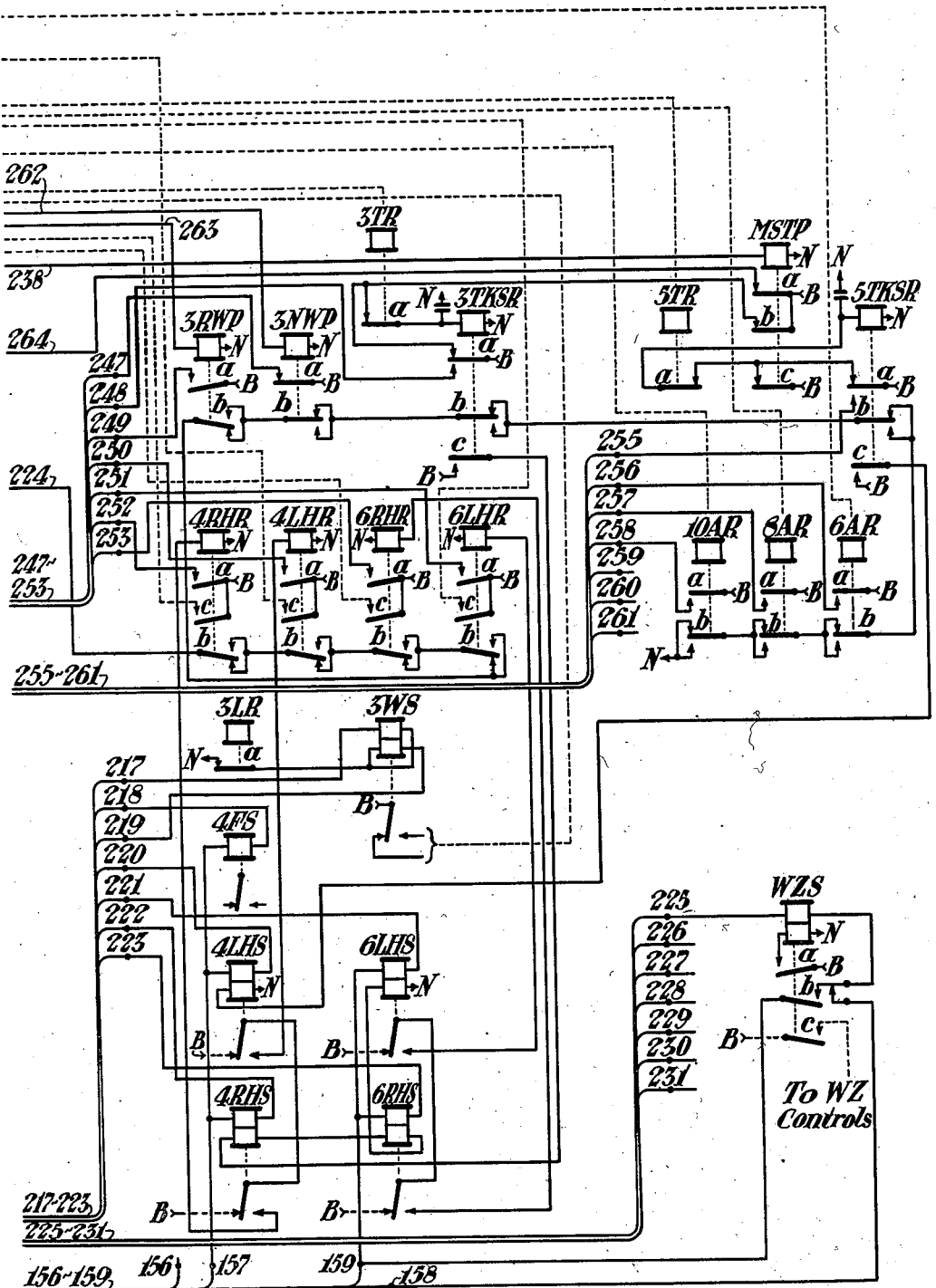

Figs. 2a, 2b, 2c, 2d, 2e, and 2f, taken together in the order named with Fig. 2a on the left, illustrate the corresponding apparatus at a typical field location when two code extension units are necessary to handle the control and indicating devices at that location. The apparatus of Figs. 2a, 2b, 2c, and the upper left portion of 2d, comprises the station coding unit. As indicated by the dot-dash line on Fig. 2a, most of this apparatus is usually contained inside the case of a line coding and storage unit, commonly called an LCS unit. All the apparatus on Figs. 2b and 2c, with the exception of the relay ST, as well as that indicated in the upper left of Fig. 2d, is also contained within the LCS unit. In Fig. 2d, there are shown two identical code extension units, indicated by the dot-dash lines, which have been designated Extension Unit No. 1 and Extension Unit No. 2. Fig. 2e includes a track diagram showing a typical installation such as may be controlled by a field station in this system. There is illustrated diagrammatically the necessary power switches and control signals to govern the movement of trains at an interlocking at which a three-track railroad merges into a two-track railroad. The remainder of Fig. 2e and Fig. 2f shows the relays of the station storage unit suitable for the control and indication of the typical traffic governing devices shown. It is to be understood that only the relays and circuits necessary to illustrate the operation of the coding apparatus have been shown in connection with this track diagram, and that dotted lines have been used, in the accepted manner, to show linkage with the various devices. It will be noted that the interlocking with its wayside devices shown in Fig. 2e is that controlled by the C. T. C. machine panels illustrated in Fig. 1d.

Figure 3:
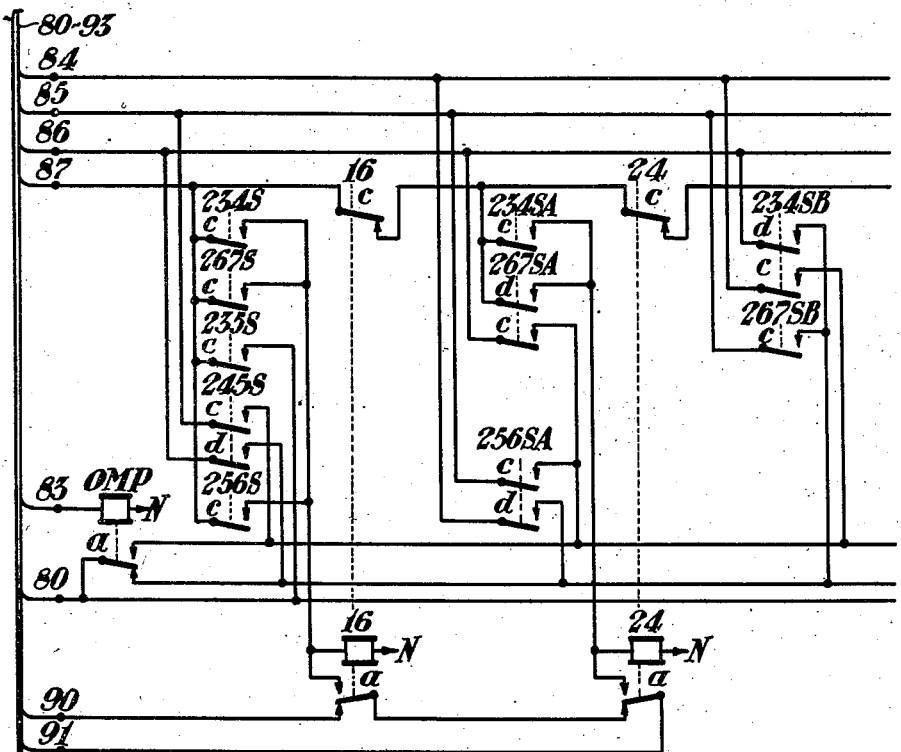

Fig. 3 illustrates a modification of the apparatus and circuits shown in the upper right portion of Fig. 1c. In addition, contacts of additional station selection relays, for stations other than that shown in Fig. 2, are shown with the adjustable connections to facilitate the explanation of the synchronization of code stopping action between the office and field stations to allow for various length codes.

Figure 4:
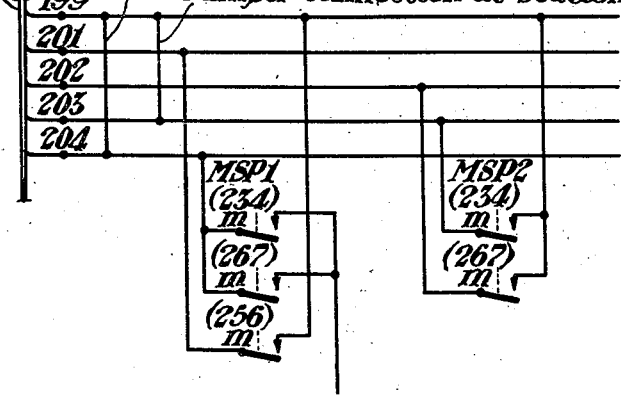

Fig. 4 is a composite showing of the adjustable connections necessary at the field stations having the code calls shown in Fig. 3 to end the indication codes at each station on the selected step.

Similar reference characters refer to similar parts in each of the several views.

Referring now to Fig. 1a, the reference characters Y and Z designate a pair of line wires which extend from the office to the several field stations. At the particular field station used in illustrating the operation of the equipment, these line wires Y and Z appear on Fig. 2a. These two line wires provide a line circuit for the C. T. C. of my invention and also may be used to provide channels for telephone and telegraph communication, as explained in connection with the similarly designated line wires shown in Letters Patent of the United States No. 2,303,875 issued December 1, 1942, to G. W. Baughman and N. F. Agnew, for a Remote Control System.

This line circuit, as shown, is normally energized by current from the office line battery 77, the positive terminal of which is normally connected to the line wire Y and the negative terminal to the line wire Z, over back contacts b and d of a pole-changer relay PC, similar contacts b and d of the office transmitter relay OT, and the coils of a suitable low pass filter OLPF. Control codes are transmitted by opening and closing the line circuit by periodic operation of the relay OT. The line circuit also includes back contact d of a lockout relay X, the office line resistors R1 and R2, and the primary windings of an impulse transformer RT by means of which the office line relay OR is controlled when receiving indication codes.

Relay OR is of the magnetic stick type, as described and claimed in the aforementioned Patent No. 2,303,875. The arrangement for relay OR is that when current flows through either winding in the direction of the arrow, the relay armature is moved to its normal position, closing normal or left-hand contacts. Current flowing in the opposite direction causes reverse or right-hand contacts to be closed. Relay OR thus responds to impulses of alternately opposite polarity delivered by the transformer RT when the line current is varied by the operation of a station transmitter relay T, such as is shown in Fig. 2a. Indication codes are transmitted by operating relay T to connect the line wires together periodically through an impedance of relatively low value, in comparison with the normal impedance of the line circuit. This low impedance comprises the coils of a low pass filter LPF, similar to the one at the office, which is interposed between the line and station apparatus.

At each field station, as shown in Fig. 2a, a high resistance line relay R is connected across the line wires Y and Z in series with a resistor R3, the connection normally including back contacts b and d of a master relay M and the coils of the low pass filter LPF. The station line relays R are of the biased type and are normally energized in parallel by current supplied by the office line battery 77. Each relay R closes its left-hand or normal contacts a and b, as shown, when its left-hand terminal is positive, and closes its right-hand or reverse contacts a and b when energized in the reverse direction with its right-hand terminal positive, or when deenergized. In other words, when the current flow through the winding of the relay R is in the direction of the arrow, the relay armature is operated to close its normal contacts, the left-hand contacts as shown. When the current flow through the relay winding is in the direction opposite to the arrow, or when no current is flowing, the relay armature is biased to operate to its right-hand or reverse position closing reverse contacts. The connection of the station apparatus to the line wires Y and Z is controlled by a fault relay RPP in a manner hereinafter pointed out, but as this relay is not involved in the normal operation of the system, it may be assumed for the present to remain in its normal energized position as shown.

The system of my invention is arranged to employ codes which have normally 16 steps when transmitting to or receiving from the usual field station which requires only such a standard or normal length code. The system is arranged, however, for the codes to be extended as required at field stations which require additional control or indication steps to transmit all the necessary functions. The codes may also be shortened to less than 16 steps, as will be explained hereinafter.

In each control code delivered by the office transmitter relay OT, the line circuit is open during each odd numbered step and closed during each even numbered step. More particularly, the office coding unit is placed in condition to transmit a control code by energizing the master relay OM of Fig. 1a, which completes circuits for effecting the periodic operation of the associated transmitter relay OT to open and close the line circuit to operate the line relays R at all stations in unison, both the open and closed periods constituting code elements.

When the line circuit is opened to begin the first element of a code, each line relay R releases and its reverse contact b completes a circuit from the positive terminal B of a suitable local source of direct current energy over wire 174, back contact d of relay CS, wire 175, back contact a of relay 2L, back contact d of relay LBP, and the winding of relay 1L to the negative terminal N of the direct current source. The armature of relay 1L then picks up and its front contact a completes a circuit from terminal B, at the reverse contact b of relay R, over part of the just described circuit through the winding of relay 2L to terminal N so that the armature of relay 2L picks up, completing an obvious stick circuit at its own front contact a. The pickup of relay 2L also completes a circuit from terminal B over front contacts c of relays 1L and 2L and through the winding of relay LP to terminal N. The resulting pickup of the armature of relay LP in turn completes an obvious circuit over its front contact a to energize the relays LB and LBP, the armatures of which then pick up. Relay LBP becomes energized in tandem with relay LB when front contact a of the latter relay is closed so that these relays release successively after relay LP is released.

When the armature of relay 2L picks up on the first step of a code, its contacts a and d shift the connections to the winding of relay 1L from the reverse to the normal contact b of relay R, and then the front contact d of relay LBP is closed to maintain the latter connection until the code is terminated. It follows that relays 1L and 2L are then energized alternately, relay 1L over the normal contact b of relay R, and relay 2L over the reverse contact b of relay R, in response to the periodic operation of the armature of relay R. Relays 1L and 2L remain picked up for the duration of short code elements, relay 1L releasing during each odd numbered long element and relay 2L during each even numbered long element. These relays serve, therefore, to indicate code character in a received code and, together with the relay LP, serve to control the length of the long steps of a code generated by the associated transmitter relay T. Relay LB and its repeater relay LBP are bridging relays and each maintains its front contacts closed for the duration of a code and serves to prepare various local circuits when the code operation of relay R begins and to open them when it ceases.

The office line relay OR, shown on Fig. 1a, controls a similar group of timing relays O1L, O2L, OLP, OLB and OLBP. These relays function in a manner similar to that just described for the field station. Relay OR, however, is normally deenergized and, as a magnetic stick type relay, is adapted to hold its contacts in either position to which it is operated by a momentary impulse. Hence, it may become accidentally reversed. If this occurs, relay OR is restored automatically to normal by the action of the timing relays in a manner hereinafter explained. It may therefore be assumed that relay OR, although deenergized, occupies its normal position corresponding to that of the normally energized station line relay R when the system is at its normal, at-rest condition, that is, no code being transmitted in either direction.

When receiving indication codes, relay OR is operated by impulses of alternately opposite polarity delivered by the transformer RT. During the transmission of control codes, the master relay OM, Fig. 1a, is held energized and its contact c both short circuits the secondary of transformer RT and disconnects it from relay OR, the relay OR being then operated locally by the transmitter relay OT. When relay OM picks up, relay OR becomes energized in the normal direction, as shown, over the circuit from the midpoint terminal O of the local battery 78, through the lower winding of the relay, back contact e of relay OT, and front contact e of relay OM to the negative terminal N of the local battery source. Relay OT becomes energized over front contact d of relay OM and is then controlled over wires 68, 61, and 62, in a manner hereinafter explained, to generate the code. Each time relay OT picks up it opens the line circuit at its back contacts b and d to release the line relays R at the stations and connects line wire Y to line wire Z over the corresponding front contacts through a resistor R4 to discharge the line charging current. This latter action is especially desirable when the line or any portion of the line is in a cable. At the same time, relay OT causes the armature of relay OR to be operated to its reverse position by current flowing through the circuit extending from positive terminal B over front contact e of relay OT, and through the lower winding of relay OR in a direction opposite the arrow to terminal O. Each time relay OT releases its armature, it closes the line circuit to move normal the armatures of the line relays R, and at the same time operates the armature of relay OR to normal by completing the circuit, at its back contact e, extending from terminal O of the local source through the winding of relay OR and over front contact e of relay OM to terminal N. The armature of relay OR thus operates in unison with the armatures of the relays R during the transmission of control codes.

Each line relay controls two chains of counting relays over circuits generally similar to those of the aforementioned Patent No. 2,411,375. Thus the relay OR, by means of its contact a, controls the primary counting chain relays O1 to O7, of Fig. 1b, and, in order, the secondary counting chain relays O8 of Fig. 1b, 16 and 24 of Fig. 1c and OCS of Fig. 1b. Each relay R controls similar counting chains, such as the primary counting relays 1 to 7 of Fig. 2b, and the secondary counting relays 8 and CS of Fig. 2b, and CE1 and CE2 of Fig. 2d. As will be explained during the following description, the relays of the secondary counting chain are used in order to count the successive cycles of operation of the primary counting chain and to establish circuits to turn back the coding action to reuse the primary chain for the succeeding cycle.

It is to be understood, although only four relays are here listed, the number of relays in the secondary counting chain, as used in my invention, is variable. Only the relays O8 and OCS at the office and the relays 8 and CS at a station are fixed, that is, required in every case, since they are first and final relays, respectively, of the chain. The number of other or intermediate relays at a station varies according to the maximum number of code steps required for either the corresponding control or indication code, as will be explained later. The number of such relays at the office must match the largest number at any station on the line circuit.

It will also be noted, however, during the following description, that at the end of the first cycle of operation, both the relay O8 and a chain repeat relay OCR, at the office, or relay 8 and a relay CR at the selected station, are picked up. The chain repeat relays are necessary, as will become apparent from later description, because of various associated actions which occur on the eighth step. Also, the chain repeat relay is held up during the remainder of the code to condition other circuits to energize the rest of the relays of the secondary counting chain and to aid in turning back the coding action for additional repeat cycles.

Referring now to Figs. 2a and 2b, it will be seen that a pickup circuit for relay 1 is closed momentarily in response to the first of a series of operations of the relay R. This pickup circuit extends from terminal B at the reverse contact a of relay R over wire 171, back contact e of relay CS, wire 172, back contact b of relay LBP, front contact g of relay 1L, resistor R7, wire 121, and through the winding of relay 1 to terminal N. Relay 1 therefore picks up on the first step of a code upon the energization of relay 1L. When relay LBP picks up, opening of its back contact b interrupts the circuit just traced and in turn closes a stick circuit for the relay 1. This stick circuit extends from the terminal B at reverse contact a of relay R over wire 171, back contact e of relay CS, wire 172, front contact b of relay LBP, through resistor R8, wire 129, back contact b of relay 2, and front contact a and the winding of relay 1 to terminal N. When relay R is operated to its normal position to begin a second step of the code, terminal B is disconnected from relay 1 which, however, remains picked up due to the discharge path provided by the half-wave rectifier connected to wire 129.

A circuit is now closed from terminal B at the normal contact a of relay R over front contact e of relay LBP, resistor R9, wire 130, back contact a of relay 8, wire 205, back contacts a of the relays CE1 and CE2, respectively, wire 200, front contact b of relay 1, through the winding of relay 2 to terminal N. Relay 2 therefore picks up and completes its stick circuit extending to terminal B, at wire 130, over its own front contact a and back contact b of relay 3. The operation of contact b of relay 2 disconnects relay 1 from the half-wave rectifier and closes a second discharge path for relay 1 through the winding of relay 3. Therefore, relay 1 releases shortly after relay 2 picks up but without sparking at its contact a, the dropping of which connects relay 3 to wire 129 to condition that relay to respond to the third step of the code. The third step begins when relay R is again operated reverse, closing its reverse contact a to place energy on wire 129 over a circuit previously traced as part of the stick circuit for relay 1. This circuit is extended over back contact a of relay 1 and front contact b of relay 2 through the winding of relay 3 to terminal N. Relay 3 thus picks up.

Relays 4 to 8, inclusive, are similarly controlled, one at a time, by current supplied alternately over wires 129 and 130 in response to the fourth to eighth steps, inclusive, of the code. If the various operations associated with these code steps, as hereinafter described, are properly carried out, a chain repeat relay CR is picked up on the eighth step. This prepares a pickup circuit for relay 1 over front contact b of relay 8 so that relay 1 will operate as the next in order after relay 8, this pickup circuit also including front contact g of the relay CR and back contact a of the relay 7. Relays 1 to 7, inclusive, are then operated through a second cycle on the ninth to the fifteenth steps of the code.

On the sixteenth step of the code, the next relay of the secondary counting chain, the relay CE1, is energized in place of the relay 8. This pickup circuit for the relay CE1 extends from terminal B at wire 130 over back contact a of relay 6, front contact b of relay 7, front contact h of relay CR, back contact g of relay 8, wire 204, and thence over the back contacts k of all of the D and MSP relays in the various extension units through the winding of relay CE1 to terminal N. When the relay CE1 picks up, a stick circuit is completed, over its own front contact a, extending from wire 130 over back contact b of relay 1, wire 200, and back contact a of relay CE2.

When relay CE1 closes its front contacts, a circuit is prepared for the energization of the relay 1 again on the seventeenth step of the code. This circuit extends from wire 129 over front contact g of relay CR, back contact a of relay 7, back contact b of relay 8, wire 207, front contact b of relay C1E, front contact j of relay D1, also closed at this time, wire 206, through the winding of relay 1 to terminal N. Relays 1 to 7, inclusive, are again operated through a third cycle on the seventeenth to twenty-third steps of the code. It should be noted that the stick circuit for relay 7 in each of the first three cycles of operation includes a back contact b of each of the relays 8, CE1, and CE2, these contacts being connected by wires 208 and 207, respectively. As the proper one of these relays is picked up on the various cycles of operation, the discharge path for relay 7 is connected to the winding of relay 1 over wire 206. This allows relay 7 to release shortly after any of the relays 8, CE1, and CE2 pick up to complete a cycle of operation of the primary counting chain.

On the twenty-fourth step of the code, the relay CE2, the third relay in the secondary counting chain, is energized. This relay is energized from terminal B over a previously described circuit to wire 204, then over front contact m of relay D1 through the winding of relay CE2 to terminal N. Again, a stick circuit is completed when the relay CE2 picks up over its own front contact a from energy on wire 200. Also, the pickup of CE2 completes a circuit from wire 207 over back contact b of relay CE1, front contact b of relay CE2, and front contact j of relay D2 to wire 206 to again energize the relay 1 on the twenty-fifth step of the code.

The coding operation of the unit at the field station will continue until, as hereinafter described, the relay OR at the office remains normal so that the field relay R also remains with its normal contacts closed. At this time the apparatus is restored to its normal at-rest condition. It is not necessary when the field station is receiving a control code for the final relay of the secondary counting chain, the code stopping relay CS, to be energized, as the apparatus will reset without operation of this relay. The operation of the relay CS to terminate the transmission of an indication code from the field station will be hereinafter described.

Referring now to Figs. 1a, 1b and 1c, it will be seen that the office counting chain circuits are similar to those just described for the field station. The relay O1 receives energy on the first step of the code over the wire 81 and picks up. The remaining relays O2 to O8 are operated one at a time by the current supplied alternately over wires 19 and 20 in response to the periodic operation of the relay OR. The office chain repeat relay OCR is energized and picked up on the eighth step of the code to prepare circuits for again energizing relay O1 on the ninth step to initiate a repeat cycle of operation of the relays O1 to O7. Relay OCR also prepares circuits to later energize the relays 16 and 24, and to make these relays effective in causing other repeat cycles of operation. In the office unit, the relays 16 and 24 take the place of the relays CE1 and CE2 at the field station. These relays operate on the sixteenth and twenty-fourth steps of the code, respectively, to prepare circuits to cause the primary counting chain relays O1 to O7, inclusive, to repeat their cycle.

At the office, however, it is necessary for the final relay of the secondary counting chain, the relay OCS, to be energized and picked up on the final step of each code, both when the office is transmitting a control code and when receiving an indication code. A master relay repeater, the relay OMP, is provided for this purpose. As will be hereinafter described, circuits are completed over front contacts *h* of the relays O1, O3, or O5, or front contact *b* of relay O7, front or back contacts of the relay OMP, depending on whether it is a control or indication code, respectively, and front contacts of the station selection relays to energize the relay OCS on the final step of any code. The picking up of the relay OCS and opening of its back contact *e* interrupts the holding circuit for the master relay OM. Release of this relay causes a control code to be terminated. During an indication code the opening of back contact *c* of relay OCS releases the relay PC which causes the entire system to reset. More detailed explanation of this action will be given hereinafter.

I shall now describe the transmission of a control code step-by-step by the office apparatus of Figs. 1*a*, 1*b*, 1*c* and 1*d*.

To initiate a control code, the operator momentarily presses a starting button 234STB, shown on Fig. 1*d*, identifying the control panel associated with the station storage unit to which the code is to be transmitted, to thereby pick up a starting relay such as the relay 234ST. The circuit for energizing relay 234ST may be traced from terminal B at the now closed contact *a* of the starting button 234STB over wire 67, through the winding of the relay 234ST, and over the normally closed contact of the cancel button CB to terminal N. The need and use of the cancel button CB will be described shortly. The relay 234ST is held energized by a stick circuit extending from terminal B at the back contact *k* of an associated panel selector relay, such as the relay 234S, over the front contact *a* of the 234ST relay, and through the winding of the relay to terminal N at the contact of the cancel button CB. This holds the ST relay energized until the desired selection has been effected.

Wire 47, in Fig. 1*c*, is normally connected over back contacts of various selecting relays E, F and G to branch circuits extending to contact *b* of the starting relay ST of each panel. The closing of front contact *b* of relay 234ST therefore extends the connection from terminal B at that contact over a particular branch which, as shown, includes back contacts *g* of the relays 23G, 2F and E to wire 47. If the system is in its normal, at-rest condition so that relays O1L and O2L are released, a circuit is completed continuing over wire 47 and the back contacts *b* of the relays O1L and O2L through the winding of relay OM to wire 17, and then to terminal N at the normally closed contact of the cancel button CB. Relay OM therefore picks up in response to operation of any starting relay, such as relay 234ST.

The previously mentioned cancel button CB is provided to permit the immediate correction of an error by the operator of the machine. Operation of the cancel button CB disconnects the terminal N from any energized ST relay and this relay will then release. The apparatus then resets and allows the operator to correct his obvious error and start the coding action over again by operation of the associated starting button STB. Since the connection of the relay OM to terminal N of the source is also carried over the cancel button by wire 17, operation of the cancel button at any time in the code causes an interruption of the control code and a resetting of the apparatus. Also, since all ST relays are carried to terminal N over the same cancel button, the entire office apparatus will be reset by operation of the cancel button CB cancelling all code action and releasing all stored start relays.

The pickup of the relay OM completes a pulsing circuit for the office transmitter relay OT which extends from terminal B at back contact *e* of relay OCS over back contacts *g* of the relays O7, O5, O3, and O1, respectively, wire 68, front contact *d* of relay OM, and through the winding of relay OT and the resistors R5 and R6 to terminal N. Relay OT therefore picks up to begin the first step of the code, its back contacts *b* and *d* opening the line circuit to release the station line relays R, and its front contact *e* completing a circuit, previously traced, for operating relay OR to its reverse position. Operation of relay OR energizes the timing relay chain OL and the first counting relay O1, as already described. When relay OLB picks up, its front contact *c* completes a stick circuit for the relay OM, extending from terminal B at back contact *e* of relay OCS over wire 18, front contacts *c* of relays OLB and OLBP, in multiple, front contact *a* and the winding of relay OM, and thence over wire 17 to terminal N at the cancel button CB.

The first step of each control code is a long step to distinguish it from an indication code in which the first step is relatively short. When relay O1 picks up on the first step, its back contact *g* opens the pulsing circuit for relay OT but this relay is held energized over a branch circuit to generate a long code step. The branch circuit for holding the relay OT energized may be traced from terminal B, at back contact *g* of the relay O2, over front contact *c* of relay O1, back contact *d* of relay SP, wire 71, front contacts *e* of relay O1L and *b* of relay OLP, in multiple, wire 70, back contact *e* of relay SP, wire 68, front contact *d* of relay OM, and thence through the winding and front contact *c* of relay OT and resistor R6 to terminal N. Relays O1L and OLP then release successively, the opening of front contact *b* of relay OLP disconnecting terminal B from wire 68 which causes the relay OT to release. Release of relay OT closes the line circuit, energizing the line relays R, and operates relay OR to the normal position to begin the second step of the code. Relay OR operating to its normal position causes relay O2 to pick up and relay O1 to release, as previously described.

The closing of back contact *g* of relay O1 during the second step completes the pulsing circuit for relay OT over wire 68, this pulsing circuit functioning repeatedly to generate the short steps of the code. The pickup time of relay OT depends upon the time constant of the circuit including its winding and the resistors R5 and R6. When relay OT picks up, its front contact *c* short circuits resistor R5 so that the energization of relay OT rises quickly to a higher value than would otherwise be the case, consequently providing a more constant release period under conditions of variable voltage. Its release period, it will be noted, is determined by the time constant of the circuit including its winding and the resistor R6 only. It follows that its pickup and release periods may be adjusted independently.

Wires 61 and 62 provide connections, described hereinafter in detail, for holding the relay OT picked up or released to generate the remaining long steps of the code. Energy from terminal B is supplied over wire 61 to the right-hand terminal of the winding of relay OT over its own front contact *a* to hold this relay picked up after its pulsing circuit opens and thus generate long odd-numbered steps. Energy supplied from terminal B over wire 62, front contact *f* of the relay OM, and back contact *c* of the relay OT to the left-hand terminal of the winding of relay OT is effective to short circuit this winding and thereby hold relay OT released after its normal pulsing circuit closes, thus generating long even-numbered steps. During the code steps 2 to 8, inclusive, the supply of energy from terminal B to wires 61 and 62 is controlled over contacts of the station selection relays and will be described shortly. During the eighth step, the relay OCR, to be discussed hereafter, picks up and thereafter the control of energy from terminal B to the wires 61 and 62 is over contacts of the relays O1L, O2L and OLP, and the length of the code step is determined by the release time of the relay OLP.

The second to eighth steps of each code may be arranged in any one of thirty-five different combinations of three long and four short steps to form distinctive station code calls which are identified by three digit numbers in which the digits represent the long steps of the code call.

Thus the number 234 assigned to the panel group of Fig. 1d and the corresponding station storage unit of Fig. 2 is one in which the second, third and fourth steps of the code are long, and the fifth to eighth steps are short. The code calls are generated by completing connections from terminal B at front contact b of the office starting relays ST to wires 61 and 62, these being arranged so that when a plurality of starting relays are energized their respective codes will be transmitted one at a time in a given order of code superiority. When the office is transmitting, a long element takes precedence over a short one on each step. That is to say, during control codes, 234 is the most superior code call, 235 the next, and so on, 678 being the most inferior.

The selection of the office panel containing an energized relay ST is effected by the energization of an entry relay E, shown in Fig. 1c, in response to the first element of the code, followed by the energization of three relays in sequence by the three long elements of the code call. These three relays comprise a first selector relay F, a group selector relay G, and a station selector relay S, these relays being identified more particularly by prefixes designating the code elements by which their operation is effected. For example, relay 2F is responsive to the second element, relay 23G to the third provided relay 2F has been operated, and relay 234S to the fourth provided relay 23G has been operated. When used to capacity the system will employ five F relays, fifteen G relays, and thirty-five S relays, arranged generally as shown in Figs. 2, 3 and 4 of Letters Patent of the United States No. 2,229,249, issued January 21, 1941, to L. V. Lewis, for a Remote Control System. Since the relation of these relays one to another and the connections for associating the different panels with the coding units may be ascertained from the aforementioned patent, for simplicity I have shown the circuits herein in condensed form, showing the circuits in detail for only one panel and for only one selecting relay of each kind.

Relay E is picked up on the first step of each code over a circuit extending from terminal B at contact a of relay OLBP in Fig. 1a over wire 60, back contact a of relay SP, front contact d of relay O1, wire 21, through the winding of relay E to terminal N. Relay E then completes a stick circuit at its front contact a extending over back contact m of relay 2F, and over back contacts of relays 3F to 6F, if provided, to wire 29, and thence over resistor R13, back contact a of relay SP, and wire 60 to terminal B at front contact a of relay OLBP.

It is to be understood that each of the branch circuits extending from terminal B at front contact b of a starting relay ST to wire 47 identifies a corresponding code call, as indicated by the references 234ST to 238ST, inclusive, adjacent contacts g to k of relay 23G. When relay E picks up, these branches are all disconnected from wire 47 and divided into groups by contacts g to k of relay E and connected to wires 32 to 36 to prepare circuits for generating the first digits of the code call.

When relay O2 picks up on the second step, a circuit is completed for holding relay OT in its released position. This circuit may be traced from terminal B at the front contact b of relay 234ST in Fig. 1c, over back contacts g of relays 23G and 2F, front contact g of relay E, wire 32, front contact c of relay O2, and back contact f of relay OCR to wire 62, and thence over a previously traced circuit to the left-hand terminal of the winding of relay OT, thereby short-circuiting this winding and holding the relay OT released to generate a long second step. Relays O2L and OLP then release, completing a circuit from terminal B at front contact a of relay OLBP, over wire 60, back contact a of relay OCR, wire 58, back contacts d of the relays OLP and O2L, wire 64, back contacts d of relays OCR and OCD, front contact d of relay O2, wire 22, front contact b of relay E, through the winding of relay 2F to terminal N. Relay 2F picks up, its front contact a completing its stick circuit extending over back contacts a of relay 23G and the other G relays of the same group, such as the relays 24G to 27G, if provided, to wire 29, and thence over a previously traced circuit including wire 60 to terminal B.

When relay 2F picks up, the branch circuits extending from wire 32 to terminal B over contacts of those starting relays which have the number 2 as the first digit of their code calls are disconnected from wire 32 and divided into groups by contacts g to k of relay 2F and connected to wires 33 and 37 to prepare circuits for generating the second digit of the code call. Interruption of the connection to wire 62 by the opening of back contact g of relay 2F allows relay OT to pick up to begin the third step.

Relay E is released by the opening of back contact m of relay 2F and the resultant opening of front contacts h to k, inclusive, of relay E disconnects the branch circuits for generating code calls in which the first digit is 3, 4, 5, or 6.

Each of the relays E, F and G, and certain other relays hereinafter described, are provided with a discharge circuit including a resistor in lieu of the usual half-wave rectifier. These resistors, which are of a relatively high value in comparison with the resistance of the relay winding, provide a slight degree of retardation in accordance with the circuit requirements, and also serve to prevent contact sparking.

When relay O3 picks up, a circuit is completed to retain the relay OT in its energized position to generate a long step. This circuit may be traced again from terminal B at front contact b of the 234ST relay over back contact g of relay 23G, front contact g of relay 2F, wire 33, front contact c of relay O3, back contact e of relay OCR, and thence over wire 61 in a circuit previously described to the right-hand terminal of the winding of relay OT. Relays O1L and OLP then release, completing a circuit from terminal B at front contact a of relay OLBP, over wire 60, back contact a of relay OCR, wire 58, back contacts d of relays OLP and O1L, wire 63, back contacts b of relays OCR and OCD, front contact d of relay O3, wire 23, front contact b of 2F, and through the winding of relay 23G to terminal N. Relay 23G thus picks up, its front contact a completing a stick circuit for this relay extending over back contacts a of the associated G relays in series to wire 29, and thence to terminal B over a previously traced circuit.

When relay 23G picks up, the branch circuits extending from wire 33 to terminal B over the contacts of those starting relays which have 23 as the first two digits of their code calls are disconnected from wire 33 and divided into branches by contacts g to k of relay 23G and connected to wires 34 to 38 to prepare circuits for generating the third digit of the calls 234 to 238, respectively. The interruption of the connection to wire 33 by opening of back contact g of relay 23G allows relay OT to release to begin the fourth step.

Relay 2F is released by the opening of back contact a of relay 23G. The opening of front contacts h to k of relay 2F disconnects the branch circuits which these contacts control, thereby limiting the control of the third digit to those starting relays of the group 234 to 238, inclusive.

When relay O4 picks up, the connection from terminal B at front contact b of relay 234ST over front contact g of relay 23G and wire 34 is extended over front contact e of relay O4, back contact f of relay OCR, and wire 62, as previously described, to hold relay OT released to generate the long fourth step of the code call 234. When relays O2L and OLP release, a circuit is completed from terminal B at front contact a of relay OLBP over wire 60, back contact a of relay OCR, wire 58, back contacts d of relays OLP and O2L, wire 64, back contacts d of relays OCR and OCD, front contact d of relay O4, wire 31, front contact b of relay 23G, through the winding of relay 234S to terminal N. Relay 234S then picks up. The closing of front contact *a* of this relay extends the connection from terminal B at its left-hand winding terminal over back contact *e* of relay 16 and wire 30, and thence through the winding of relay SP to terminal N, so that the relay SP also picks up. The pickup of the relay SP completes its stick circuit extending from wire 60 and over its own front contact *a* through the winding to terminal N. The closing of front contact *a* of the relay SP also completes a stick circuit for relay 234S extending from the front contact *a* of relay SP over wire 30, back contact *e* of relay 16, and front contact *a* of relay 234S through the relay winding to terminal N.

When relay SP picks up, the opening of its back contact *a* disconnects terminal B from wire 29, thereby releasing relay 23G. The opening of front contact *g* of relay 23G removes energy from wire 34, and thus from wire 62, so that relay OT picks up to end the fourth step and begin the fifth step.

It will be seen therefore that, at the end of the first long step, release of relay OT is controlled by the opening of a front contact of relay OLP. In the case of the first two long steps of a station code call, however, operation of relay OT is controlled by the opening of back contacts of the respective selecting relays, each of which picks up in response to the closing of a back contact of relay OLP. Thus these two long steps are of the same length and are slightly longer than the first step. The final step of a station code call is terminated, not by the pick up of the respective S relay, but by the release of the corresponding G relay. Since the G relay releases only after the S and SP relays, in cascade, have picked up, which occurs after relay OLP has released, the final long step of the station selection is longer than either of the first two. This is particularly necessary when this final step occurs on the eighth step of the code. If the final station selection step in that case was terminated by the pick-up of the S relay, sufficient time would not be available prior to the ninth step for completing the several other actions, to be described shortly, which occur on the eighth step. It also follows that these long steps of the station code call are slightly longer than the other long steps of the code which are terminated, as will hereinafter be described, in the same manner as the long first step.

The opening of front contacts *b* to *f* of relay 23G opens the pick-up circuits for relay 234S and other similar relays, 235S to 238S, of the same group, which are not shown. Relay 234S, however, remains energized over its previously described stick circuit. The opening of front contacts *h* to *k* of the relay 23G prevents the generation of long code elements on the fifth to eighth steps when front contacts *c* of the counting relays O5 to O8, inclusive, leading to wires 35 to 38, are successively closed.

The fifth to eighth steps are therefore short. Relay OT is controlled during these steps over its previously described pulsing circuit which is opened or closed at the respective back contacts *g* of the relays O5 and O7. When relay O8 picks up, a circuit is completed from terminal B at front contact *a* of relay OLBP over wire 60, front contact *h* of relay O8, front contact *b* of relay SP, through the winding of the office chain repeat relay OCR to terminal N. Relay OCR therefore picks up on the eighth step, completing a stick circuit over its own front contact *a* to wire 60. Since relay OLBP remains picked up during an entire code, it is obvious that relay OCR, once picked up, will hold up during the remainder of the code. In addition to preparing circuits as described in the following paragraph, relay OCR maintains circuits to permit the energizing, at the proper times, of the remaining relays in the secondary counting chain. A circuit is also held closed to permit the turning back of the coding action by the intermediate relays of the secondary counting chain to reuse the primary counting chain relays for successive repeat cycles as required.

The opening of back contact *a* of relay OCR disconnects the terminal B from wire 58 and hence from wires 63 and 64, as previously described. The closing of front contact *g* of relay OCR prepares a circuit from wire 19 extending over back contact *a* of relay O7, front contact *b* of relay O8, and back contact *b* of relay RCL, through the winding of relay O1 to terminal N. This allows relay O1 to be operated next in order after relay O8. The pick-up of relay OCR also, at its contacts *e* and *f*, transfers the control of wires 61 and 62 from the various station selecting relays to the front contacts *b* and *c* of the relay OLP over wires 70 and 72. The energy from terminal B to hold the relay OT energized or deenergized hereafter is provided, as will be described, over front contacts *f* of the various counting chain relays and wires 39 to 45 from the various control levers and push buttons on the control panel of the office machine.

When the selector relay 234S picks up, as previously described, its contact *k* transfers the stick circuit for the starting relay 234ST from a direct connection to terminal B to a circuit including wire 46 and extending from terminal B at back contact *f* of relay O8. It follows that the operated starting relay, such as relay 234ST, is released on the eighth step of the corresponding control code. During the reception of an indication code, relay O8 and the relay S of the selected panel are also energized as in the case of the control code described, but when receiving, relay OM is not energized and its back contact *g* provides a connection from terminal B to wire 46 to prevent the release of a stored starting relay, such as relay 234ST, in response to the operation of relay O8.

Steps 9 to 15 of the code have now been rendered available for the control of seven of the devices at the selected station in accordance with the positions of the control levers or push buttons of the corresponding panel, such as the one shown on the left in Fig. 1*d*. When relay 234S picks up, terminal B becomes connected over contacts *e* to *j* of this relay and wires 94 to 98, inclusive, to the lever and push button contacts, and thence to wires 39 to 45 leading to front contacts *f* of relays of O1 to O7. With relay OCR picked up, the front contacts of the odd-numbered counting chain relays provide connections over front contact *d* of relay SP, wire 71, front contacts *e* and *b* in multiple, of relays O1L and OLP, respectively, wire 70, front contact *e* of relay OCR, wire 61, and thence to the stick circuit for relay OT. Relay OT may thus be held energized until relays O1L and OLP release, thereby generating long odd-numbered code elements. The *f* contacts of the even-numbered counting chain relays provide connections over wire 73, front contact *c* of relay O2L and front contact *c* of relay OLP in multiple, wire 72, and front contact *f* of relay OCR to wire 62, and thence to the left-hand terminal of the winding of relay OT, as previously described. Thus the relay OT may be held released until relays O2L and OLP release, thereby generating long even-numbered code elements. These circuits are obviously available only during the second and succeeding cycles of operation of the primary counting relay chain.

Before describing the control by the various levers and push buttons on the coding action in the office, let us assume a set of conditions that the operator of the machine desires to accomplish. Referring to the outline of the trackway at the field station as shown in the top of Fig. 2*e*, we shall define that a train moving from right to left through the track arrangement is a westbound train and conversely, that a train moving from left to right is an eastbound train. Let us assume then that a westbound train is approaching this interlocking arrangement on track section 8AT and that the operator desires to move this train through the crossover to track section 2AT. This will require that the switches 1W and 1WA be reversed and that the signals 4LA and 4LB, in some combination, display a proceed indication for the movement. In addition, the traffic direction in the section 2AT will have to be established in a westbound direction. At the same time, we shall assume that a westbound train is approaching on track section 6AT but that the dispatcher desires to hold this train at signal 2L so that this signal must remain in its stop position. At the same time, an eastbound train is approaching on track section 4AT and the dispatcher desires to move this train through switch 3W reversed to the track section 10AT. This will require that the signal 6R be cleared to display a proceed indication for this train and that the switch 3W be moved to its reverse position.

Referring now to the top portion of Fig. 1d, there is illustrated the corresponding two or more panel sections of the control machine at the office including the track diagram with track occupancy lights. The operator, to accomplish the desired moves of the trains through this interlocking arrangement, places the switch control lever 1SW in its right-hand or reverse position, that is, the position opposite to that illustrated in the drawing. The switch control lever 3SW will also be placed in its reverse or right-hand position. The signal control lever 4SG will be moved to its left position to clear the westbound signal. The signal control lever 6SG will be moved by the operator to its right position to control an eastbound signal. The traffic control button 2FB will be placed so that its contact a is in the closed position. The signal control lever 2SG will remain in its center position to hold the signal 2L at stop, and the operator will take no action with the traffic control buttons 4FB and 8FB for this particular movement. Also, the maintainer's call button MCB and the switch heater control button WZB will remain with their contacts in the open position, as shown.

Having completed the necessary operations of the switch and signal control levers and the various traffic control push buttons, the operator then pushes the spring return start button 234STB. In our previous description we have shown what coding action occurred during the first eight steps after the operator has pushed the start button 234STB to close its contact a momentarily. On the next or ninth step of the control code, however, since the switch control lever 1SW is in its right-hand position, no battery is applied to wire 39, so that no energy is available over wire 61 to hold the relay OT in its energized position. Thus the step 9 in this control code is short. However, since the traffic control button 2FB has been operated to close its contact a energy is supplied during the tenth step to hold down the relay OT. This circuit may be traced from terminal B at front contact f of relay 234S over wire 95, contact a of control button 2FB in its closed position, wire 40, front contact f of relay O2, wire 73, front contacts c in multiple of relays O2L and OLP, wire 72, front contact f of relay OCR, and wire 62 through the hold-down circuit previously traced to the left-hand terminal of the winding of relay OT. The relay OT is thus held in its released position to generate a long step in the code. Relays O2L and OLP release successively and interrupt the last described circuit at front contact c of relay OLP, permitting the relay OT to pick up to end the tenth step of the control code.

Since the switch control lever 1SW is in its right-hand position, a circuit is closed to supply energy to the stick circuit for relay OT during the eleventh step of the code. This circuit may be traced from terminal B at front contact e of relay 234S over wire 94, the right-hand terminal of switch control lever 1SW, wire 41, front contact f of relay O3, front contact d of relay SP, wire 71, front contact e of relay O1L and front contact b of relay OLP in multiple, wire 70, front contact e of relay OCR, wire 61, and front contact a of relay OT to the right-hand terminal of the winding of relay OT. This relay is thus held in its picked-up position to generate a long step in the code. Relays O1L and OLP release successively and the stick circuit just described is interrupted at front contact b of the relay OLP so that the relay OT is permitted to release to end the eleventh step of the control code.

Since the push buttons 8FB and MCB have their contacts open and the signal control lever 2SG is in its center position, no circuits are completed to connect terminal B to the wires 42 to 45, inclusive, during the twelfth to fifteenth steps of the code. Thus these steps of this code are short. The operation of the relay OT during these steps is controlled over the previously described pulsing circuit.

In the present C. T. C. systems in general use, in order to transmit the remaining control functions required to position the various devices at the field station to permit the desired movements of the trains, it would be necessary to transmit one or more additional complete control codes, each consisting of sixteen steps and each with a separate station selection code call. In my invention, however, these additional control functions may be transmitted by causing the second cycle of the counting chain operation to be repeated as many times as required to transmit all of the desired functions.

In order to permit use of the relays O1 to O7 in a repeat cycle of the counting chain as code steps 17 to 23, inclusive, a relay 16, shown on Fig. 1c, is provided to operate during the sixteenth step of the code to prepare circuits for the repeat action of the counting chain. The relay 16 thus operates on the sixteenth code step in a manner similar to the operation of the relay O8 on the eighth code step.

Before describing the operation of the relay 16, attention is directed to two other relays, both shown in Fig. 1c, which are necessary in providing the repeat action of the counting chain. A master repeater relay OMP is energized during the first step of the control code by a circuit traced from terminal B at front contact g of relay OM over wire 83 through the winding of relay OMP to terminal N. Thus the relay OMP remains picked up during the entire control code since it repeats the operation of the master relay OM. An indication reset relay KR is also energized during the first step of the code. The circuit for this relay may be traced from terminal B at front contact e of relay OLBP, shown in Fig. 1a, over wire 82, back contacts j of relays 24 and 16, respectively, through the winding of relay KR to terminal N. This relay is of the slow release type and for reasons appearing shortly, additional retardation is effected by a half-wave rectifier.

The circuit for energizing the relay 16 during the sixteenth step of the code may be traced from terminal B at normal contact a of relay OR over resistor R12, front contact d of relay OLBP, wire 20, back contact a of relay O6, front contact b of relay O7, front contact h of relay OCR, back contact g of relay O8, wire 87, front contact d of relay OMP, an adjustable connection, and front contact c of relay 234S through the winding of relay 16 to terminal N. When relay 16 picks up, it completes a stick circuit over its front contact a traced over back contact a of relay 24, wire 91, and back contact b of relay O1 to wire 20. Although the sixteenth step is not available for carrying a control function, the step is made long, to supply sufficient time for required relay action, by holding down the relay OT in the manner previously described. Energy is supplied for this purpose in a circuit traced from terminal B at front contact h of relay 16 over wire 92 and wire 73 to the circuit previously described for holding down the relay OT. When the relays O2L and OLP release successively, this circuit is interrupted and the relay OT is allowed to pick up to end the sixteenth step.

When relay 16 picks up, the stick circuit for relay 234S is interrupted by the opening of back contact e of relay 16. However, closing of front contact f of the relay 16 completes an auxiliary stick circuit which may be traced from terminal B at front contact a of relay KR over the front contact f of relay 16 and front contact a and the winding of relay 234S to terminal N.

The pick up of relay 16 also deenergizes the relay KR by interrupting its pickup circuit at back contact *j* of relay 16. However, relay KR was previously described as being a slow release relay, with its release further retarded by the action of the half-wave rectifier. Thus, relay KR holds up and sticks up relay 234S, for a sufficient time to allow the energization of the relay 234SA. The circuit for energizing relay 234SA may be traced from terminal B at front contact *a* of relay OLBP over wire 60, front contact *a* of relay SP, wire 30, front contact *e* of relay 16, front contact *m* of relay 234S, and through the winding of the relay 234SA to terminal N. The pickup of relay 234SA completes a stick circuit over its own front contact *a* and back contact *e* of relay 24 to wire 30. Shortly after relay 234SA is picked up, the relay KR releases and interrupts the auxiliary stick circuit for relay 234S which, thus deenergized, releases.

Release of the relay 234S interrupts the connection from terminal B over the wires 94 to 98 to the various levers and push buttons in the control panel at the left of Fig. 1*d*. The release of the relay 234S also interrupts the pickup circuit for relay 234SA but the latter relay remains picked up by energy over its stick circuit previously described.

When relay 234SA picked up, circuits were completed over its front contacts *e* to *j*, inclusive, to connect terminal B to wires 99 to 103, inclusive, to supply energy over a second group of levers and push buttons to the wires 39 to 45 to control the sticking up or the holding down of the relay OT during the code steps 17 to 23, inclusive. This action will be more completely described shortly.

Pick up of the relay 234SA also completes a circuit to allow the relay O1 to pick up as the next relay in the chain following the relay 16. This circuit may be traced from wire 19 over front contact *g* of relay OCR, back contact *a* of relay O7, back contact *b* of relay O8, wire 88, front contacts *g* and *k* of relays 16 and 234SA, respectively, wire 81, and through the winding of relay O1 to terminal N. When relay O1 is picked up on the seventeenth step of the code, the stick circuit for relay 16 is interrupted by the opening of back contact *b* of the relay O1, and since the pickup circuit had already been interrupted by the release of relay 234S, relay 16 releases. This reenergizes the relay KR, over the previously described circuit, when back contact *j* of relay 16 closes and the relay KR picks up. This action prepares circuits for a second repeat action of the counting chain if such is required.

After the relay O1 picks up, the cycle of operation of the primary counting chain through the relays O1 to O7 repeats in a manner similar to that already described. The code steps are long or short, depending upon the position of the control levers and push buttons in the control panel to supply energy to hold up or hold down the relay OT. In the present operation, the code steps 17 and 18 are short, as the circuits are not completed to connect terminal B to the wires 39 and 40, since it has been assumed that the switch control lever 3SW is in its right-hand position, opening the left-hand contact, and that the traffic control button 4FB is in its non-operated position as shown, with the contact *a* open. However, during the nineteenth step, a circuit is available for supplying energy to hold the relay OT in its picked-up position. This circuit may be traced from terminal B at front contact *e* of relay 234SA over wire 99, the right-hand contact of the switch control lever 3SW, wire 41, front contact *f* of relay O3, front contact *d* of relay SP, wire 71, front contact *e* of relay O1L and front contact *b* of relay OLP in multiple, wire 70, front contact *e* of relay OCR, wire 61, and over front contact *a* and the winding of relay OT to terminal N in the circuit previously described. Relay OT is thus held in its picked-up position to generate a long step in the code. The stick circuit just described is interrupted at front contact *b* of relay OLP when this relay finally releases and the relay OT is allowed to release to terminate the nineteenth step.

On the twentieth step of the code a circuit is completed to provide energy to hold down the relay OT to generate a long even-numbered step. This circuit may be traced from terminal B at contact *g* of relay 234SA over wire 101, the left-hand contact of control lever 4SG, wire 42, front contact *f* of relay O4 to wire 73, and thence over a circuit previously described to supply energy to the left-hand terminal of the winding of relay OT to hold this relay down. This circuit is eventually interrupted at the front contact *c* of relay OLP when this relay releases, and the relay OT then picks up to terminate the twentieth step of the code.

The twenty-first and twenty-second steps of the code are short since no circuit is completed to supply energy to wires 43 and 44. The twenty-third step of the code is again a long step since energy is supplied to wire 45 to hold the relay OT in its picked-up position, the right-hand contact of the lever 6SG being closed to connect battery to the wire 45 from terminal B at front contact *h* of relay 234SA over wire 102.

At the station shown in the drawings one more control step is required to transmit the function controlling the switch heaters at the field location of the switches. Thus it is necessary to provide additional steps in the code in a manner similar to that described for the seventeenth to twenty-third steps. On the twenty-fourth step of the code, then, the relay 24 is energized and picked up by energy supplied over wire 87 in a manner similar to that described when the relay 16 was picked up, with the exception that the connection from the front contact *d* of the relay OMP is over back contact *c* of relay 16, an adjustable connection, and front contact *c* of relay 234SA through the winding of relay 24 to terminal N. When relay 24 picks up, it completes a stick circuit from wire 20 over its own front contact *a*, back contact *b* of relay O1, and wire 91. As was the case with the sixteenth step, the twenty-fourth step of the code is also not available for the transmission of any function but it is made a long step in order to provide the time for necessary relay action. Energy from terminal B at front contact *h* of relay 24 is supplied over wires 92 and 73 to the hold-down circuit previously described for the relay OT, so that the relay OT will be held down to generate a long code step.

The back contact *c* of relay 16 is included in the pick up circuit for relay 24 to prevent the energization of this relay, and similar following relays, such as a relay 32, if required, during the latter portion of the sixteenth step. If it were not for the back contacts *c* and *d* of relay 16, energy would be supplied to relay 24, in multiple with the winding of relay 16, from the stick circuit of relay 16 after relay 234SA has picked up and before relay 234S has released. One circuit for this energy may be traced from the left-hand terminal of the winding of relay 16 over front contact *c* of relay 234S, the adjustable connections for relays 16 and 24, front contact *c* of relay 234SA, through the winding of relay 24 to terminal N. A second and parallel circuit includes front contacts *d* of relays 234S and 234SA. Similar circuits would exist for a relay 32. During the twenty-fourth step, back contacts *c* and *d* of relay 24 serve a similar purpose in preventing the energization of relay 32 and others if furnished.

When relay 24 picks up, opening of its back contact *e* interrupts the stick circuit for the relay 234SA, but, as was the case with the relay 234S, an auxiliary stick circuit is completed at the same time from terminal B at front contact *a* of relay KR over front contact *f* of relay 24 and front contact *a* of relay 234SA. Relay KR is also deenergized by the opening of back contact *j* of relay 24. Again, the retardation supplied to relay KR is sufficient to maintain its front contact *a* closed and the relay 234SA picked up until the relay 234SB can be energized and picked up by the circuit traced from wire 30 over front contact *e* of relay 24, front contact *m* of relay 234SA, through the winding of relay 234SB to terminal N. Upon picking up, relay 234SB completes a stick circuit for itself over its front contact *a* to wire 30.

Shortly after relay 234SB picks up, the relay KR releases and opens its front contact *a* to interrupt the stick circuit for the relay 234SA which then releases. Release of this relay interrupts the pickup circuit for the relay 24, but this relay remains picked up over its previously described stick circuit. The release of relay 234SA also opens, at its front contacts *e* to *j*, the circuits connecting terminal B to wires 99 to 103. The closing of front contact *k* of relay 234SB completes a circuit from wire 88 over back contact *g* of relay 16, front contact *g* of relay 24, front contact *k* of relay 234SB, wire 81, and through the winding of relay O1 to terminal N. This allows the relay O1 to be operated as the next relay in order after relay 24.

When the relay OLP releases to open the holddown circuit of the relay OT, thus permitting the relay OT to pick up to end the twenty-fourth step, the operation of the relay OR to its reverse position supplies energy from terminal B at reverse contact *a* of the relay OR over a circuit already described to pick up relay O1. The pick up of the relay O1 interrupts the stick circuit for relay 24 and this relay releases. Release of relay 24 with resultant closing of its back contact *j* once again energizes the relay KR which picks up. However, this relay will serve no further purpose in this coding operation. In the operation described, the twenty-fifth step of the code is a short element since no energy is supplied over wire 39 to hold up relay OT. This is due to the contact *a* of the push button WZB being open, although the front contact *g* of the relay 234SB is closed so that terminal B is connected to wire 104.

The apparatus is now prepared to repeat once again the remainder of the usual cycle of operation of the counting chain relays O1 to O7. However, since no further control functions are here required between the office and the selected field station, the code steps 26 to 31, inclusive, can serve no useful purpose. Therefore, I provide means in my invention to terminate this control code on the twenty-sixth step, eliminating the remaining six steps of the code. In other words, the coding action in any control code may be halted as soon as the code steps no longer serve a useful purpose. So that the resetting action of the system will occur during a line normal period, the stopping of the coding has been restricted to the even numbered steps. Since the final step is not available to transmit a function, the final step of a control code is then the first even numbered step after all the control functions have been transmitted. As will be described hereinafter, the ending of an indication code is similarly restricted.

To accomplish this object, circuits are provided, with adjustable connections, to energize a final relay in the secondary counting chain, the office code stopping relay OCS, in multiple with the even numbered primary counting chain relay which corresponds to the last step in the code. Use is also made of contacts of the final repeater of the station selection relay to select different final steps for the various stations. For the control code here being discussed, the relay OCS must pick up at the same time as the relay O2, that is, on the twenty-sixth step of the code. When the line relay OR operates to its normal position at the beginning of the twenty-sixth step, a circuit is completed from terminal B at normal contact *a* of the relay OR over resistor R12, front contact *d* of relay OLBP, wire 20, back contact *a* of relay O8, wire 90, back contacts *a* of relays 16 and 24, wire 91, front contact *h* of relay O1, wire 84, front contact *a* of relay OMP, thence through the adjustable connection, front contact *c* of relay 234SB, wire 80, front contact *j* of relay OCR, and the winding of relay OCS to terminal N. The relay OCS is thus energized and picks up. Although relay O2 also picks up in the usual manner, this action has no effect on the ending of the code.

When relay OCS picks up at the beginning of the twenty-sixth step, terminal B is disconnected from wires 68 and 18 at back contact *e* of relay OCS slightly before relay O7 releases to close its back contact *g* to complete the pulsing circuit to pick up relay OT. Consequently, relay OT remains released and relay OR remains normal. Relay OM also releases. With relay OR remaining normal, the timing relays O2L, OLP, OLB, OLBP and OIL release in that order. Relay OCS, which is held energized after relay O1 releases by a stick circuit from wire 20 including its own front contact *a*, wire 48, and front contact *b* of relay OLB, becomes deenergized upon the release of relay OLB and releases. Release of relay OLBP disconnects terminal B from wire 60, thereby releasing relays OCR, SP, and the operated selector relays such as 234SB. Whereupon the apparatus is in condition to receive a new code. If any other office starting relay has been picked up to store a control code, such code will be initiated upon the release of relay O1L, this relay being last to release. The twenty-sixth step thus corresponds to the return of the line circuit to its normal closed condition, and in case of the transmission of successive codes, represents a line closed step which is materially longer than any such step occurring within a code.

I shall now consider the operation of the station apparatus of Figs. 2a, 2b, 2c, 2d, 2e, and 2f in receiving the control code just described. It will be understood that the line relay R at each station and the timing relays 1L, 2L, LP, LB, and LBP operate in unison with the corresponding office relays. The counting relays at each station operate through the first eight steps in unison with the office counting relays, but only those at the selected station at which the station selector relay S is picked up are operated through their second and following cycles.

On the first step of the control code a code disagreement relay CD, to be used now as a delivery control means, is selectively operated in response to the release of relay 1L due to the long character of this step. The circuit may be traced from terminal B at front contact *a* of relay LBP over back contact *d* of relay 1L, wire 163, back contact *b* of relay CR, front contact *c* of relay 1, and through the upper winding of relay CD to terminal N. Relay CD picks up and completes a stick circuit, from terminal B at front contact *a* of relay LBP, over wire 160, and the front contact *a* and lower winding of relay CD to terminal N.

As shown in Fig. 2c, the station coding unit contains a set of three selector relays, F, G, and S, which may be adjustably connected to respond to any one of the thirty-five code calls, the connections as shown here being arranged so that the relay S is responsive to the code call 234. The circuits for these relays are generally similar to those for the office selecting relays already described. Circuits for the selector relays which respond on even-numbered steps extend from terminal B at front contact *a* of relay LBP, shown in Fig. 2a, over back contact *g* of relay 2L, wire 164, back contact *d* of relay CR, front contact *d* of relay CD, and thence over front contacts *d* of relays 2, 4, 6, and 8, to wires 122, 124, 126, and 128, respectively. As shown an adjustable connection to wire 122 provides a circuit for energizing relay F on the second step, relay F having a stick circuit extending to terminal B over its own front contact *a*, back contact *c* of relay G, wire 160, and front contact *a* of relay LBP. The circuits for the selector relays which respond on odd-numbered steps extend from terminal B, at front contact *a* of relay LBP, over back contact *d* of relay 1L, wire 163, back contact *b* of relay CR, front contact *b* of relay CD, and thence over front contacts *d* of relays 3, 5, and 7 to wires 123, 125, and 127, respectively. As shown, an adjustable connection to wire 123 provides a circuit over front contact *b* of relay F for energizing relay G on the third step. The stick circuit for relay G extends to terminal B at front contact *a* of relay LBP over its own front contact *a*, back contact *a* of relay S, and wire 160. Similarly, an adjustable connection to wire 124 provides a circuit over front contact *b* of relay G for energizing relay S on the fourth step. Relay S completes a stick circuit which is connected directly to wire 160 over its own front contact *a*.

It is to be noted that the various selecting relays F, G, and S are operated directly following the release of relay 1L or 2L when the apparatus is in the receiving condition as described, and consequently these relays are operated prior to the termination of the long step, thereby providing a margin to allow for variations in timing.

It is to be also understood that the relays F at the different locations may be connected to any of the wires 122 to 126, and the relays G to any of the wires 123 to 127 below the one to which the associated relay F is connected. It follows that, when the code call is 234, those relays F connected to wire 122 will respond to the second long step, those relays F and G connected to wire 123 will respond to the third long step, and those relays F and G connected to wire 124 will respond to the fourth long step, along with relay S at the selected station storage unit. However, the selection will be completed to pick up a relay S at one location only. At the other locations the counting relay operation terminates with the eighth step, and only the line relay R and the timing relays continue in operation through the remainder of the code.

At the selected station relay S prepares a pickup circuit, which is completed on the eighth step of the code, for a chain repeat relay CR. This circuit extends from terminal B at front contact *d* of relay S over wire 146, front contact *f* of relay 8, through the winding of relay CR to terminal N. When relay CR picks up, closing of its front contact *a* completes a stick circuit extending to terminal B over resistor R10 and wire 160. Also, closing of front contact *g* of relay CR completes a connection from wire 129 over back contact *a* of relay 7 and front contact *b* of relay 8 for effecting the operation of relay 1 next in order after relay 8. Thus the primary counting chain relays are ready to be used again, as previously described, to provide the code steps nine to fifteen. In addition, pick up of relay CR, by closing its front contact *h*, completes a connection over back contact *g* of relay 8 for energizing the various code extension relays CE, as are required at this station, in order on the sixteenth, twenty-fourth, thirty-second, etc. steps of a code. This action will be more completely described hereinafter.

Front contact *k* of relay CR, when closed, shunts a resistor R16 which is in the stick circuit for relay 8. The resistor R16 is inserted in the stick circuit for the relay 8 to reduce the energization of relay 8 at the stations at which the relay CR is not picked up. Since the relay CR is picked up only when the station selection relay S is picked up, this means that at all stations except the selected station, the relay 8 will release more quickly because of this reduced energization. If it were not for the resistor R16 it might be possible in cases where the ninth step of the code is also short for the relay 8 to be held up throughout the ninth step and reenergized over its front contact *a* when the relay 1 releases at the beginning of the tenth step and closes its back contact *b*. This would give a long eighth step at that particular station. As was explained hereinbefore, it is possible for the F and G relays at a station to be picked up without the S relay also being picked up if the two relays are connected to the wires representing long steps in the code. If the relay 8 being held up creates a false long step, it might result in station selection occurring, that is, the relay S being picked up, on the tenth step of the code. For example, the station 238 may be selected at the same time that the station 234 just described was selected. The counting chains at station 238 then would continue to follow the coding action, although two steps behind in the code. This would result in the operation of control functions in a manner and at a station not intended by the dispatcher. However, with the use of the resistor R16, the energization of the relay 8 is held at such a low level that the release of relay 8 during a short ninth step is assured at those stations at which the CR relay is not picked up.

The ninth to the fifteenth, seventeenth to the twenty-third, and other similar steps of the control code are employed for the control of a group of function control relays, mostly of the magnetic stick type, in accordance with the position of the corresponding office levers. The manner of operation of these magnetic stick relays when energized with one or the other terminal positive is similar to that already described for relay OR and will not be repeated. Figs. 2e and 2f show a typical arrangement of such relays including switch control relays WS, signal control relays LHS and RHS, and traffic direction control relays FS. These relays may be used then to control track switches and associated groups of signals shown in the track plan at the top of Fig. 2e.

It should be understood that the circuits by which the function control relays exercise control of the track switches and the signals form no part of my invention. These circuits may be similar to those described in connection with Figs. 8 and 9 of the previously mentioned Patent No. 2,229,249. For simplicity, the control arrangements are here indicated by dotted lines between the control relay and the apparatus it controls. It may be noted here that the circuits between the various track and wayside apparatus and the corresponding indication relays are also indicated by dotted lines. Two of the function control relays, the maintainer's call stick relay MCS and the switch heater stick relay WZS are not of the magnetic stick type but may be relays of the ordinary neutral type provided, as shown, with stick circuits. The control of these relays by the coding apparatus will be discussed hereinafter.

These stick relays are operated to normal or reverse or are picked up or released by impulses supplied by the coding unit over wires 149 to 155, inclusive, and are placed under the control of the station coding unit by operation of delivery relays D, D1, and D2. These relays are picked up on the ninth, sixteenth, and twenty-fourth steps of the control code, respectively, and each controls over its front contacts *a* to *g*, inclusive, a group of the function control stick relays, over the wires 209 to 215, 218 to 223, and 225 to 231, respectively. The relay D at the selected station is picked up when relay 8 releases, the circuit extending from terminal B at front contact *c* of relay CR over back contact *e* of relay 8, front contact *c* of relay CD, wire 182, front contact *g* of relay S, wire 183, back contacts *h* of relays D2 and D1, wire 184, through the winding of relay D to terminal N. Relay D thus will remain energized and picked up until relay D1 is picked up on the sixteenth step of the code in a manner to be described hereinafter. It will be noted that each D relay is energized over back contacts of the corresponding D relays following it in order of operation so that no more than one of the delivery relays may be picked up at one time.

Circuits suitable for operating the function control stick relays in accordance with the long or short character of the code steps nine to fifteen, seventeen to twenty-three, twenty-six to thirty-one, and other corresponding groups, are obtained by the operation of a pair of register relays P1 and P2, shown in Fig. 2a. The circuits for these relays are prepared by the closing of front contacts of relay CR. If relay 1L releases on any odd-numbered step of the groups aforementioned, a circuit is closed from terminal B at front contact $a$ of relay LBP over back contact $d$ of relay 1L, wire 163, front contact $b$ of relay CR, wire 180, and through the upper winding of relay P1 to terminal N. When relay P1 picks up, it is held energized for the duration of the next following even-numbered step over a stick circuit extending from terminal B at normal contact $a$ of relay R over front contact $e$ of relay LBP, and the front contact $a$ and lower winding of relay P1 to terminal N. Relay P1 releases when normal contact $a$ of relay R is opened at the beginning of the next odd-numbered step. Similarly, if relay 2L releases on any one of the even-numbered steps of the code groups previously mentioned, relay P2 is energized over the circuit including terminal B at front contact $a$ of relay LBP, back contact $g$ of relay 2L, wire 164, front contact $d$ of relay CR, wire 181, and the upper winding of relay P2 to terminal N. When relay P2 picks up, it is held energized for the duration of the next odd-numbered step during which relay R is reversed by a stick circuit extending from terminal B at reverse contact $a$ of relay R over wire 171, back contact $e$ of relay CS, wire 172, front contact $b$ of relay LBP, and front contact $a$ and lower winding of relay P2 to terminal N. Relay P2 releases when the reverse contact $a$ of relay R is opened at the beginning of the next even-numbered step.

The circuits which the contacts of relays P1 and P2 provide for the control of the stick relays are of a variety of types, one of which is illustrated by the circuits for the magnetic stick relay 1WS, which relay is controlled in accordance with the position of the switch lever 1SW of Fig. 1d. When lever 1SW is normal, the ninth step of the control code is long and the eleventh step short, and when lever 1SW is reversed, as was assumed during the previous description of the transmission of the control code, the ninth step is short and the eleventh step long. When lever 1SW is normal, relay P1 is picked up on the ninth step. Then, when relay R is operated to normal to begin the tenth step, its contact $a$ connects terminal B to the stick circuit for relay P1 to hold it picked up, and also connects terminal B to front contact $b$ of relay P1 to complete a circuit momentarily over wire 131, front contact $e$ of relay 1, wire 149, front contact $a$ of relay D, wire 209, through the upper winding of relay 1WS, and front contact $a$ of relay LR to terminal N. The direction of current flow in this described circuit would be from left to right in the upper winding of relay 1WS so that the contacts of this relay would be operated to their left-hand or normal position. Relay 1WS is thus energized, in the normal direction, in multiple with relay 2 by an impulse of current which is terminated upon the release of relay 1. Relay P1 is not operated on the eleventh step since the relay 1L remains up. Thus, although at the beginning of the twelfth step, wire 131 is connected momentarily over front contact $e$ of relay 3, wire 151, front contact $c$ of relay D, wire 211, through the lower winding of relay 1WS, and front contact $a$ of relay LR to terminal N, the relay 1WS is not energized because, with relay P1 in its released position, wire 131 is disconnected from terminal B.

Similarly, if lever 1SW is reversed so that the ninth step is short, relay P1 remains released and relay 1WS is not operated on the tenth step. Then, when the long eleventh step is reached, relay P1 picks up so that relay 1WS receives an impulse through its lower winding to operate it to its reverse position during the twelfth step. Since, during the discussion of the transmission of the control code, lever 1SW was assumed to be in its reverse position, the condition as described in this paragraph is in effect at the field station at this time, that is, the relay 1WS wll be reversed.

Another type of control circuit is illustrated by the one for relay 2FS, which is controlled by the office push button 2FB so as to be operated to normal or reverse in accordance with the short or long character of a single code step. If the tenth step is short, relay P2 is in its released position, since relay 2L remains up, when relay R is operated to the right to begin the eleventh step. A circuit is then closed momentarily from terminal B at reverse contact $a$ of relay R over wire 171, back contact $e$ of relay CS, wire 172, front contact $b$ of relay LBP, back contact $b$ of relay P2, wire 157, through the winding of relay 2FS, wire 210, front contact $b$ of relay D, wire 150, front contact $e$ of relay 2, wire 185, back contact $c$ of relay P2 to terminal N. It can be seen that the direction of current flow through the winding of relay 2FS is such as to operate or to hold this relay in its normal position. If the tenth step is long, relay P2 is picked up, and held energized by relay R for the duration of the eleventh step. Its contacts $b$ and $c$ then reverse the direction of the flow of current through the relay 2FS, so that it will be operated to its reverse position. The circuit for the control of relay 3FS is similarly controlled by relay P2.

The relays 2LHS and 2RHS are controlled by relay P1 in a manner similar to that just described for relay 2FS each by a momentary impulse at the beginning of the step following its assigned code step, that is, the step following the step, the character of which governs its operation. For example, let us assume that the thirteenth step of a control code, which is assigned to control the relay 2LHS, is long, so that the relay P1 is picked up. At the beginning of the fourteenth step then a circuit is completed from terminal B at normal contact $a$ of relay R over front contact $e$ of relay LBP, front contact $b$ of relay P1, wire 131, front contact $e$ of relay 5, wire 153, front contact $e$ of relay D, wire 213, through the winding of relay 2LHS from right to left, wire 159, and front contact $c$ of relay P1 to terminal N. Relay 2LHS would therefore operate to its reverse position. If the thirteenth step is short so that the relay P1 remains released, its contacts $b$ and $c$ reverse the direction of current flow through the upper winding of relay 2LHS and this relay would remain in or would operate to its normal position. The circuits for the relay 2RHS, controlled by the character of the fifteenth step, are obvious from a study of the drawings. It should be noted that the relays 2LHS and 2RHS are also provided through their lower winding with a local restoring circuit which functions in a manner hereinafter described to energize these relays in the normal direction in response to the release of the track relay 1TR.

In the foregoing, two types of circuits for controlling magnetic stick relays are described. In the first type, as illustrated by the circuit for relay 1WS, the magnetic stick relay is energized only if a corresponding register relay P1 or P2 is picked up in response to a long step, and is nonresponsive if the step is short. In the second type, as illustrated by the circuit for relay 2FS, the magnetic stick relay is energized in one direction if the assigned step is long and in the opposite direction if that step is short. A third type, not shown, is also available and may be obtained by connecting any of the relays to wire 186 or 187 leading through back contact $a$ of relay P2 or P1, respectively, instead of to wire 157 or 159. If we assume that one terminal of relay 2FS is connected to wire 186 instead of to wire 157, for example, its other terminal being connected to wire 185 through the circuit previously described, it will be seen that relay 2FS will be momentarily energized by relay R only when the assigned step is short, so that relay P2 remains released. It follows then that any of the magnetic stick relays may be arranged to respond to a short step but to be nonresponsive when the step is long.

The magnetic stick relays shown on Fig. 2f are similarly controlled on the various steps to which they are assigned, that is, the relay 3WS by the long character of code step 17 or 19, relay 4FS by code step 18, relay 4LHS by step 20, 4RHS by step 22, the relay 6LHS by step 21, and 6RHS by step 23. The circuits for this control are prepared by the relays D1 and D2, respectively, as will be described shortly, the relay D1 being picked up during code steps 17 to 23, inclusive.

A fourth type of circuit for controlling the stick relays is illustrated by the circuit associated with the relay MCS on Fig. 2e. The relay MCS is a two-winding, neutral relay in which the upper winding, as shown, is of less resistance than the lower winding so that, when energized from the same source, more current will flow through the upper winding than will flow through the lower winding. The position of relay MCS is controlled by the office push button MCB, shown on Fig. 1d, the field circuits being arranged so that the relay is picked up when the code step 14 is of a long character, in which case the relay P2 will be picked up. At the beginning of the fifteenth step of the code, relay MCS is energized through its upper winding by a circuit extending from terminal B, at reverse contact a of relay R, over wire 171, back contact e of relay CS, wire 172, front contact b of relay LBP, front contact b of relay P2, wire 185, front contact e of relay 6, wire 154, front contact f of relay D, wire 214, through the upper winding of relay MCS, and over its own back contact b, wire 156, and front contact d of relay P2 to terminal N. As relay MCS picks up, the connection to terminal N is maintained over the continuity contact b until the new connection to terminal N at front contact c of relay P2 is completed over wire 157 and front contact b of relay MCS. Closing of front contact a of this relay completes a direct stick circuit from terminal B through the lower winding to terminal N. The maintainer's call signal, here indicated as an electric light, is energized over front contact c of the relay. When it is desired to release the relay MCS from its picked-up position, a short fourteenth code step is transmitted from the office so that the relay P2 is not picked up during this step. At the beginning of the fifteenth step of the code then, a circuit is completed from terminal B, at reverse contact a of relay R, over the just described circuit to contact b of relay P2, but since this relay is in its released position, the circuit is over the back contact b of the relay, wire 157, front contact b of the relay MCS, through the upper winding of the relay in the direction opposite to that of the current flowing in the lower winding from the stick circuit, then over wire 214, front contact f of relay D, wire 154, front contact e of relay 6, wire 185, and back contact c of relay P2 to terminal N. The energization of the relay by the current flowing in the upper or operating winding opposes and overpowers that caused by the current flowing in the lower or stick winding and the relay is forced to release. Upon opening of the front contact b, the operating circuit is interrupted, since front contact d of relay P2 is open to disconnect terminal N from wire 156, so that the relay does not pick up again when the stick circuit is also interrupted. The relay WZS, Fig. 2f, is also shown as being controlled by a similar type circuit, but since this relay is controlled on the twenty-fifth, that is, an odd-numbered step of the code, the control circuits are over the wires 159 and 158 from the contacts b, c, and d of the relay P1.

Since the control code transmitted by the office to this station 234 is twenty-six steps in length, it is obvious that additional steps must be provided in the coding action at this station to match the length of the transmitted code. This is accomplished in a manner similar to the action of the office coding unit, that is, the coding action is turned back and the primary counting chain reused to provide sufficient additional repeat cycles of operation to match the number of code steps transmitted. In order to do this, extra relays, to prepare circuits for turning back the coding action at the end of a cycle of operation, are again inserted in the secondary counting chain between the first relay 8 and a final relay CS, both of which are contained within the LCS unit. Likewise, it is necessary to have a relay for each additional group of steps to assure that the control functions are delivered to the proper group of function control relays. Also, just as a separate selector repeater relay was required in the office to deliver each group of control functions to the coding unit from the levers and push buttons, a relay is required at a station to deliver each group of indications from the indication relays to the coding unit. Thus three relays are required for each additional group of code steps, that is, the code steps added by a repeat cycle of operation of the primary counting chain.

In my invention, I include these three relays in a unit called a code extension unit, two of which are shown in Fig. 2d. All such units are identical, with the appropriate wire leads brought out to terminals for the purpose of making such adjustable connections as are desired to extend the code through several repeat cycles or to terminate it on a selected even numbered code step. Each extension unit adds eight steps to the coding action, that is, one repeat cycle of operation of the primary counting chain, whether the code is a control or an indication code. Only the first seven of these steps, as was herebefore discussed in connection with the office coding action, are available for carrying control or indication functions. Thus two such units are required to provide for the twenty-six step control code transmitted to this station. However, since the indication code transmitted by this station, as described hereinafter, contains thirty steps, two code extension units would be required even through the control code terminated on step 16, or between steps 18 and 24.

The relay in each unit which is inserted in the secondary counting chain is known as the code extension relay CE. These relays are energized on the sixteenth, twenty-fourth, thirty-second, or similar steps of the code and, in conjunction with relay CR, act to turn the coding action back to repeat the cycle of operation of the primary counting chain, in a manner similar to the action of relay 8. The relay controlling the delivery of the control functions is known as the delivery relay, and designated relay D, the same as the similar relay in the LCS unit. Likewise, the relay controlling the delivery of the indications to the coding unit, which relay is a repeater of the master and selector relays, is designated the same as the similar relay in the LCS unit, the relay MSP. For convenience, these relays in the code extension unit No. 1 have been designated CE1, D1, and MSP1, respectively, while the corresponding relays in the second unit are designated CE2, D2, and MSP2.

Relay CE1 is picked up on the sixteenth step of the code in a manner similar to the pickup of relay 8 on the eighth step. However, the pickup circuit for this relay checks that the relay CR is up and that the relay 8 is released. Since the relay CR is picked up over a contact of relay S, the station must have already been selected by the control code before this relay will pick up. In addition, the pickup circuit for relay CE1 checks over back contacts of the D and MSP relays in all extension units at the station including its own extension unit No. 1. This is to prevent the relay CE1 from picking up on the twenty-fourth and similar code steps, since the same pickup circuit to be described shortly is used for other CE relays.

When the line relay R operates to normal at the beginning of the sixteenth code step, a circuit is completed to energize relay CE1, extending from terminal B at normal contact a of relay R over front contact e of relay LBP, resistor R9, wire 130, back contact a of relay 6, front contact b of relay 7, front contact h of relay CR, back contact g of relay 8, wire 204, back contacts k of relays MSP2, D2, MSP1 and D1, respectively, through the winding of relay CE1 to terminal N. When relay CE1 picks up, it completes a stick circuit which is similar to the stick circuit for the relay 8 in that it checks the back contacts of other relays CE which will follow in operation. This stick circuit may be traced from wire 130, over back contact *b* of relay 1, wire 200, back contact *a* of relay CE2, front contact *a* and the winding of relay CE1 to terminal N.

When relay CE1 picks up, it also picks up the relay D1 over a circuit similar to the pickup circuit for relay D in that the circuit checks over back contacts of the D relays in the following extension units. This circuit may be traced from terminal B at front contact *c* of relay CR over back contact *e* of relay 8, front contact *c* of relay CD, wire 182, front contact *g* of relay S, wire 183, back contact *h* of relay D2, front contact *e* of relay CE1, through the winding of relay D1 to terminal N. When relay D1 picks up, its back contact *h* interrupts the circuit for relay D which then releases. The front contact *h* of relay D1 completes a stick circuit for the relay D1 in multiple with the front contact *e* of the relay CE1, so that when relay CE1 releases relay D1 remains picked up, and will remain picked up until the twenty-fourth step of the code. The relay D1 in its picked-up position prepares circuits over its front contacts *a* to *g*, inclusive, to connect the various circuits controlled by the register relays P1 and P2, as previously described, to the function control stick relays of a second group over wires 217 and 223, inclusive.

The opening of back contact *b* of relay CE1 interrupts the previously described retardation circuit for relay 7, and this relay releases shortly thereafter. Opening of front contact *b* of relay 7 interrupts the pick up circuit for relay CE1, but its stick circuit retains this relay. Closing of front contacts *b* and *j* of relays CE1 and D1, respectively, completes a circuit between wires 207 and 206 for energizing relay 1, over a circuit previously traced, when the line relay R goes reverse to close its reverse contact *a* at the beginning of the seventeenth step. When relay 1 picks up, the stick circuit for the relay CE1 is opened at back contact *b* of relay 1. Relay CE1 is thus released during the seventeenth step, as was relay 8 during the ninth step. The coding unit is now prepared to again repeat the cycle of operation of the primary counting chain, the relays 1 to 7 functioning in the usual manner as already described.

The control and operation of the function control stick relays shown on Fig. 2*f* which are controlled over the contacts of the relay D1 during this cycle of operation is similar to that described previously. Since the nineteenth, twentieth and twenty-third steps were assumed to be long due to operation of levers and push buttons in the office, relays 3WS, 4LHS, and 6RHS are reversed.

On the twenty-fourth step of the control code, the relay CE2 is picked up in a manner very similar to that described for the relay CE1. The pickup circuit for relay CE2 is checked over a front contact of the relay D1 to determine that the twenty-fourth step is the proper one for the pickup of that particular CE relay. The pickup circuit as traced from terminal B at normal contact *a* of relay R is exactly the same as that traced for the relay CE1 to the wire 204, thence over front contact *m* of relay D1 through the winding of relay CE2 to terminal N. The pickup of relay CE2 completes a stick circuit which may be traced from wire 130, over back contact *b* of relay 1, wire 200, and front contact *a* of relay CE2 through the winding to terminal N. As with the relay CE1 the pickup circuit for relay CE2 is interrupted at front contact *b* of relay 7 when that relay releases. The stick circuit is likewise interrupted at back contact *b* of relay 1 when that relay picks up, so that the relay CE2 is released during the twenty-fifth step of the code.

The pickup of relay CE2 completes a circuit from wire 183, over front contact *e* of relay CE2 through the winding of relay D2 to terminal N, to cause the relay D2 to pick up. Since front contact *h* of relay D2 is in multiple with front contact *e* of relay CE2, the relay D2 remains up when relay CE2 releases and remains up until the thirty-second step or in this case, until the end of the code. Opening of back contact *h* of relay D2 interrupts the stick circuit for relay D1 and this relay releases. The pickup of relay D2 prepares circuits over its front contacts *a* to *g* and wires 225 to 231, inclusive, for the control of another group of function control stick relays by the circuits completed by the register relays P1 and P2 in a manner similar to that already described for relays D and D1. The circuits completed by the relay D2 will be effective during the steps 25 to 31, inclusive.

The closing of front contacts *b* and *j* of relays CE2 and D2, respectively, completes a circuit, over back contact *b* of relay CE1, between wires 207 and 206 to again energize relay 1 when relay R is reversed to begin the twenty-fifth step of the code. The coding unit would then be prepared to again run through the primary counting chain relays to follow eight more steps of the control code.

It is obvious that the extension of the code could continue indefinitely by adding code extension units. The next relay CE in order would be picked up over the circuit controlled by the front contact *m* of relay D2 and wires 188 and 189. However, only one more control function is required for this particular station. The stick relay WZS is controlled by the register relay P1 in a manner similar to the control of the relay MCS, and is picked up in response to the twenty-fifth step being long in character as controlled by the push button WZB, shown in Fig. 1*d*. The control of the relay WZS is over wires 158 and 159, as previously mentioned.

Since the office coding unit terminates its action and resets on the twenty-sixth step of the code, the field station coding unit must do likewise. When the twenty-sixth step of the control code is reached, the line relays R remain steadily energized and the various timing relays L at each station release in unison with the corresponding office relays. At the selected station, as shown in Fig. 2, the release of relay LBP releases the relays CR, CD and S, as well as whichever one of the counting chain relays is energized. In the present case, this would be the relay 2. Release of the relay S also releases relay D2 which places the apparatus in condition to receive a new code. Relay 1L is the last of all of the relays to release, and the release of this relay places the apparatus in condition to initiate the transmission of an indication code, assuming that the relay SS, hereinafter described, is not energized.

This completes the transmission of a control code from the office and the receipt at the selected field station of the same control code. As has been described, the desires of the operator of the control machine at the office have now been fulfilled. The function control stick relays have been operated in response to the receipt of the control code to cause the switches 1W and 1WA and the switch 3W to reverse and the signals 4L and 6R to display proceed indications to permit the various trains to travel through the interlocking over the route desired by the operator. In addition, the signal 2L is at stop to halt the westbound train assumed to be approaching on track 6AT. It is to be understood that although the operation of the control stick relay permitted the signals 4L and 6R to display a proceed indication, the actual proceed aspect as displayed by these signals is also controlled by the wayside conditions including the occupancy or nonoccupancy of the track in advance along the route set up for the train and also the complete operation and locking in the reverse position of the various switches over which the train must pass. Local checks are also accomplished through various circuits to assure that the opposing signals at the locations are in the stop position, that is, that the signal 2R is at stop as compared with the signal 4L displaying a proceed indication, and that the signal 6L is at stop as compared with the signal 6R displaying a proceed indication. Various other circuit checks are also made to completely assure that all safety conditions have been met over the route for which the signal indication governs.

The station coding apparatus of Fig. 2 is also adapted to transmit indication codes which the office apparatus is adapted to receive. Each indication code comprises an even number of code steps, of which the first is relatively short. The second to eighth are arranged in different combinations of three long and four short steps to operate various selection relays F, G and S at the office and station in accordance with the different code calls already described. The ninth to fifteenth steps are then used for the transmission of seven indication functions from the station. It is a stated object of my invention to enable the station coding unit to repeat the action of its counting chain, in a manner similar to that of the office coding unit, to furnish additional code steps to transmit all indications from a station during one code. Thus, the sixteenth, twenty-fourth, thirty-second, and other similar code steps are used to turn back the coding action to reuse the counting chain to provide code steps seventeen to twenty-four, twenty-five to thirty-two, and similar other groups for transmitting indications to the office. The turn-back code steps are not available during an indication code, as they were also not available during a control code, to transmit a function, since these steps must of a necessity always be long code steps.

The ninth to fifteenth, seventeenth to twenty-third, twenty-fifth to thirty-first and other similar groups of code steps may, however, be made long or short to indicate the condition of movable devices at the station. The character of these code steps is recorded initially at the office by a group of intermediate register relays 9 to 15, which are reused during each repeat cycle of the counting chain. The recorded characters of the various groups of code steps are transferred to corresponding groups of indication relays K at the selected office panel during the sixteenth, twenty-fourth, and other turn-back steps of the code.

As has been previously stated, it is also an object of my invention to permit the selection of the next even-numbered code step, after the actual number of steps required to transmit all the desired indications have been sent, as the final step of the indication code. Thus, adjustable connections and circuits are provided, as will be described hereinafter, to allow the termination of both the station and the office coding action on that selected step.

A typical group of such station devices is shown in Figs. 2e and 2f, illustrated as a group of indicating relays including track storage relays TKSR, approach relays AR, normal and reverse switch repeating relays NWP and RWP, and signal control relays LHR and RHR. The control of these relays by the track conditions and wayside apparatus positions may be in any conventional or well-known manner. For simplicity, I have shown these controls by dotted lines as they form no part of my invention. The switch position repeating relays are shown as being energized over circuits completed by a movable connector which in turn is directly controlled by the position of the switch points.

The station apparatus is arranged to initiate an indication code automatically in response to a change in position of any of the indicating relays. Each such code is stored for transmission, when the line circuit becomes available, by the release of a station starting relay ST, shown in Fig. 2c. This relay ST is normally held energized over a stick circuit extending from terminal B at its own normal contact a over back contact e of relay S, back contact j of relay D, through the winding of relay ST, wire 216, a front or back contact b of each of the several indicating relays on Fig. 2e, wire 224, and the front or back contact b of each of the several indicating relays on Fig. 2f, to terminal N. In order to assure the release of the starting relay during the brief period the circuit is open during the transit of the contact b of an indicating relay from one position to the other, without requiring a special adjustment on these contacts, a sensitive relay of the biased type is used as the starting relay. In addition, an inductive reactor 190 is connected across the terminals of the relay winding. The energy stored in the coil of the reactor 190, when relay ST is energized, provides a source of induced current for operating relay ST to its reverse position very quickly, to open its stick circuit, in response to any sudden increase in circuit resistance due to the movement of one of the indicating relay contacts b. This release action will occur even though the time such an indicating relay contact is actually open is very nearly zero. Thus, no special adjustment of these contacts is required.

An indication code is also automatically stored, upon the receipt of a control code by a station, due to the release of the starting relay ST by opening its stick circuit at back contact j of the relay D. As was previously described, the relay D is picked up during a control code only at the selected station. An indication code may also be initiated manually by the transmission of a special recall code from the office, as will be explained hereinafter, by means of which the relay ST may also be released by the opening of the same back contact j of relay D.

I shall next describe the transmission of an indication code by the apparatus shown in Fig. 2. It will be assumed that this indication code is initiated by the movement of the previously mentioned eastbound train, past the signal 6R which was displaying a proceed indication, into the track section 3T, which causes the track relay 3TR to be released. It will also be assumed that at the time of the transmission of the indication code the eastbound train is still occupying the track section 4AT, and that one of the westbound trains occupies the track section 6AT. Positions of other apparatus are as established by the previously described control code.

The opening of front contact a of track relay 3TR opens the normally closed stick circuit for the track storage relay 3TKSR, extending from terminal B at front contact a of relay 3TKSR, and also opens the pickup circuit extending from terminal B at front contact b of a relay MSTP. The relay 3TKSR releases and its contact b opens the stick circuit for relay ST, causing that relay to also release, in the manner previously described. Release of the relay ST opens its normal contact d, interrupting the pick-up circuit for the relay MSTP, which is a repeater relay of the starting relay ST and also of the master relay M. The pickup circuit for the relay MSTP may be traced from terminal B at back contact k of relay M over wire 177, normal contact d of relay ST, wire 238, and through the winding of relay MSTP to terminal N. Thus, it is to be seen that the relay MSTP cannot pick up again once released until the relay M is released, during the final step of the indication code. It follows then that the relay 3TKSR also cannot pick up again until the final step of the indication code. In other words, the relay 3TKSR remains down until the indication of track occupancy has been transmitted to the office. This is necessary in order to insure that the track occupancy indication will be transmitted since track sections such as 3T are very short. Thus, if the line is not immediately available for transmission of the indication code, the train may have passed out of the track section 3T and the relay 3TR picked up before the indication code can be sent. However, as described, the track storage relay 3TKSR will store the indication until it can be transmitted to the office. At the location shown the other TKSR relays remain stuck up over the corresponding track relay front contacts.

If the line circuit is available, a starting circuit is closed extending from terminal B at reverse contact *b* of relay ST over back contact *b* of relay SS, wire 147, front contact *b* of a relay RP, back contact *a* of a thermal cutout relay COR, back contacts *b* of relays 1L and 2L, respectively, through the winding of relay M to terminal N. Relay M picks up, completing a temporary stick circuit, which includes its front contact *a* and back contact *c* of relay LBP, in multiple with the back contacts *b* of relays 1L and 2L. Contacts *b* and *d* of relay M reverse the connection of relay R to the line wires Y and Z. Front contact *d* of relay M also closes a low impedance shunt path from line Y over back contacts *f* of relays LBP and CD and wires 232 and 233 to line Z. Front contacts *b* and *c* of relay M connect the capacitors of the low pass filter LPF directly across the line wires so that during transmission its connections correspond to those of the corresponding low pass filter at the office. Normally the impedance across the lines presented by the station apparatus is materially increased, as is desirable, by inserting a high resistance in series with the one capacitor and shunting the other from the line circuit.

When the line circuit is shunted by relay M, the associated line relay R releases. Also the increase in current delivered by battery 77 at the office causes the transformer RT, shown in Fig. 1*a*, to deliver an impulse to operate relay OR to its reverse position substantially in unison with the relay R. Relay R operates the associated timing relays and relay 1. Closing of front contact *e* of relay LB completes the normal stick circuit for relay M, extending over wire 234, back contact *c* of relay CS, and back contact *e* of relay CD to terminal B.

At the office the relay OR operates the timing relays OL, relay O1, and relay E, as on the first step of a control code. In addition, a circuit is completed from terminal B at reverse contact *a* of relay OR over back contact *h* of relay OLBP, back contact *b* of relay OM, wire 65, back contact *c* of relay OCS, wire 66, through the winding of relay PC, wire 17, and the normally closed contact of cancel button CB, shown in Fig. 1*c*, to terminal N. Relay PC therefore picks up and its contacts *b* and *d* reverse the polarity of the current delivered to the line, while its front contact *e* completes a circuit energizing a slow release repeater relay PCP.

The sudden variation in the line current due to the operation of relay PC in pole changing the polarity of the line current is devoid of effect upon relay OR for two reasons. The first reason is that, when relay PC picks up, the secondary of transformer RT is momentarily short circuited over the front contact *c* of relay PC and back contact *c* of relay PCP. Secondly, the lower winding of relay OR is energized in the reverse direction over the circuit extending from terminal B, at back contact *b* of relay PCP, over front contact *f* of relay PC, back contact *b* of a relay X, back contacts *e* of relays OM and OT, and through the lower winding of relay OR to terminal O.

Relay PC is held energized by a stick circuit from terminal B, at its own front contact *a*, over front contact *h* of relay OLBP, and thence over the remaining portion of the pickup circuit for this relay as previously described, terminating at terminal N at the normally closed contact of the cancel button CB. Relay PC thus remains in its picked-up position until relay OCS picks up on the final step of the code.

The shunt across the line wires Y and Z applied by relay M at the transmitting station, as previously described, will also short circuit and consequently release line relays R at stations more remote from the office. If the transmitting station is at a considerable distance from the office, it may be that the voltage across the line, which varies from nearly the full voltage of battery 77 at the office to substantially zero at the point where the shunt is applied, will remain sufficient to keep the relays R picked up at stations near the office. These relays, however, will be released by the reversal of line polarity by relay PC. It follows that all line relays R release substantially in unison when any relay M picks up to initiate a code, each relay R operating its timing relays L and first counting relay 1. At each station at which relay M is not operated, relay R remains released, holding relay 2L energized but allowing relay 1L to release to pick up relay CD, and then relays LP, LB, LBP, 1, and CD release in that order.

At the transmitting station the closing of front contact *e* of relay M completes the pulsing circuit for relay T, this circuit extending from terminal B at back contact *e* of relay CD over back contact *c* of relay CS, back contacts *g* of relays 7, 5, 3 and 1, wire 168, front contact *e* of relay M, through the winding of relay T and resistors R14 and R15 to terminal N. Relay T transmits a code by the operation of its contact *b*. This contact *b* of relay T is rendered effective for transmitting the indication code when relay LBP picks up on the first step of the code to open its back contact *f* which is in parallel with front contact *b* of relay T. Each time relay T picks up a low resistance shunt path is closed from line Y over wire 233, back contact *f* of relay CD, wire 232, front contact *b* of relay T, and front contact *d* of relay M to line Z. At the same time, the circuit for relay R which extends from the now positive wire Z over front contact *d* of relay M, back contact *b* of relay T, resistor R3, through the winding of relay R, front contact *b* of relay M to wire Y is opened by relay T at its back contact *b*, thereby releasing relay R more quickly than if it was merely short circuited by the closing of front contact *b* of relay T.

Although the first step of an indication code is short in comparison with the first step of a control code, it is slightly longer than other short steps. This first step begins when the relay M picks up, closing its front contact *d*, which is slightly before relay T picks up and ends when the relay T is released by the picking up of relay LB, which occurs shortly after the relay 1 picks up to open the normal pulsing circuit for relay T. This circuit for holding the relay T energized may be traced from terminal B at back contact *a* of relay LBP over back contact *d* of relay LB, front contact *e* of relay M, through the winding and front contact *c* of relay T, and resistor R15 to terminal N.

The response of the apparatus at the transmitting station, as required to allow the transmission to continue, is also dependent upon conditions at the office. Since the connections of relay R to the line have been reversed by relay M, relay R picks up to begin the second step only if relay PC has been picked up to reverse the polarity of the line current, thus indicating that the office apparatus is in the proper receiving condition with relay OM released.

The code call steps of the indication code are generated by relay T in the same manner as by relay OT in the control code already described. Assuming this to be 234, the second step is prolonged by the closing of a hold-down circuit for relay T extending from terminal B at reverse contact *c* of relay ST over back contacts *c* of relays SS and S, back contact *d* of relay G, back contact *c* of relay F, and an adjustable connection to wire 132, thence over front contact *c* of relay 2, back contact *f* of relay CR, wire 162, front contact *f* of relay M, and back contact *c* of relay T to the left-hand terminal of the winding of relay T, thereby shunting the winding of this relay. On the second step, relay F picks up in response to the release of relays 2L and LP, as previously described, and its contact *c* transfers the circuit from terminal B, as just described, from wire 132 to wires 133 to 137, opening the hold-down circuit for relay T to allow it to pick up to begin the third step.

The third step is then prolonged by the operation of the stick circuit for relay T extending from terminal B at the reverse contact c of relay ST, over back contact c of relays SS and S, back contact d of relay G, front contact c of relay F, an adjustable connection, wire 133, front contact c of relay 3, back contact e of relay CR, wire 161, front contact a of relay T, and the winding and front contact c of relay T and resistor R15 to terminal N. On the third step relay G picks up in response to the release of relays 1L and LP, as previously described, and its contact d transfers this circuit from terminal B from wire 133 to wires 134 to 138, opening the stick circuit for relay T to allow it to release to begin the fourth step.

Like the second, the fourth step is prolonged by the operation of a hold-down circuit for relay T. The circuit for generating the long fourth step is similar to that for the long second step except for including front contact d of the relay G, wire 134, and front contact c of relay 4. On the fourth step, the station selector relay S picks up in response to the release of relays 2L and LP, and the opening of back contact c of relay S allows relay T to release to begin the fifth step.

When relay S picks up, it completes the circuit for energizing the repeating relay MSP, the circuit extending from terminal B at front contact g of relay M over wire 169, front contact b of relay S, wire 235, back contacts h of relays MSP2 and MSP1, wire 236, through the winding of relay MSP to terminal N. Relay MSP therefore picks up on the step corresponding to the last digit of the code call, remaining energized until the sixteenth step. It will be noted from the previously described circuit that the energization of the relay MSP is checked over the back contacts, in reverse order, of the other such repeating relays MSP2 and MSP1, which are required for the code extension as will be discussed hereinafter. Since the pickup for each of these relays originates at the same contact of relay M as for the relay MSP, the checking over the back contacts in reverse order assures that the proper repeating relay is picked up at any time in the code.

Since the pulsing circuit for relay T functions in the same manner as that for the relay OT, already described, it will be clear that if relay S is operated on the fourth step, the fifth to eighth steps will be short steps generated by the operation of relay T over its normal pulsing circuit. Relay CR picks up on the eighth step, energized through the circuit extending from terminal B at front contact d of relay S over wire 146, front contact f of relay 8, and the winding of relay CR to terminal N. Relay CR picks up, completing its stick circuit, extending to terminal B at front contact a of relay LBP over resistor R10 and wire 160, by closing its own front contact a.

When relay CR picks up, it completes a pickup circuit for the starting relay ST, extending from terminal B at front contact c of relay CR over front contact e of relay 8, wire 178, front contact h of relay M, wire 237, front contact f of relay S, back contact j of relay D, through the winding of relay ST and reactor 190 in multiple, wire 216, and thence over the front or back contacts b of the various indicating relays, shown on Figs. 2e and 2f, and wire 224 to terminal N. Relay ST then picks up and establishes a temporary stick circuit extending from terminal B at its own front contact a over front contact e of relay S, wire 246, and front contact c of relay LB to wire 237, and thence, as traced above, through the winding of relay ST and reactor 190 to terminal N.

The pickup of the relay CR on the eighth step also establishes circuits to render the next seven steps of the code available for indicating the positions of the wayside apparatus or the movable devices previously discussed. The relay CR, by closing its front contacts e and f, establishes the connections from terminal B at various contacts a of the indicating relays of Fig. 2e over wires 239 to 245, front contacts a to g of relay MSP, and wires 139 to 145, respectively, and completed successively over front contacts f of the relays 1 to 7 on the ninth to fifteenth steps of the code, to hold the relay T up or down, as the case may be, until the relay LP releases. Such a long step in the code may then be considered to be a "positive" indication, since the movable device is active or is in its active condition. For example, since the switches 1W and 1WA are in their reverse position as controlled by the operator on the control code, the eleventh step of the indication code must be made long to carry this information to the office. The relay 1RWP, shown on Fig. 2e, is in an energized condition so that it is picked up, the energy being furnished from terminal B over the movable connector associated with these switches, which is now occupying the position shown dotted on the drawing, through the winding of the relay to terminal N. The circuit for holding the relay T picked up to make the eleventh step long may then be traced from terminal B at front contact a of the relay 1RWP over wire 241, front contact c of relay MSP, wire 141, front contact f of relay 3, wire 196, front contacts d of relay LP and e of relay 1L in multiple, wire 195, front contact e of relay CR, wire 161, front contact a, the winding, and front contact c of relay T, and resistor R15 to terminal N. Relay T is thus held picked up until the release of the relay LP, generating a long eleventh step. Similarly, the fourteenth step is made long by holding the relay T released with energy supplied from terminal B at back contact a of relay 4AR on Fig. 2e, this relay being shunted and released by the train assumed to be occupying track section 4AT. The circuit is further traced over wire 244, front contact f of relay MSP, wire 144, front contact f of relay 6, wire 198, front contacts e, in multiple, of relays 2L and LP, wire 197, front contact f of relay CR, wire 162, front contact f of relay M, back contact c of relay T, to the left-hand terminal of the winding of relay T. This shunts the relay T and holds it in the released position until relay LP releases and opens its front contact e, thus generating a long fourteenth step. The other code steps of the groups 9 to 15, inclusive, are short to carry to the office such indications as the signals 2L and 2R at stop and the track sections 1T and 2AT unoccupied.

In order to transmit to the office the indications from all of the relays shown on Figs. 2e and 2f, it is necessary to extend the coding action beyond its usual termination at the sixteenth step. This is again accomplished, as it was with the control code, by repeat action of the primary counting relay chain. The same extension unit, as was used to permit the extending of the code action upon the receipt of a control code, is used to enable the counting chain to repeat its cycle to extend the length of the indication code. In this case, however, it is the code extension relay CE and the M and S repeater relay MSP that are used. Each extension unit again adds eight steps to the code for each repeat action of the counting chain, seven steps of which are available for the transmission of indications. The CE relays act in the secondary counting chain to turn back the code in a manner similar to the relay 8. The sixteenth, twenty-fourth and similar steps are not available for the transmission of indications but are used only to turn back the counting chain for its repeat action.

On the sixteenth step of the code, the relay CE1 in the Extension Unit No. 1 is picked up in a manner similar to the pickup of the relay 8 on the eighth step. The circuit may be traced from terminal B at the normal contact a of relay R over front contact e of relay LBP, resistor R9, wire 130, back contact a of relay 6, front contact b of relay 7, front contact h of relay CR, back contact g of relay 8, wire 204, back contacts k of relays MSP2, D2, MSP1, and D1, through the winding of relay CE1 to terminal N. It will be noted that again the pickup of the CE1 relay is checked over back contacts of the D and MSP relays in all of the code extension units including the first unit. In addition, the circuit is checked over the CR relay up and the relay 8 down. All of these checks are necessary to assure that the first code extension relay is picked up at the proper time. When relay CE1 picks up, it completes a stick circuit, over its own front contact a, which is traced over back contact a of relay CE2, wire 200, and back contact b of relay 1 to wire 130. This stick circuit for the CE relay is checked, as will be noted, over back contacts of the other CE relays which follow it in order of picking up. The release of relay 7 and the opening of its front contact b then interrupts the pickup circuit for relay CE1.

Relay CE1 causes the relay T to be held down by applying energy from terminal B over its front contact d to wire 198, and thence over the previously traced holddown circuit for the relay T. This renders the sixteenth step of the code long, to permit various actions to occur, as was also necessary in a control code.

Closing of front contact c of relay CE1 completes a circuit for energizing relay MSP1. This circuit may be traced from terminal B at front contact g of relay M over wire 169, front contact b of relay S, wire 235, back contact h of relay MSP2, and front contact c of relay CE1, through the winding of relay MSP1 to terminal N. When relay MSP1 picks up to close its front contact h, a stick circuit is completed for this relay over back contact h of relay MSP2 to wire 235. The opennig of the back contact h of relay MSP1 interrupts the pickup circuit for relay MSP by disconnecting wire 236 from its source of energy and relay MSP releases. As mentioned above, both the pickup and the stick circuits for relay MSP1 check that the MSP relays in later extension units are down. The closing of front contacts a to g, inclusive, of relay MSP1 prepares circuits for the transmission of a second group of indications in a manner similar to that discussed previously.

When relays CE1 and MSP1 pick up, a circuit is prepared to pickup relay 1 again on the seventeenth step. This circuit may be traced from terminal B at reverse contact a of relay R, over wire 171, back contact e of relay CS, wire 172, front contact b of relay LBP, resistor R8, wire 129, front contact g of relay CR, back contact a of relay 7, back contact b of relay 8, wire 207, front contact b of relay CE1, front contact j of relay MSP1, wire 206, through the winding of relay 1 to terminal N. When relay 1 picks up, it completes a stick circuit over its own front contact a, as previously described. The pickup of relay 1 also interrupts, at its back contact b, the stick circuit for relay CE1 and this relay then releases.

The counting chain relays now repeat their cycle of operation in the manner already described. The circuits to supply energy by which relay T is held up or down to generate long odd or even steps may be traced over wires 247 to 253, contacts a to g of the relay MSP1, and wires 139 to 145, and are completed successively over front contacts f of the relays 1 to 7. The circuits are very similar to those previously described during the discussion of the ninth to fifteenth steps of the code. With the assumed conditions, the eighteenth, nineteenth and twentieth steps of this group of steps seventeen to twenty-three would be long, with energy being supplied from terminal B at contacts a of relays 3TKSR, 3RWP and 4LHR, respectively. The circuit to generate the long eighteenth step, for example, would be traced from terminal B at back contact a of relay 3TKSR over wire 248, front contact b of relay MSP1, wire 140, front contact f of relay 2, wire 198, front contacts e of relays LP and 2L, in multiple, wire 197, front contact f of relay CR, wire 162, front contact f of relay M, and back contact c of relay T to the left-hand terminal of the winding of relay T, to shunt this relay winding and hold down the relay T. The long eighteenth step then would again be terminated by the release of the relay LP opening its front contact e.

Thus, the indications transmitted during this group of code steps would cause the office to indicate the track section 3T occupied, the switch 3W reversed, and the signal 4L displaying a proceed indication. It will be noted that, when the train passed the signal 6R which was displaying a proceed indication, this signal was returned to its stop position and the relay 6RHS was returned to normal. The circuit for the latter operation may be traced from terminal B at back contact c of the relay 3TKSR through the lower windings of the relays 4RHS, 6RHS, and 6LHS, in series, to terminal N.

On the twenty-fourth step of the code, the relay CE2 is picked up. The circuit for this is the same as that previously traced for the relay CE1 with the exception that from wire 204 the circuit extends over front contact m of relay MSP1 through the winding of relay CE2 to terminal N. The circuit thus checks that the preceding MSP relay is in its up position to assure that it is the proper step for the pickup of the CE2 relay. In addition, the back contact k of relay MSP1 being open interrupts the pickup circuit for the relay CE1 so that this relay is not picked up again. When relay CE2 picks up, it completes a stick circuit over its front contact a to wire 200. If other extension units were in use, this stick circuit would be checked over back contacts of the following CE relays. The twenty-fourth step of the code is made long by energy supplied over front contact d of relay CE2 to wire 198 to hold down the relay T. When relay 7 releases during this step, it interrupts the pickup circuit for relay CE2 by opening its front contact b.

The closing of front contact b of the relay CE2 completes a circuit from wire 235 through the winding of relay MSP2 to terminal N to cause the relay MSP2 to pick up. When it picks up, the relay MSP2 completes a stick circuit, similar to that described for the relay MSP1, over its own front contact h from wire 235. Opening of back contact h of relay MSP2 interrupts the stick circuit for relay MSP1 which then releases. The relay MSP2 completes circuits over its front contacts a to g to transmit a third group of indications on the twenty-fifth to thirty-first steps, inclusive, of the code. These circuits include, as is obvious from an inspection of the drawings, the wires 255 to 261 and the previously mentioned wires 139 to 145.

When relays CE2 and MSP2 pick up, they complete a circuit for again energizing the relay 1. The circuit is similar to that previously traced during the discussion of the sixteenth step, except from wire 207 it extends over back contact b of relay CE1, front contact b of relay CE2, and front contact j of relay MSP2 to wire 206. Thus the primary counting chain is again prepared to repeat its cycle of operation, as previously described, with an exception as will be discussed shortly.

Once again the relay T is held up or down to generate the long steps necessary to carry the positive indications to the office. The twenty-fifth step will be short since the track section 5T is assumed to be unoccupied. The code step 26 will be long since it is assumed that the track section 6AT is occupied. The energy for holding the relay T down during the long twenty-sixth step is supplied from terminal B at back contact a of the relay 6AR over an obvious circuit similar to those previously traced for other long even steps. The twenty-seventh step will also be short since the second westbound train has not yet occupied the track section 8AT. If, during the transmission of this code, the eastbound train has moved into track section 10AT, the twenty-eighth step would be long to indicate this condition. If not, a second indication code would be required later to transmit this indication to the office.

As can be seen by an inspection of Fig. 2f, there is no need at this station for the code steps 29 to 31, as there are no other indications to be transmitted to the office. Therefore, the code can be ended after the twenty-eighth step in order to conserve coding time on the line circuit. However, for proper reset action of the equipment at the office, at this station, and at other field stations, the code must end with the line relays R normal. This limits the final step of the code to even numbered steps only. Thus, at the station shown in the Fig. 2, the twenty-ninth step will always be short, there being no indication to be carried on this step, and the indication code will terminate on the thirtieth step.

In order to terminate the indication code, the code stopping relay CS must be picked up on the final step in multiple with the particular counting chain relay corresponding to that code step, that is, the relay CS must become the final relay in the previously mentioned secondary counting chain which includes the relays 8, CE1, and CE2. In order that the coding unit at each field station may be identical, adjustable connections are provided over front contacts h of relays 1, 3 and 5, or front contact b of relay 7 if the code is to end on an "eighth" step similar to the picking up of one of the CE relays, to energize the relay CS on the desired code step. The circuit also includes the front contact m of the MSP relay in the highest numbered code extension unit. Since at this station the code is to end on the thirtieth step, the adjustable connections for energizing the relay CS on the final step of the code are made so as to include front contact h of relay 5 and front contact m of relay MSP2.

When the thirtieth step of the code is reached, relay R at the transmitting station operates to its normal position, energizing the relay CS over a circuit which may be traced from terminal B at normal contact a of relay R over front contact e of relay LBP, resistor R9, wire 136, back contact a of relay 4, front contact h of relay 5, wire 203, an adjustable connection, front contact m of relay MSP2, wire 199, front contact m of relay CR, through the winding of relay CS to terminal N. When relay CS picks up, it completes a stick circuit over its own front contact a, extending over wire 148 and front contact b of relay LB to wire 130.

Relay CS also opens its back contact c to disconnect terminal B at back contact e of relay CD from wires 168 and 234. Relay T thus remains released when relay 5 releases to close its back contact g in the normal pulsing circuit for relay T. Relay M also releases, reversing the line connections at its contacts b and d to render relay R responsive now only to line current of normal polarity. Relay MSP2 is released when front contact g of relay M opens.

At the office, relay OR is operated to normal, energizing relay OCS. This relay, by opening its back contact c, releases relay PC, thereby restoring the line polarity to normal so that relay R at this station will remain steadily energized after relay M releases. This relay action at the office will be more fully described hereinafter. It suffices here to say that the relay PC releases relay PCP and relay OR releases relays O2L, OLP, OLB, OLBP, and O1L in order.

Relay OR remains in its normal position and is not affected by the operation of relay PC because, when this change of line polarity occurs, the secondary of transformer RT is short circuited over back contact c of relay PC and front contact c of relay PCP. Relay OR is also held energized in the normal direction until relay PCP releases over the circuit extending from terminal O, through the lower winding of relay OR in the direction from left to right, back contacts e of relays OT and OM, back contact b of relay X, back contact f of relay PC, and front contact a of relay PCP to terminal N. The restoration of the line polarity to normal by relay PC causes the line relay R at each of the other stations to pick up. At these stations, relays 1L, LP, LB and LBP pick up and then relays 2L, LP, LB, LBP and 1L release in that order.

At the transmitting station, even though relay M releases at the exact instant that the line polarity is restored to normal, relay R may momentarily be deenergized. However, since relay CS is picked up, its front contacts d and e, over wires 170 and 171, and 173 and 174, respectively, connect the normal and reverse contacts at a and at b of relay R together so that the circuits controlled by relay R remain in the same condition as if relay R remained steadily energized. Consequently, the timing relays L at that station release in order, substantially in unison with those at the office and slightly in advance of those at the other stations. Relay CS is released by the opening of its stick circuit at front contact b of the relay LB. Relays CR and S are released when front contact a of relay LBP opens to disconnect terminal B from wire 160.

It will be seen from the previous discussion that all coding units are restored to normal and placed in the proper receiving condition prior to the release of relays OIL and IL to condition the system for transmission of the next code.

When relay M releases, closing of its back contact h completes a circuit over back contact j of relay 1 and wire 179 to connect wire 246 to wire 237 to maintain the temporary stick circuit for relay ST closed after relay LB releases and opens its front contact c. When relay S releases, the dropping of its continuity transfer contact e restores the normal stick circuit over which relay ST is held energized until a change occurs in the position of one of the indicating relays to initiate a new code.

The release of relay M also completes a circuit for energizing relay MSTP, shown on Fig. 2f. This relay, a repeater of the M and ST relays, is energized over a circuit which may be traced from terminal B at back contact k of relay M over wire 177, normal contact d of relay ST, wire 238, through the winding of relay MSTP to terminal N. The relay MSTP picks up and prepares circuits for picking up the various TKSR relays, especially in this case the relay 3TKSR, when the corresponding TR relay is again picked up. The circuit for picking up relay 3TKSR may be traced from terminal B at front contact b of relay MSTP over front contact a of relay 3TR, through the winding of relay 3TKSR to terminal N. Thus, when the train clears the track section 3T so that the shunt is removed and relay 3TR picks up, the relay 3TKSR may also pick up. This, of course, would again release the relay ST initiating another code. If the relay 3TR is already picked up when the transmission of the indication code is completed and the relay MSTP picks up, the relay 3TKSR would pick-up immediately. Since the resultant release of the relay ST, as described, would also result in the release of the relay MSTP, a condenser C is added in multiple with the winding of the relay 3TKSR to assure sufficient energy storage to complete the pickup of this relay under such conditions. When the relay 3TKSR is picked up, it completes a stick circuit from terminal B at its own front contact a over front contact a of relay 3TR through the relay winding to terminal N. Use of these track indication storage relays, such as the relay 3TKSR, assures the transmission to the office of the indication of track occupancy for these short sections, for the purpose of recording such occupancy in the office by pen magnets which are usually provided in systems of this type.

Each of the various relays TKSR also control a circuit for restoring the magnetic stick signal control relays to normal when a train enters a track section to release the corresponding relay TR. This prevents the automatic clearing of the signals, when a train vacates the short track section, without requiring additional repeater relays. The circuits for restoring the signal stick control relays to normal, one of which was previously traced, are obvious from an inspection of the drawings.

A change in position of one of the indicating relays may occur during the transmission of the indication code just described. If this occurs prior to the transmission of any of the indicating steps, that is, prior to step nine, the relay ST will be reenergized on the eighth step and but one code will be transmitted. Since the pickup circuit for relay ST is opened at the beginning of the ninth step, the temporary stick circuit by which relay ST is held energized will be opened to cause it to release again if a change in the position of any of the indicating relays occurs subsequent to the transmission of the eighth step. Thus, a new indication code will be transmitted to indicate the new condition. This will occur even though the new indication may already have been included in the initial code, as was assumed in the previous description for the transmission of the track occupied indication for track section 10AT, on the twenty-eighth step of the code.

It may also occur, due to a fault, that the transmission of the code is interrupted before the final step is reached and the normal stick circuit for relay ST restored. If an extended pause in the operation of relay R occurs, after relay ST has been picked up, relay LP will remain released, releasing the relay LB. In this instance, relay LB will open its front contact c before relay M releases. This releases the relay ST and thereby conditions the apparatus to retransmit the code in its entirety when the line again becomes available.

I shall now describe the operation of the office apparatus of Fig. 1 in receiving an indication code. It will be understood that relay OR is operated through transformer RT to the right or reverse position on each odd-numbered step and to the left or normal position on each even-numbered step. The relay OR thus operates its timing and counting relays through the code steps in unison with the corresponding relays at the transmitting station.

On the first step, relays O1L, O1, E, PC and PCP pick up, as already described, as well as relays O2L, OLP, OLB and OLBP. However, relay O1L does not release because the first step is relatively short. Selected ones of the office relays F, G and S pick up on the steps corresponding to the digits of the station code call. More particularly, in response to code call 234, relays 2F and 23G are operated on steps 2 and 3, respectively, and relays 234S and SP on step 4. In the receiving condition, back contact d of relay OLP in the circuits for these relays is bridged by front contact f of relay PCP so that these relays are picked up upon the closing of back contact d of relay O1L or O2L, respectively, on the long steps.

The pickup of relay PCP also prepares a circuit extending from terminal B over front contacts c of relays O1L and O2L, front contact e of relay PCP, wire 59, front contact c of relay SP, through the upper winding of the office code disagreement relay OCD to terminal N. Since relay SP is picked up over a back contact of relay O1L or O2L, the circuit for relay OCD is held open on the step on which the relays S and SP are operated and closes as soon as the relays O1L and O2L are both picked up at the beginning of the next step following the final digit of the station code call, that is, on the fifth step when the code call is 234. When relay OCD picks up it completes a stick circuit over its own front contact a, and through its lower winding, extending over wire 60 to terminal B at front contact a of relay OLBP. This relay OCD prepares circuits, to be discussed hereinafter, to interrupt the indication code if a fourth long step is received during this station selection portion of the code; that is, the first eight steps. It also prepares a circuit, also described later, for energizing the various delivery relays which control the delivery of the received indications to the proper machine panels.

Relay OCR picks up on the eighth step, as previously described. Front contact f of relay PCP maintains the connection from terminal B at front contact a of relay OLBP over back contacts d of relays O1L and O2L to wires 63 and 64 after relay OCR picks up. The closing of front contacts b and d of relay OCR prepares circuits extending from these wires 63 and 64 to front contacts e of relays O1 to O7, inclusive, whereby a series of intermediate registry relays 9 to 15 are rendered responsive to the character of the correspondingly numbered steps of the code. In other words, when terminal B at the transmitting station in Fig. 2 is connected to any one of the wires 139 to 145 over a contact of an indicating relay, the corresponding step of the transmitted code will be prolonged, that is, a "positive" indication transmitted, and at the office the corresponding one of the registry relays 9 to 15 will be picked up. For example, if the eleventh code step is long, as was assumed during the description of the transmission of the indication code, relay O1L will release, closing its back contacts to complete a circuit from terminal B at front contact a of relay OLBP over front contact f of relay PCP, back contact d of relay O1L, wire 63, front contact b of relay OCR, front contact e of relay O3, through the winding of relay 11 to terminal N. Relay 11 picks up, and completes a stick circuit from terminal B at front contact c of the relay KR, shown on Fig. 1c, over wire 79, front contact j of relay OLBP, wire 76, front contact a and the winding of relay 11 to terminal N. Relay 11 also closes its front contact b to connect terminal B to wire 51. It is to be noted that the indication reset relay KR is picked up prior to this time, the circuit being traced from terminal B at front contact e of relay OLBP, over wire 82, back contacts j of relays 24 and 16, through the winding of relay KR to terminal N. Since the fourteenth step of the indication code as described was also assumed to be long, the relay 14 will likewise be picked up on this step over a circuit similar to that described for relay 11 but including back contact d of relay O2L, wire 64, front contact d of relay OCR, and front contact e of relay O6. The stick circuit for relay 14 is as described for the relay 11 except including the front contact a of relay 14.

On the sixteenth step of the code, which is a long step, the relay 16, shown on Fig. 1c, picks up. Since the coding unit at the office is in the condition to receive a code, the relay OMP, shown also on Fig. 1c, is in its released position as its pickup circuit is opened at front contact g of the relay OM. The circuit for picking up the relay 16 then may be traced from terminal B at normal contact a of relay OR over resistor R12, front contact d of relay OLBP, wire 20, back contact a of relay O6, front contact b of relay O7, front contact h of relay OCR, back contact g of relay O8, wire 87, back contact d of relay OMP, an adjustable connection, front contact d of relay 234S, and through the winding of relay 16 to terminal N. When relay 16 picks up, it completes a stick circuit over its own front contact a which may be traced over back contact a of relay 24, wire 91, and back contact b of relay O1 to wire 20.

When relay 16 picks up, it also closes a circuit from terminal B over front contacts c of relays OCR and OCD, wire 93, front contacts b of relays KR, 234S and 16, wire 109, through the winding of the associated delivery relay 234D to terminal N. Relay 234D therefore picks up to allow operation of the indication relays K, of the group which it controls, in accordance with the positions of the registry relays 9 to 15. Relay 234D opens the stick circuits for these relays K at its back contacts a to g, inclusive, and prepares over the similar front contacts the pickup circuits for each of these relays. These pick up circuits extend over wires 49 to 55 to terminal B at front contacts b of the aforesaid relays 9 to 15, respectively, whose positions indicate the position of the station indicating relays of the group controlling the transmission of the code. For example, we have already described that, since the eleventh step of the code is long, relay 11 is in its picked-up position. A circuit is completed then from terminal B over front contact b of relay 11, wire 51, front contact c of relay 234D, through the winding of relay 1RWK to terminal N. Since relay 14 is also picked up, the relay 4AK will be picked up over a similar circuit.

When any of the indication relays on Fig. 1d are picked up, as has just been described, they cause lamps to be lighted on the panel in the office to produce a visual display of the positive indications transmitted by the field station. For example, the picking up of the relay 1RWK causes the lamp 1RWE to be lighted. Likewise, the picking up of relay 4AK causes the lamp 4AE in the track diagram to become lighted. The circuits supplying energy to the lamps over front contacts of the indication relays are obvious by inspection of the drawings. The indication is thus displayed for the operator that the switch 1W is in its reverse position and that the track section 4AT is occupied. The system of indicating relays and indication lamps, as shown on Fig. 1d, is a typical system for displaying such indications. It should be understood that other methods may be used. Additional indications and recorders may also be added as illustrated in Fig. 1c of the aforementioned Patent 2,411,375. In that drawing there are shown recording pens, bells, and buzzers for causing audible indications or a permanent record. Such may be used with the system shown here. Since these indicating circuits are not part of my invention, they are shown as simply as possible in order to merely illustrate the end result of the codes and operation of the coding units herein described.

Since the indication code as transmitted from the station shown in Fig. 2 was thirty steps in length, it is necessary to cause the office coding unit to repeat the action of its counting chain to provide an equivalent number of code steps at the office for receiving the indication. The manner of extending the code at the office is very similar to the operation described in connection with the transmission of the control code. The relays 16 and 24 will pick up on the similarly numbered code steps to cause necessary repeat actions of the counting chain relays. The chief difference in operation is in the fact that the relay OMP is, as previously mentioned, in its released position since the coding unit is conditioned to receive a code and not to transmit one.

When relay 16 picked up, it opened the circuit for the relay KR at its back contact j. However, as previously described, the relay KR is a slow release relay and its release is further retarded by the use of a half-wave rectifier. This gives sufficient time for several other actions to take place. The opening of back contact e and closing of front contact f of relay 16 transfers the stick circuit for relay 234S from wire 30 to terminal B at front contact a of the relay KR. The closing of front contact e of the relay 16 completes a circuit from wire 30 over front contact m of relay 234S through the winding of relay 234SA to terminal N and this latter relay thus picks up. The relay 234SA completes a stick circuit over its own front contact a and back contact e of relay 24 to the wire 30. The relay KR now releases, opening the circuits for the relays 234S and 234D at its front contacts a and b, respectively. The S and D relays then release. The various indication relays K which were picked up over front contacts of relay 234D now stick up from energy at terminal B at their own front contacts over corresponding back contacts of the relay D. Release of the relay KR also releases the intermediate registry relays 9 to 15 by opening their stick circuits at the front contact c of relay KR. Thus, these relays 9 to 15 are released and are available for reuse on the second set of indication steps, that is, the seventeenth to twenty-third steps of the code, inclusive.

Closing of front contacts of relays 16 and 234SA completes the circuit to allow relay O1 to pick up again on the seventeenth step of the code and begin a repeat action of the counting chain. This circuit may be traced from wire 19 over front contact g of relay OCR, back contact a of relay O7, back contact b of relay O8, wire 88, front contact g of relay 16, front contact k of relay 234SA, and wire 81 to the winding of relay O1. When relay O1 picks up, opening of its back contact b interrupts the stick circuit for relay 16 and this relay releases. Release of relay 16 allows the relay KR to pick up once again so that the registry relays 9 to 15 may again stick up over their own front contacts a.

The primary counting chain cycle now repeats to follow the steps 17 to 23 from the field station. The action is similar to that described for steps 9 to 15. Long steps in the code cause the corresponding relays 9 to 15 to pick up and stick up over their own front contacts. Since in describing the transmission of the indication code, the steps 18, 19 and 20 were assumed long, the relays 10, 11 and 12 correspondingly pick up and stick up. For example, when relay 2L releases on the long eighteenth step, it completes a circuit from terminal B at front contact a of relay OLBP over front contact f of relay PCP, back contact d of relay 2L, wire 64, front contact d of relay OCR, front contact e of relay O2, through the winding of relay 10 to terminal N.

On the twenty-fourth step, which is a long step, the relay 24 is picked up. The circuit for this is similar to that for the relay 16 except that from wire 87 it extends over back contacts d of relays OMP and 16 to an adjustable connection, and thence over front contact d of relay 234SA through the winding of relay 24 to terminal N. Relay 24 picks up and completes a stick circuit over its own front contact a to wire 91. The picking up of relay 24 also completes a circuit to pick up the relay 234DA. This circuit may be traced from terminal B over front contacts c of relays OCR and OCD, in series, wire 93, front contacts b of relays KR, 234SA, and 24, wire 110, through the winding of relay 234DA to terminal N. Relay 234DA, on picking up, completes circuits over its front contacts a to g to energize a second group of indication relays K, according to the position of the registry relays 9 to 15. Since, as previously described, the relays 10, 11 and 12 are in the picked-up position, the indication relays 3TK, 3RWK, and 4LHK are picked up over wires 50, 51, and 52, and front contacts b, c, and d, respectively, of relay 234DA. These relays cause the display, as previously described, of corresponding indications on the panel, that is, the lamps 3RWE, 3TKE, and 4LHE are lighted.

The opening of back contact j of the relay 24 deenergizes relay KR. However, as previously described, the relay KR holds up for a considerable period to allow the completion of other actions during this code step. The relay 24 picking up also causes, by the opening of its back contact e and closing its front contact f, the stick circuit of relay 234SA to be transferred from wire 30 to terminal B at front contact a of the relay KR. Closing of the front contact e of relay 24 completes a circuit from wire 30, over front contact m of relay 234SA, through the winding of relay 234SB to cause this relay to pick up. Relay 234SB completes a stick circuit, upon picking up, from wire 30 over its own front contact a. The relay KR now releases to open the circuits for the relays 234SA and 234DA, and these two relays release. In a manner similar to the K relays of the first group, the indication relays K of this group controlled by relay 234DA stick over back contacts of the relay 234DA with energy from terminal B at their own front contacts. Release of relay KR again releases the intermediate registry relays 9 to 15 to permit their reuse on the next group of code steps.

The picking up of relays 24 and 234SB prepares a circuit between wires 88 and 81, over the front contacts g and k of these relays, respectively, and back contact g of relay 16, to permit the relay O1 to pick up again to begin another repeat action of the counting chain cycle. When relay O1 picks up and opens its back contact b, it interrupts the stick circuit for relay 24 which then releases, its pick up circuit having been previously opened at front contact b of relay O7. The counting chain action repeats in the manner previously described. The relays 9 to 15 will be picked up according as the corresponding code steps 25 to 31 are long. When relay 24 released, the relay KR picked up again, energized over a circuit previously described. This allows such intermediate registry relays as are picked up by the long code steps to stick up as before over their own front contacts a. As was described in the transmission of the indication code, the steps 26 and 28 are long so that the relays 10 and 12 are picked up.

However, the field station 234, as previously described, transmits only 30 steps in its indication code, that is, the final cycle of operation of the primary counting chain is not a complete cycle. The office coding unit must therefore also reset on the thirtieth step simultaneously with the reset of the field station. This is necessary in order that the line circuit may properly return to its normal at-rest condition. In order to terminate the action of the office coding unit, it is necessary to cause the relay OCS, the final relay of the secondary counting chain, to pick up. This is similar to the method of terminating the control code, as was previously described. However, in this case, since the indication code is longer than was the control code, a slightly different circuit is necessary to energize the relay OCS on the thirtieth step. As is shown in Fig. 1c, adjustable connections are provided in the office for this purpose. The circuit for energizing the relay OCS on the thirtieth step of the indication code may be traced from terminal B at normal contact a of relay OR over resistor R12, front contact d of relay OLBP, wire 20, back contact a of relay O4, front contact h of relay O5, wire 86, back contact c of relay OMP, thence over an adjustable connection and front contact d of relay 234SB, wire 80, front contact j of relay OCR, through the winding of the relay OCS to terminal N. Relay OCS thus picks up and completes a stick circuit extending to wire 20 over its own front contact a, wire 48, and front contact b of the relay OLB.

Closing of front contact f of the relay OCS completes a circuit traced from terminal B, over front contacts c of the relays OCR and OCD, front contact f of relay OCS, wire 56, front contact d of relay 234SB, wire 111, through the winding of relay 234DB to terminal N. The relay 234DB then picks up to complete a circuit for energizing the indication relays K of the final group. Thus the relays K of the final group of indicating relays are energized on the last step of the code over front contacts of the relay 234DB and wires 49 to 55 according to the relays of the registry group 9 to 15 that are picked up, the circuits being obvious from an inspection of the drawing. In the present case, the relays 10 and 12 are in the picked-up position so that the relays 6AK and 10AK are energized and pick up. This causes the indication lamps 6AE and 10AE to be lighted, indicating to the operator that these track sections are occupied.

The opening of back contact c of relay OCS on the thirtieth step of the code releases relay PC, which in turn releases the relay PCP. The release of relay PC restores the line polarity to normal, the relay OR being held normal by a previously described circuit, including back contact f of relay PC, and front contact a of relay PCP, until relay PCP releases. Relay OR is also disconnected from the secondary of transformer RT by the opening of back contact d of relay OCS, this circuit also including the back contact c of relay OM, wire 74, wire 75, and back contact c of relay X. The office timing relays then release in the normal order, relay O1L being the last to release. Release of relay OLB interrupts the stick circuit for relay OCS and this relay then releases. Release of the relay OCS deenergizes relay 234DB and the release of this relay, closing back contacts a to g, reestablishes the stick circuits for the indication relays K of the final group that were energized. Opening of front contact a of relay OLBP deenergizes the relays OCR, OCD, SP and 234SB. The opening of front contact j of relay OLBP releases the energized relays of the registry relay group 9 to 15. This completes the resetting of the office coding equipment and, since the field station that transmitted the indication code reset at the same time, the entire system is now in its normal at-rest position and is prepared for the transmission of additional codes.

This completes the transmission of an indication code by a field station and its receipt by the office coding unit. It has been shown that the indications of the position or condition of all of the wayside devices, shown in Fig. 2e, which determine the position of the indication relays of Figs. 2e and 2f, have been transmitted to the office and recorded on the proper panels of the office machine, in this case the panels shown in Fig. 1d. Only one code, using one station code call, was required to transmit the information. It is to be seen, then, that the information thus displayed on the machine panels provides the dispatcher with a current record of the conditions at the field location.

In the preceding paragraphs, the circuits and operation of the relays in terminating both the control and indication codes have been discussed in connection with the general operation of the coding units. At the particular station illustrated, that is, the station, 234, the control code ended on the twenty-sixth step and the indication code on the thirtieth step. It was shown that it was a feature of the apparatus that the code may be ended as desired on any even-numbered code step beginning with the tenth step. Also, it was shown that the lengths of the control and indication codes were relatively independent of each other. However, in the apparatus as shown in Fig. 1 and Fig. 2, there is some limitation to this independent termination of the control and indication codes. If the codes are to be less than sixteen steps in length, the indication code must be equal to or longer than the control code. With the apparatus as shown in Fig. 2, if a control code consists of eighteen or more steps, then the indication code at that station must be at least eighteen steps in length. A modification of the apparatus will be discussed shortly which will allow the indication code to be terminated, as desired, completely independent of the length of the control code.

As has been mentioned previously, the ability to terminate a code as desired is a particular feature of my invention. Therefore, I shall discuss several examples of code termination of different lengths. Referring now to Figs. 3 and 4, there is shown thereon circuits for terminating the code for several stations, each station having a code of different length. For purposes of clarity in discussing the drawings, the station code calls have been selected as 234, 267, 235, 245, and 256. Except for station 235, the control and indication codes are also of different lengths at each station. For purposes of this illustration, I shall assume that the code lengths are as shown in the following tabulation:

| Station | Length of Code | |
|---|---|---|
| | Control | Indication |
| 234 | 26 | 30 |
| 267 | 22 | 28 |
| 235 | 16 | 16 |
| 245 | 12 | 14 |
| 256 | 20 | 18 |

The length of the codes at the station 234 shown here are exactly the same as those of the station 234 in the previous discussion. This is done in order to provide a point of continuity between the previous discussion of the coding action and the illustration here of the termination of the various codes.

The office circuits necessary to provide the code terminations listed in the preceding paragraph are shown in Fig. 3. This drawing is used in place of the upper right portion of Fig. 1c during the following discussion. The terminations of the various wires shown at the left of Fig. 3 serve to provide a point of connection between this drawing and the remainder Fig. 1c. Front contacts of the various station selection relays S, SA and SB for the stations used in this illustration are shown. The relay windings and control circuits are not shown. However, the control and energization of these relays is similar to that shown and previously described for relays 234S, 234SA, and 234SB and need not be repeated here.

The circuits which these relay contacts control are slightly modified from similar circuits shown in the portion of Fig. 1c which this drawing replaces in that the relay OMP is shown with only one front and back contact $a$. The heel of this contact $a$ is then connected to wire 80 instead of the four contacts as shown in Fig. 1c being connected to wires 84, 85, 86, and 87, respectively. Also, when the relays 16 and 24 are picked up during both the control and indication codes for a station, only one contact of the corresponding S or SA relay is used instead of two as shown previously. Either circuit arrangement will provide the same operation and result and it is a matter of choice as to which is used.

As has been previously described, in order to terminate either a control or indication code at the office, it is necessary to energize the relay OCS which then picks up to cause the coding action to terminate. Thus, front contact $c$ of relay 245S, when closed, establishes a connection between wire 85 and wire 80 over front contact $a$ of relay OMP to pick up relay OCS on the twelfth step and thus terminate the control code to that station. The front contact of the relay OMP in this circuit determines that it is a control code and, as previously described, the front contact $j$ of the relay OCR in the circuit between wire 80 and the relay winding prevents the relay OCS from being picked up on the fourth step of the code. Similarly, front contact $d$ of the relay 245S establishes a connection between wire 86 and wire 80 over back contact $a$ of relay OMP to pick up the relay OCS on the fourteenth step of an indication code. Again, the back contact of the relay OMP in this circuit establishes the fact that the office is receiving an indication code and the front contact $j$ of the relay OCR prevents the relay OCS from being picked up on the sixth step of the code. This action synchronizes the reset of the office coding unit with the coding unit at field station 245, and both units terminate their action on the same code step in a manner previously described. Similarly, front contact $c$ of relay 235S establishes a direct connection between wire 87 and wire 80. Thus both the control and the indication code for that station terminates on the sixteeth step. No contacts of the relay OMP are required since both codes terminate on the same step.

However, since both the control and indication codes at stations 234, 256, and 267 are longer than 16 steps, it is necessary for the relay 16 to pick up on the sixteenth step of codes to or from these stations to prepare circuits for a repeat cycle of operation of the primary counting chain. Thus, front contacts $c$ of relays 234S, 256S, and 267S establish a connection from wire 87 through the winding of relay 16 to terminal N to energize this relay on the sixteenth step of any code selecting these stations.

During the first repeat cycle of the primary counting chain for codes for station 256, front contacts $d$ and $c$ of the relay 256SA establish connections between wires 84 and 85, respectively, and the wire 80 over back and front contact $a$, respectively, of relay OMP, to terminate the codes for this station on the eighteenth step, for the indication code, and the twentieth step, for the control code. During a similar repeat cycle for a code selecting station 267, front contact $c$ of relay 267SA establishes a connection between wire 86 and wire 80 over front contact $a$ of relay OMP to terminate the control code for that station on the twenty-second step.

Since both codes for station 234 and the indication code for station 267 are longer than 24 steps, at least a portion of another repeat cycle of operation of the primary counting chain is required for these codes. Therefore the relay 24 must pick up on the twenty-fourth step to prepare the circuits for this reuse of the chain. Relay 24 is energized at the proper times by a circuit established from wire 87 over back contact $c$ of relay 16, and front contact $c$ of relay 234SA or front contact $d$ of relay 267SA through the winding of the relay 24 to terminal N. These circuits are carried over back contact $c$ of relay 16 to prevent the premature energization of relay 24 in multiple with the stick circuit of relay 16. A discussion of this possible sneak circuit was included previously and will not be repeated here. It is to also be noted that since the control code for station 267 terminates on the twenty-second step, no opportunity is presented for relay 24 to become energized during this code. Thus it is not necessary to also check the energizing circuit established by front contact $c$ of relay 267SA over a back contact of relay OMP.

During the third repeat cycle of the counting chain, contacts of the relays 234SB and 267SB act in a manner similar to that described above as can be seen from an inspection of the drawings. The indication code at the station 267 is ended on the twenty-eighth step. At the station 234 the control code ends on the twenty-sixth step and the indication code on the thirtieth step, as has been previously described.

Referring now to Fig. 4, there is shown a composite drawing illustrating the code termination connections at the various field stations as listed above. The drawing in Fig. 4 is similar to the upper portion of Fig. 2d. Again, the wire terminals shown at the left of the drawing in Fig. 4 serve to provide a point of connection between this drawing and Fig. 2d. Front contacts of the relays MSP1 and MSP2 are shown in the drawing. The figures in parentheses immediately above each front contact serve to designate the field station at which that front contact is located, it being understood that this is a composite drawing of the circuits at several field stations and not at any one location.

As has been previously described, at a field station the relay CS is picked up to terminate the coding action only on an indication code. It is not necessary to pick up the relay CS during a control code since the reset action in that case does not depend upon this relay. During an indication code, however, energy must be applied to wire 199 in order to pick up the relay CS and thus cause the proper reset action at the field station.

At field station 235, a jumper is connected between wires 204 and 199 to cause the relay CS to pick up on the sixteenth step of the code, thus terminating the indication code. At this station, since the control code also terminates on the sixteenth step, the relay CS would likewise be picked up on the final step of the control code but this operation of the CS relay would have no effect upon the operation of the coding unit. At field station 245, a jumper is connected between wire 203 and wire 199 to cause the CS relay to pick up on the fourteenth step of a code, and thus end the indication code on that step. The previously described front contact $m$ of the relay CR in the circuit for energizing the relay CS would prevent the picking up of this relay upon the sixth step of the code.

At field station 256, a connection is established between wire 201 and wire 199 over front contact $m$ of the relay MSP1. At this station the relay CS is then picked up on the eighteenth step of the indication code to terminate the coding action of the unit. The inclusion of the front contact of the MSP1 relay in this connection assures that the relay CS is picked up on this step only during an indication code. This is necessary since, at this station, the control code is twenty steps in length. Also, since the relay MSP1 does not pick up until the sixteenth step of the indication code, the relay CS will be energized only during the third cycle of operation of the counting chain, that is, code steps 17 to 24.

As has been previously mentioned, if a control code at a station is eighteen steps or more in length, the indication code, using the apparatus as shown in Fig. 2, must be at least eighteen steps in length. If, for example, at the station 256 only fourteen steps were required for the indication code, it would still be necessary to make the indication code eighteen steps in length. If a jumper similar to that shown for station 245 were connected, receipt of a control code at the station 256 would also cause the relay CS to pick up on the fourteenth step, resetting the coding apparatus at that station in advance of the actual termination of the control code. However, if a front contact of the relay MSP within the coding unit were included in the connection between wire 203 and wire 199, the indication code could be terminated on the fourteenth step, since the MSP relay would not be picked up during the receipt of a control code by this station. This modification of the coding unit at a field station has not been shown because the usual installation requires more steps in the indication code than is required in the control code.

At the stations 234 and 267, the front contacts m of the relay MSP1 are used to energize the relay CE2, completing the connection from wire 204 through the winding of the relay CE2 to terminal N. Picking up of the relay CE2 causes another repeat action of the counting chain cycle to further extend the code. Then, at station 267, a connection is completed between wire 202 and wire 199 over a front contact m of the relay MSP2 to terminate the indication code on the twenty-eighth step. Similarly, at station 234, the wire 203 is connected to wire 199 over a similar front contact m of the relay MSP2 to end the indication code at this station on the thirtieth step. The front contacts of the MSP2 relays are required in the code ending circuits only to assure that the relay CS is not energized until fourth cycle of operation of the primary counting chain, that is, during code steps 25 to 32.

Thus, it has been shown that the coding action at any station can be terminated on any even-numbered step, as desired, without regard to the length of the code at the other stations. Also, within certain limitations, as have been previously described, the control and indication codes at a station may be of different lengths, as desired, and as necessary to transmit the control functions and the indications between the office and the field location. By providing a system of adjustable connections, it is possible to use identical coding units and extension units at each of the field stations. The desired length of the code is then determined by the proper installation of jumpers between the various terminals provided for establishing the various adjustable connections. Also, at the office, the length of the code and synchronizing of the office and the field during an indication code is not dependent upon the office coding unit itself but upon external relays and connections which are completed as required to provide the desired operation in terminating the various codes. A very flexible remote control system using standard items of equipment can thus be installed to give a desired operation at each location.

I shall next describe how the system is restored to normal in the case of a fault.

A control code may be terminated on an odd-numbered step due to a fault, relay OT being held energized over wire 68, for example. Relay OR is then held reversed until the timing relays O1L, OLP, OLB and OLBP release, relay O2L remaining energized. Relay OLBP then releases relay OM and opens the counting and selecting relay circuits. The release of relay OM with relay OR reversed allows relay PC to pick up, which in turn, picks up relay PCP. Relay OM also releases relay OT.

At each station, relay R remains released and the timing relays release in the same order, relay 2L remaining energized. Relay LBP opens the counting and selecting relay circuits to prevent further reception. The release of relay OT closes the line circuit, but the relays R do not pick up because the polarity has been reversed by relay PC.

When relay PCP picks up, relay OR is operated to normal over the circuit from terminal O through its lower winding, back contacts e of relays OT and OM, back contact b of relay X, front contacts f and b of relays PC and PCP, respectively, back contact f of relay OLBP, front contact f of relay O2L and back contact f of relay O1L to terminal N. The office timing relays are thereby reenergized and relay PC is deenergized, relay PC releasing before its stick circuit is completed by relay OLBP picking up. This releases relay PCP. The office timing relays then release in the normal order due to the deenergization of relay O2L, relay O1L being the last to release.

When relay PC releases it restores the line polarity to normal so all the line relays R pick up in unison, reenergizing their timing relays, and the timing relays at each station then release in the normal order due to the deenergization of relay 2L, relay 1L bing the last to release.

If a control code is terminated on an even-numbered step prior to the desired final step, due to the failure of relay OT to pick up, relay OR is held normal and the timing relays release in the normal order, relay OLBP releasing the counting and selecting relay circuits and also releasing relay OM. Relay O1L is, as usual, the last to release. The station line relays R remain steadily energized and their timing relays release in the normal order as at the end of a complete code, relay 1L being the last to release. This action is similar to that which occurs when a control code is purposely terminated on a selected even numbered step, except that relay OCS does not pick up.

If an indication code is terminated on an odd-numbered step, as for example, would be the case if relay T remained picked up due to a fault, relay OR remains reversed until relay OLBP releases, relay O2L remaining picked up. Relay OR is restored to normal upon the closing of back contact f of relay OLBP over the circuit previously traced which includes front contacts of relays PC, PCP and O2L, and back contacts f of relays OLBP and O1L.

At the transmitting station, relay R remains released, and the timing relays 1L, LP, LB and LBP release. Opening of front contact e of relay LB releases relay M, which in turn releases relay T. This removes the line shunt applied by contact b of relay T, while contacts b and d of relay M reverse the line connections for relay R so that relay R remains released. Thus the apparatus assumes the same condition as at the other stations where relay R and the timing relays stand released with relay 2L picked up.

When relay OR is restored to normal, the office timing relays are energized and relay PC is deenergized and releases before relay OLBP picks up. The office timing relays then release in the normal order, relay O1L being the last to release. When relay PC releases, it restores the line polarity to normal so all the line relays R pick up in unison, reenergizing their timing relays, and the timing relays at each station then release in the normal order, relay 1L being the last to release.

If an indication code is terminated on an even-numbered step other than the selected step, due to the failure of relay T to pick up, relay OR remains normal until the timing relays O2L, OLP, OLB and OLBP release. The closing of back contact f of relay OLBP completes a circuit, for operating relay OR to reverse, extending from terminal B at front contact d of relay PCP over back contacts f of relays O2L and OLBP, front contact b of relay PCP, front contact f of relay PC, back contact b of relay X, back contacts e of relays OM and OT, through the lower winding of relay OR to terminal O.

At the transmitting station, relay R remains picked up and the timing relays 2L, LP and LB release. Relay LB releases relay M, which reverses the connections for relay R. Relay R operates to its reverse position, reenergizing the timing relays which then release in the order 1L, LP, LB and LBP, the apparatus assuming the same condition as at the other stations where relay R and the timing relays stand released, with relay 2L picked up.

At the office, since relay OR is reversed upon the release of relay OLBP, the pickup circuit for relay PC is closed when its stick circuit opens and this relay remains picked up. The office timing relays are reenergized and then release in the order O1L, OLP, OLB and OLBP, relay O2L remaining picked up. Relay OR is restored to normal upon the closing again of back contact f of relay OLBP over a circuit previously traced which includes front contacts of relays PC, PCP and O2L, and back contacts of relays OLBP and O1L. When relay OR is restored to normal, the office timing relays are reenergized and relay PC deenergized, relay PC releasing before relay OLBP picks up. The office timing relays then release in the normal order. Relay PC restores the line polarity to normal to pick up the station line relays, the station timing relays being reenergized and releasing in the normal order, as in the preceding examples.

It will be seen that in each case, regardless of their initial positions, the line relays OR and R are all restored to normal at substantially the same time so that each releases its timing relays in the normal order to place all of the coding units in the proper receiving condition before relay O1L or any of the relays 1L release to permit the initiation of the next code. Generally the office has a preferred chance to send the next code because relay O1L releases slightly before the relays L1 release.

It has already been explained that, if due to a fault, an indication code is interrupted after the station starting relay ST is reenergized, relay ST will be released again due to release of relay LB before relay M releases. It will be clear, therefore, that each interrupted indication code will be reinitiated for transmission in its entirety after the line becomes again available. This is true of a control code only in the event the interruption occurs before the office starting relay ST is released, as occurs on the eighth step of the station code call. Otherwise a second operation of the starting button STB is required.

It may also happen that relay OR is operated by one or more impulses of foreign current, or as the consequence of a temporary line cross or open when the system is in its normal at-rest condition. In this case the first reversal of relay OR picks up relay PC, reversing the line polarity and releasing the line relays R to prevent the initiation of a code by any station. When the interference terminates, the system restores itself to normal in the same manner as in the case of an interrupted indication code, as described above.

I shall next describe the means for preventing interference and for transmitting codes one at a time in the desired order, when two or more transmitters have codes stored for transmission. The inclusion of the back contacts b of relays 1L and 2L in the pickup circuit for each relay M, and the similar circuit for relay OM, prevents the initiation of a code except when the line is free, as has already been made clear, but it may readily happen that the office and one or more stations initiate codes at substantially the same time. If relay OM picks up, the control code will prevail, since the back contact b of relay OM will open the circuit for relay PC and the long line open step generated by relay OT will hold the line relays R released to pick up the code disagreement and delivery control relay CD at each station as in the control code already described. At any station at which relay M has been picked up to initiate an indication code, terminal B becomes disconnected from wires 234 and 168, and relay M is released, by the opening of back contact e of relay CD. Consequently all station coding units are conditioned to receive the control code on the first step, the indication codes being stored for transmission subsequently.

In the event the coding units at two or more field locations initiate indication codes at the same time and by their joint action place the office coding unit in the receiving condition, the shunts applied to the line by that relay T which is nearer the office will govern the operation of the line relays R at more remote locations as well as that at the same location. The relays T will operate in unison as long as corresponding steps of the respective code calls are of like character. When one relay T holds a shunt applied to the line to generate a long odd-numbered step, it will overrule any relay T which releases at a more remote location for which the code call requires a short step. When relay T at the nearer station picks up to apply a shunt to the line, terminating a short even-numbered step, it will overrule any relay T which is held down at a more remote station as required for a long step. In either case, the relays R and T at the more remote locations will occupy their released positions simultaneously on one of the steps of the station code call for a time sufficient to energize a lockout circuit extending from terminal B at the reverse contact a of relay R over wire 171, back contact e of relay CS, wire 172, front contact b of relay LBP, back contact d of relay T, front contact j of relay M, wire 166, back contacts j of relay CR and c of relay 1, through the upper winding of the code disagreement relay CD to terminal N. Relay CD will therefore pick up and by opening its back contact e will disconnect terminal B from wires 234 and 168, releasing the associated relay M. Since the line is now supplied with current of reverse polarity, the release of relay M renders the associated relay R at the inferior station non-responsive to the remainder of the code, causing the timing relays L and the energized counting relay at that station to release, its code being stored for subsequent transmission when the line is again free.

It will be seen therefore in respect to line action, a long odd-numbered step takes precedence over a short one and a short even-numbered step takes precedence over a long one. For this reason it is desirable to assign the code calls to the several locations in a geographical order so that each call is superior to those for more remote locations and inferior to those for stations nearer the office. In respect to line action, the order of superiority of the code calls is as shown by the following table, in which each code call is superior to those below it in the same column and to all those in other columns to the right.

| 357 | 368 | 578 | 458 | 235 | 257 | 268 |
| 358 | 345 | 567 | 456 | 237 | 258 | 245 |
| 356 | 347 | 568 | 478 | 238 | 256 | 247 |
| 378 | 348 | 678 | 467 | 236 | 278 | 248 |
| 367 | 346 | 457 | 468 | 234 | 267 | 246 |

It will be noted that a different order prevails when the codes are transmitted from the same location, in which case a long step takes precedence over a short step. For example, if all the office starting buttons are operated at the same time, the code call 234 will be the first, and 678 the last to be transmitted.

In order to provide a further safeguard against the transmission of indication codes from two stations at the same time, in the event of a fault, an additional lockout relay X is provided at the office.

Relay X serves to interrupt the transmission in the event a code call is received which contains more than three digits. For example, it may be assumed that one station may be allowed to transmit the code call 235 and another the code call 245, at the same time. If this occurs the selector relay 234S will be operated on the fourth step to select a panel which belongs to neither station, and relay OCD will be operated on the next step, the fifth in this instance, as hereinbefore described. When relay OCD picks up, its contacts b and d shift the connections of wires 63 and 64 from the d contacts of the counting relays to wire 57. If the fifth step then is long, a circuit is completed from terminal B at front contact a of relay OLBP over front contact f of relay PCP, back contact d of relay O1L, wire 63, back contact b of relay OCR, front contact b of relay OCD, and wire 57 through the winding of relay X to terminal N. Relay X picks up and completes a stick circuit over its front contact a. Relay X will also pick up on the seventh step over the circuit described, if this is the fourth digit of the received code call. Relay X may likewise be picked up on the sixth step, over the circuit from the terminal B at front contact a of relay OLBP and completed over back contact d of relay O2L, wire 64, back contact d of relay OCR, and front contact d of relay OCD to wire 57. On the eighth step, relay OCR picks up, opening the circuits traced above to prevent the operation of relay X during the second cycle of operation of the counting relays. However, in case this eighth step is the fourth long step of a received code call, relay OCR prepares a circuit, for energizing relay X, which extends from wire 64 over front contact d of relay OCR, front contact e of relay O8, and front contact d of relay OCD to wire 57 and thence through the winding of relay X to terminal N.

It follows that if a code call is received containing more than three long steps, relay X is picked up on the fourth of these long steps received. When relay X picks up, it opens the line circuit at its back contact d to release the line relays R at the transmitting stations, if these are picked up, interrupting the indication code. The opening of its back contact c disconnects relay OR from transformer RT and the closing of its front contact b completes a circuit from terminal B over back contacts e of relays OM and OT through the lower winding of relay OR to terminal O to operate relay OR to reverse.

Relay OR is held reversed by relay X until relay OLBP releases, whereupon relay X is released. Relay OR is then restored to normal over a circuit already traced which includes front contacts of relays PC, PCP and O2L and back contacts f of relays OLBP and O1L. All the line relays R and all the station timing relays except the relays 2L now stand released, due to the reversed polarity of the line current, the relays M at the transmitting stations having been released as a result of the opening of the line circuit by the pick up of relay X. When relay OR is restored to normal, the office timing relays are reenergized and relay PC released, and the office timing relays then release in the normal order. The release of relay PC restores the line polarity to normal so that the line relays R pick up, reenergizing their timing relays, and the timing relays at each station then release in the normal order.

It will be clear from the foregoing that no interference occurs when a plurality of starting relays ST at the office and stations are operated at the same time, or when the line is in use, and that the codes will be transmitted one at a time in order in accordance with the relative superiority of their respective code calls.

The system of my invention also includes provisions for preventing those stations having superior code calls from monopolizing the use of the line under conditions of heavy traffic, or in the event the station starting relay ST fails to pick up at the end of a code. This is accomplished by the provision of a station sequence relay SS in each station coding unit. Relay SS serves to prevent the initiation of a second code by any station coding unit which has transmitted a code as long as any other station coding unit has a code stored for transmission.

Referring to Fig. 2c, it will be seen that relay SS is picked up on the steps representing the third digit of the station code call, over front contact h of relay MSP. Relay SS is then held energized over a stick circuit including its own front contact a, back contact h of the associated delivery relay D, and wire 165 extending to terminal B at front contact f of relay 1L or 2L. This circuit is opened by relay 1L when the system assumes its normal at-rest condition at the end of a code. Relay SS is slow to release and its back contacts b and c hold open the starting circuit, and also those which govern the transmission of the station code call, for an additional interval during which another station may initiate a code, and thereby hold relay SS picked up. It follows that when relay SS has been picked up, the station coding unit is rendered incapable of initiating a second code until after the line has been free for a time which is longer than the normal interval between successive codes. Each station coding unit having a code stored, at which relay SS has not been actuated, is given access to the line upon the release of relay 1L at the end of a code. Consequently each such storage unit will transmit one code during which its relay SS becomes energized. At the end of this series of codes, a longer period will elapse to allow the relays SS to release, whereupon the station units will be again conditioned to transmit codes one at a time in sequence.

In the event a control code is interposed in a sequence of indication codes as above described, for the purpose of operating a particular device, and the relay SS of the station coding unit governing such device has been picked up, it will be released by the operation of the delivery relay D in response to the control code. The unit will be thereby conditioned to indicate the condition of the operated device more promptly.

It will also be evident that each relay SS serves also to prevent continued initiation of incomplete codes by a station storage unit due to a fault, if other units have codes stored for transmission. This is true provided the fault is not of such a nature as to prevent relay SS from becoming energized, as would be the case, for example, if the code transmitted by a station coding unit having a superior code call does not progress far enough to pick up the station relay S at that station.

To protect against this and other conditions, a thermal relay COR is provided, arranged as shown in Fig. 2a. Relay COR is energized whenever an indication code is initiated by the coding unit, from the time the starting relay ST releases to initiate the code until the code is fully transmitted. Until the relay SS is picked up by relay MSP on the station selecting step of the code, relay COR is energized over the circuit extending from terminal B at reverse contact b of relay ST over back contact b of relay SS, wire 147, front contact b of relay RP, and back contact a and the heating element of relay COR to terminal N. When relay M picks up, it provides a connection from terminal B over its front contact k for energizing relay COR until the end of the code.

The time relay COR is energized may exceed the time required to transmit a code from the associated coding unit, even if no fault exists, by the time required to tarnsmit one code from each coding unit having a more superior code call, which interval, in practice, rarely exceeds one minute. On the other hand, in the event of a fault which prevents the reenergization of relay ST, relay COR is energized substantially continuously. Relay COR is made selectively responsive to a fault by adjusting it to open its contact a after it has been energized for a time interval of about two minutes, the opening of its contact a deenergizing its heating element and also interrupting the pickup circuit for relay M. Contact a of relay COR is of the snap action type and remains open for about two minutes, and after reclosing, if terminal B remains connected to wire 147, will operate cyclically with closed periods of one minute and open periods of two minutes, approximately. It follows that relay COR operates in such a manner as to prevent the defective transmitter from obtaining access to the line for periods of about two minutes during each three minute interval, as long as the fault persists.

The system of my invention also includes a fault relay RPP by means of which any station coding unit may be readily isolated from the line. This is of ultility, for example, in the event of a short circuit in the line connections, in case of faulty operation due to abnormally low local battery voltage, or to terminate the cyclic operation of relay COR. This feature is disclosed and claimed in Letters Patent of the United States No. 2,376,569, issued May 22, 1945, to George W. Baughman, for Remote Control Systems. Relay RPP is a slow release relay which is maintained normally energized by a stick repeater relay RP of the line relay R. Relay RP is operated in accordance with the code operation of relay R, as long as relay RPP remains picked up. In the usual operation of the system, relay R remains steadily released for a maximum time of about six seconds, this being the time required to transmit a thirty-two step indication code from another station. Relay RPP is made sufficiently slow release to bridge this time interval by connecting the capacitor-resistor snub across its terminals. The energy stored in condenser C2 should provide a release period of from ten to fifteen seconds, so that relay RPP will not release unless relays R and RP remain released for an abnormal length of time, as would be the case if a short circuit developed between the front and back contacts d of relay N, for example.

Relay RPP at each station may be released manually from the office by pressing the disconnect button DB, of Fig. 1a, for a suitable length of time, say fifteen seconds. This energizes relay OT over back contact d of relay OM, and relay OT picks up. This opens the line circuit at back contacts b and d of relay OT, thereby releasing relays R, RP and RPP, in turn. When relay RPP releases, its back contact b short circuits the resistor R3, in series with relay R. At the same time, however, front contact a of relay RPP opens to insert a similar resistor R18 into the circuit for relay R at a point adjacent the line wires Y and Z. It follows that if the system is incapacitated due to a short circuit within the coding unit the line fault is removed by the insertion of a relatively high resistance in series therewith, the resistors R3 and R18, in practice, usually having a value on the order of 10,000 ohms each. The transmitting portion of the coding unit is thus effectively isolated from the system. At the same time the starting circuit including wire 147 is opened at front contact b of relay RP to prevent the further energization of relays COR and M. At each station at which no fault exists, relay R will pick up in response to the release of the disconnect button DB, since as far as relay R is concerned, the effect of the release of relay RPP is to merely replace the resistance R3 by an equivalent resistance R18 in its circuit. Relays RP and RPP, however, will remain released after relay R becomes energized, the holding circuit for relay RP being open at front contact c of relay RPP, and that for relay RPP at front contact a of relay RP The operator at the control office may now restore the system to operation, leaving one or more station coding units isolated, by transmitting control codes in turn to each of the coding units which he desires to include in the system as restored. On the ninth step of a control code, as hereinbefore described, the closing of back contact e of relay 8 completes a connection from terminal B to wires 182 and 183 to provide a circuit for energizing the delivery relay D of the selected coding unit. A connection from wire 183, over wire 176, through the lower winding of relay RP provides a circuit for picking up relay RP, which in turn energizes relay RPP to complete the holding circuit for relay RP, thereby restoring the coding unit to normal operation.

It will be evident that a control code will not be received by a station at which relay R is short circuited, for example, and that consequently such station will remain isolated.

In order to facilitate the restoration of the system as above described, a "recall" button RCB, Fig. 1b, is provided at the office by means of which the operator may send a special recall code to any station without operating any of the station devices. This recall code is terminated after the transmission of the station code call, that is to say, on step nine. The recall code is also effective to initiate the transmission of an indication code from the selected station, and thus provides means by which the operator may obtain new indications without causing any change in the condition of the station devices.

To initiate a recall code, the operator presses the recall button RCB and also the starting button STB of the control panel for the station to which the code is to be sent, thereby picking up the corresponding starting relay, such as relay 234ST. This in turn picks up relay OM as already described, whereupon a circuit is completed from terminal B at front contact g of relay OM over wire 83, the now closed contact a of button RCB, through the winding of the recall stick relay RCL to terminal N. Relay RCL picks up, completing a stick circuit extending over its front contact a, and wire 82 to terminal B at front contact e of relay OLBP. Button RCB may then be released and the transmission will continue through eight steps during which the office selector relay 234S and the corresponding relay S at the selected station will become energized as in the control code already described. When the ninth step is reached relay O1 does not pick up, its circuit being open at back contact b of relay RCL, and consequently relay OT is held energized over wire 68 until relay OLBP at the office and relay LBP at the selected station release.

At the selected station, when relay S picks up the normal stick circuit for relay ST is replaced by the temporary stick circuit extending from wire 246 to 237 over back contact h of relay M, wire 179, and back contact j of relay 1, and in parallel therewith, front contact c of relay LB. After relay 1 picks up on the ninth step, this stick circuit is opened by the release of relay LB. Relay D also picks upon on the ninth step, the opening of its back contact h causing relay SS to release, if energized, and the opening of its back contact j further interrupting the circuit for relay ST. The station coding unit is therefore placed in condition to initiate an indication code as soon as the line is again free. It will be seen that on the ninth step of the recall code, relay RCL is released by relay OLBP, and that the system is then in the same condition as when a control code is interrupted on an odd-numbered step, due to a fault. It follows that the system will be restored to normal by the same sequence of operations as hereinbefore described.

In the preceding description of the transmission of a control code by the system of this invention, it has been pointed out that all the signals, switches, and other devices at an interlocking such as shown in Fig. 2e may be remotely controlled from an office location by the transmission of only one code requiring only one selective station code call. Likewise, it was shown that indications of the position of the signals and switches, the occupancy or non-occupancy of track sections, and the condition of other devices may all be transmitted from the station to the office during one indication code, using only the one selective code call to assure that the indications will be displayed on the proper group of office machine panels. These codes may be of any length desired or required to transmit the necessary functions. Also, within certain limitations described, the control and indication codes at any one station may consist of a different number of code steps.

In the systems most generally in present use for providing such remote control, the length of the codes is fixed, both the control and indication codes being usually 16 steps long. Thus, to handle the arrangement of Fig. 2e, three codes would be necessary in each direction, each code 16 steps in length. Three selective code calls would be required to select between the various groups of devices handled by each code. This at once reduces the total number of such stations that can be accommodated by one office coding unit. Because certain of the available code calls cannot be combined at one station without considerable additional equipment, the geographical position of a remote location such as here illustrated may be such as to prohibit the economical use of the code calls normally next in order of sequence in the system. This results in a further reduction in the number of stations assignable to the one office coding unit.

If the older system were in use, the new indications at one instant resulting from the entry of a train into the interlocking of the illustration might necessitate two or three indication codes, depending on the code call to which the various indications are assigned. This, of course, requires additional time and reduces the coding time available on the line to other stations. In the system of my invention, no more code steps, plus one short step in some cases, than are necessary for all the controls or indications at a station need be sent. Also, at locations having only a few functions, such as a switch lock and holding signals, the code length may be reduced below the usual 16 steps, thus saving more time. Quite frequently, lack of coding time on the line further reduces the number of stations which can be assigned to one office coding unit.

The system of my invention, therefore, has several distinct advantages over those of a similar type in present use. First, both the control and indication codes may be made of any desired length to transmit in one code all control or indication functions at one field location. In providing these additional steps, less additional equipment is necessary at the field location than now required in adding extra code calls. Second, only one selective code call is required at each location, allowing more stations to be controlled by one office coding unit. Again, less coding time on the line is required by the large locations, and unnecessary code steps may be eliminated at small locations. By thus adding to the time the line circuit is available to other locations, further additional stations may be assigned to one coding unit. Lastly, the items of equipment used in furnishing these advantages are nevertheless maintained identical for all locations, and adjustable connections and extra extensions units are used to meet the individual station requirements.

Although I have herein shown and described but one form of my invention and a modification thereof, it will be understood that various changes and modifications may be made therein within the scope of the appended claims without departing from the spirit and scope of my invention.

Having thus described my invention, what I claim is:

1. A centralized traffic control system for railroads to provide at one location control of and indication from signals, switches, and other wayside devices located at several separated locations, said system comprising an office and a plurality of stations connected by a line circuit, said office and each said station equipped with a similar code transmitter-receiver for transmission and receipt of selective codes of a predetermined established length which constitute said controls and said indications; each said transmitter-receiver being adapted by external means selectively added as required to transmit codes of sufficient length to provide in a single code a plurality of code steps to form a distinctive code call for a selected station to which or from which a code is transmitted, and a second plurality of code steps to control all said wayside devices or to indicate the position of all said devices at said selected station, the length of a control code and an indication code between said office and said selected station being relatively independent of each other and independent of the length of similar codes between said office and all other stations.

2. In a remote control system, including an office and a plurality of stations, connected by a line circuit, with an identical coding transmitter at each station to deliver to said line circuit a code comprising a first plurality of code steps arranged to form a distinctive code call and a second plurality of code steps to indicate the position or condition of certain devices at said station; code extension means optionally located at a station external to said transmitter to increase the number of code steps within said second plurality of steps to provide for additional indications while using only said single distinctive code call.

3. In a remote control system, including an office and a plurality of stations connected by a line circuit, each station being equipped with a code transmitter, identical to the code transmitter at each other station, each said code transmitter being arranged to deliver to said line circuit a code comprising first, a fixed plurality of code steps to form a distinctive code call, which causes the selection in said office of a particular one of a group of selector relays, identifying a particular station, and second, a fixed plurality of code steps to indicate the position or condition of certain devices at said particular station, which indications are delivered at said office by action of said selected relay; an external code extension relay selectively added as required at any station to cause said code transmitter to repeat, in whole or in part, said second fixed plurality of code steps to provide code steps within said code in addition to initial capacity of said transmitter to indicate the position or condition of other devices at that station, thereby eliminating the necessity for another first plurality of code steps to provide a second distinctive code call from that station to select a second selector relay at said office, said additional indicating code steps being a normal part only of the code from that station, said similar codes from other stations normally including a different number of steps.

4. In combination with a code transmitter-receiver, adapted for operation in a remote control system to transmit or receive codes comprising a plurality of code steps, said transmitter-receiver including a master relay, which when energized places said transmitter-receiver in the transmitting condition, a transmitter relay, a timing relay chain, and a primary counting chain consisting of a fixed number of relays; a secondary counting chain of a variable number of relays, adapted to cause repeat cycles of operation of said primary counting chain, said secondary counting chain comprising a first relay, energized at the end of the first cycle of operation of said primary counting chain to cause the initial repeat action of said primary counting chain, a final code stopping relay energized on a selected step of said code to terminate said coding action of said primary counting chain, and a selected number of other relays external to said transmitter receiver, said selected number being determined by the code requirements of that location, said other relays being energized in succession, one at the end of the second and each succeeding cycle of operation of said primary counting chain to cause a selected number of successive repeat cycles of said primary counting chain, whereby the length of said code is extended to include the number of code steps required at said location.

5. In combination with a code transmitter-receiver, adapted for operation in a remote control system to transmit or receive codes comprising a plurality of code steps, said transmitter-receiver including a master relay, which when energized places said transmitter-receiver in the transmitting condition, a transmitter relay, a timing relay chain, and a primary counting chain consisting of a fixed number of relays; a secondary counting chain comprising a variable number of relays as determined by the requirements of the location, adapted to cause repeat cycles of operation of said primary counting chain, said secondary counting chain including a first relay, energized at the end of the first cycle of operation of said primary counting chain to cause the initial repeat action of said primary counting chain, a final code stopping relay which when energized terminates said coding action of said primary counting chain, and a selected number of intermediate relays external to said transmitter-receiver, said intermediate relays being energized in succession, one at the end of the second and each succeeding cycles of operation of said primary counting chain to cause a selected number of successive repeat cycles of said primary counting chain.

6. In a remote control system, including an office and a plurality of stations connected by a line circuit, each station and said office equipped with a similar code transmitter-receiver, adapted to deliver to or receive from said line circuit selective codes to control or to indicate the position of various devices at said stations, each said code comprising two parts, a first plurality of code steps arranged to form a distinctive code call to designate a particular station and a second plurality of code steps to carry said controls or indications, each said code transmitter-receiver including a primary counting relay chain adapted to provide a fixed number of code steps equal to said first plurality of code steps during one cycle of operation, and a secondary counting relay chain including a first relay and a code stopping relay, said primary counting chain adapted by said first relay to normally operate through only two cycles of operation, said code stopping relay when energized acting to terminate the coding action of said primary counting chain; in combination with said secondary counting chain at said office and at said particular station, a selected number of intermediate relays located external to said transmitter-receiver and an adjustable circuit means, said intermediate relays interposed in said secondary counting chain between said first relay and said code stopping relay and successively adapting said primary counting chain to operate through additional cycles of operation, one repeat cycle being added for each said intermediate relay, to add sufficient code steps to carry all required controls or indications between said office and said particular station without requiring additional distinctive code calls; said adjustable circuit means at said office and said particular station adapted to energize said code stopping relay on the same code step during the last repeat cycle of operation to synchronize the halting of the coding action.

7. In a remote control system, including an office and a plurality of stations connected by a line circuit, with a similar code transmitter-receiver at the office and each station, each transmitter-receiver adapted to transmit or receive over said line circuit a code of established length to control or to indicate the condition of certain devices at said stations, each code comprising a first plurality of code steps arranged to form a distinctive station code call and a second plurality of code steps to carry the controls or the indications; in combination with said transmitter-receivers at certain stations as required, separate code extension means to increase the number of code steps in said second plurality to provide for additional indications or controls at a station while using only the single station code call assigned to that station.

8. A remote control system comprising an office location and a plurality of station locations connected by a line circuit, said office and each said station furnished with a similar code transmitter-receiver connected to said line circuit and adapted to transmit or receive selective codes of a fixed length to control or indicate the position of certain devices at said stations, each said selective code including a distinctive station call and a fixed number of control or indication functions, circuit means external to and connected with said transmitter-receiver at certain selected stations, said circuit means at a particular station being capable of extending the length of said selective indication code from that station to indicate during a single code the position of all said devices at said particular station when said devices exceed said fixed number, said circuit means also adapting the transmitter-receiver at said particular station to receive control codes from said office longer than said fixed length, similar circuit means at said office external to and connected with said office transmitter-receiver to adapt that transmitter-receiver to receive an indication code from said particular station and to extend the length of the control code transmitted to said particular station in order to transmit all required control functions to that station during a single code, the number of control functions not being limited to the number of indication functions from said particular station, said office transmitter-receiver being adapted by said similar circuit means to transmit to each said station a control code of a length sufficient for all required control functions, regardless of the length of similar control codes to other stations, said similar circuit means at said office terminating the coding of said office transmitter-receiver at the same time as said particular station transmitter-receiver coding is terminated, thereby synchronizing the termination of coding on said line circuit.

References Cited in the file of this patent
UNITED STATES PATENTS

| | | |
|---|---|---|
| 2,169,479 | Powell | Aug. 15, 1939 |
| 2,259,561 | Hailes | Oct. 21, 1941 |
| 2,411,375 | Jackel | Nov. 19, 1946 |